(12) United States Patent
Cohen et al.

(10) Patent No.: US 10,947,060 B2
(45) Date of Patent: Mar. 16, 2021

(54) VERTICAL SEQUENCER FOR PRODUCT ORDER FULFILLMENT

(71) Applicant: Symbotic, LLC, Wilmington, MA (US)

(72) Inventors: Richard B Cohen, Keene, NH (US); Brian Svoboda, Westford, MA (US); Kirill K. Pankratov, Chelmsford, MA (US); Jason Chrisos, Somerville, MA (US); Rick Youping-Huang, Westford, MA (US); Juergen D. Conrad, North Andover, MA (US); Elizabeth Clark-Polner, Boston, MA (US)

(73) Assignee: Symbolic LLC, Wilmington, MA (US)

( * ) Notice: Subject to any disclaimer, the term of this patent is extended or adjusted under 35 U.S.C. 154(b) by 0 days.

(21) Appl. No.: 16/444,592

(22) Filed: Jun. 18, 2019

(65) Prior Publication Data
US 2019/0389671 A1 Dec. 26, 2019

Related U.S. Application Data

(60) Provisional application No. 62/689,938, filed on Jun. 26, 2018.

(51) Int. Cl.
*B65G 1/04* (2006.01)
*B65G 1/02* (2006.01)
(Continued)

(52) U.S. Cl.
CPC ......... *B65G 47/643* (2013.01); *B65G 1/1373* (2013.01); *B65G 21/2072* (2013.01);
(Continued)

(58) Field of Classification Search
None
See application file for complete search history.

(56) References Cited

U.S. PATENT DOCUMENTS

| 7,991,505 B2 | 8/2011 | Lert, Jr. et al. |
| 8,425,173 B2 * | 4/2013 | Lert ..................... B65G 1/1373 414/280 |

(Continued)

OTHER PUBLICATIONS

International Search Report, International Application No. PCT/US2019/39249, dated Sep. 5, 2019.

*Primary Examiner* — Kavel Singh
(74) *Attorney, Agent, or Firm* — Perman & Green, LLP

(57) ABSTRACT

A product order fulfillment system including a multi-level transport system and a lifting transport system. Each level of the multi-level transport system having a corresponding independent asynchronous level transport system separate and distinct from the asynchronous level transport system corresponding to each other level of the multi-level transport system. Each independent lift axis of the lifting transport system being configured to independently hold at least one case and being communicably coupled to each asynchronous level transport system so as to provide for exchange of the at least one case between each asynchronous level transport system and each independent lift axis. Each independent lift axis is communicably coupled to each other independent lift axis of the more than one lift axis and forms a common output of mixed cases so as to create an ordered sequence of mixed cases in accordance to a predetermined case out ordered sequence.

23 Claims, 34 Drawing Sheets

(51) Int. Cl.

| | |
|---|---|
| *B65G 47/71* | (2006.01) |
| *B65G 17/06* | (2006.01) |
| *B65G 47/90* | (2006.01) |
| *B65G 47/64* | (2006.01) |
| *B65G 1/137* | (2006.01) |
| *B65G 21/20* | (2006.01) |
| *B65G 47/84* | (2006.01) |

(52) U.S. Cl.
 CPC ........... *B65G 47/71* (2013.01); *B65G 47/844* (2013.01); *B65G 47/90* (2013.01); *B65G 17/06* (2013.01)

(56) References Cited

U.S. PATENT DOCUMENTS

| | | |
|---|---|---|
| 9,193,524 B2 | 11/2015 | Gue et al. |
| 9,321,591 B2 * | 4/2016 | Lert ..................... B65G 1/065 |
| 9,604,782 B2 | 3/2017 | Winkler |
| 9,701,475 B2 * | 7/2017 | Kharkover ............... E04H 6/22 |
| 10,435,241 B2 * | 10/2019 | Lert ..................... B65G 1/1378 |
| 2009/0136328 A1 | 5/2009 | Schafer |
| 2012/0328397 A1 | 12/2012 | Yamashita |
| 2013/0245810 A1 | 9/2013 | Sullivan et al. |
| 2016/0009492 A1 | 1/2016 | Stevens |
| 2016/0207710 A1 | 7/2016 | Conrad et al. |
| 2016/0214797 A1 | 7/2016 | Pankratov et al. |
| 2016/0355337 A1 | 12/2016 | Lert et al. |
| 2017/0101274 A1 | 4/2017 | Sullivan et al. |
| 2018/0105363 A1 | 4/2018 | Lisso et al. |

* cited by examiner

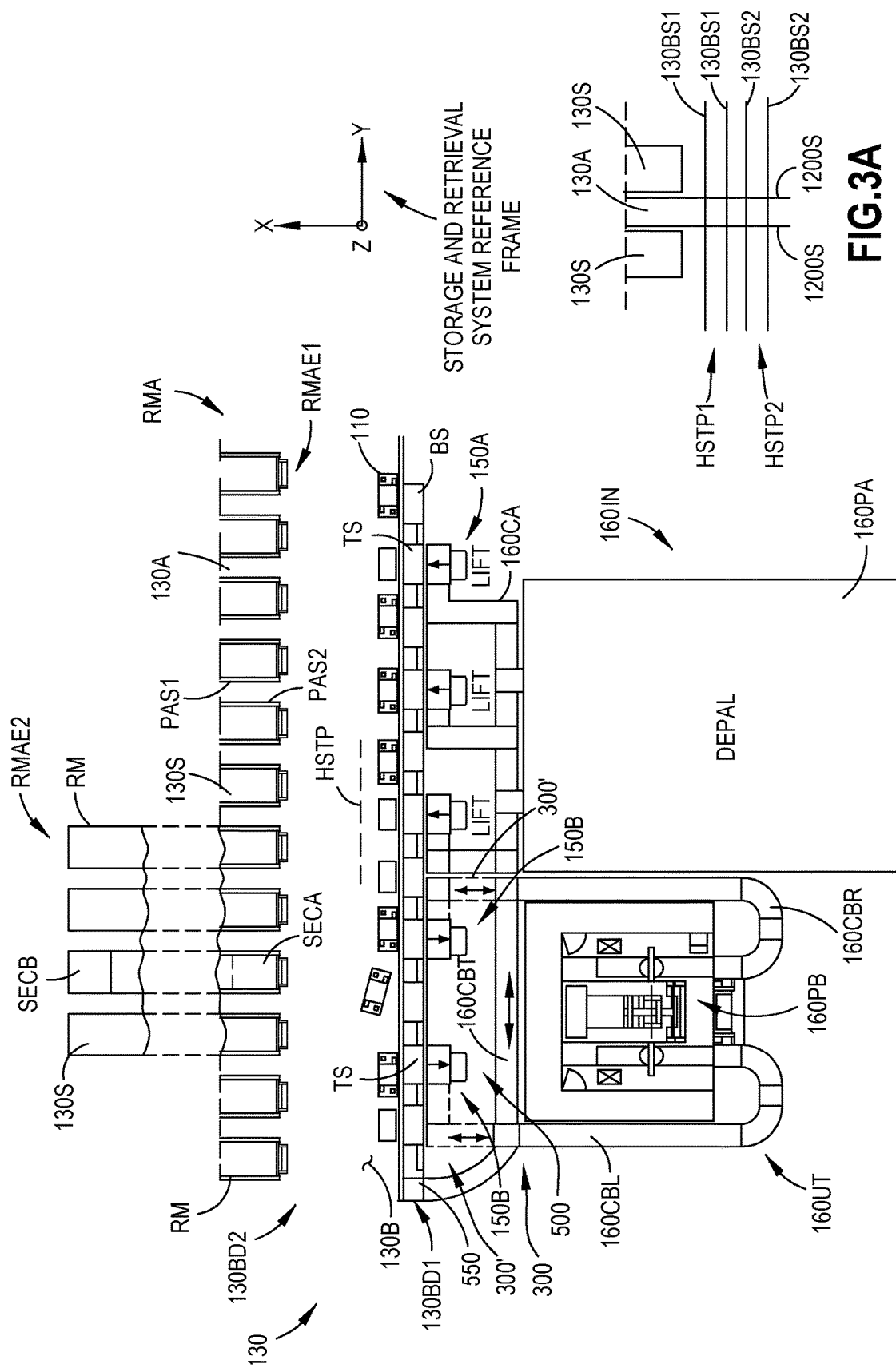

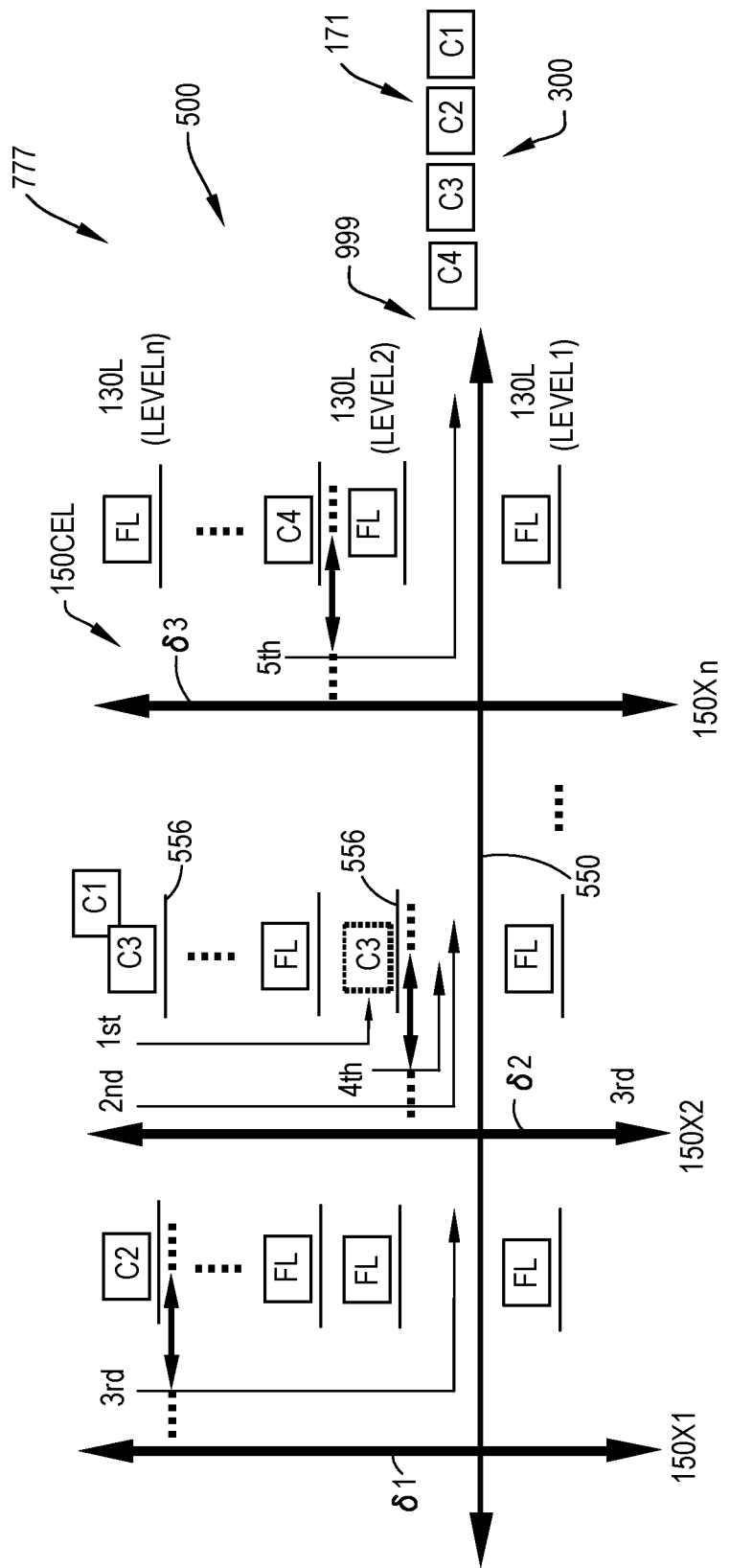

VERTICAL SEQUENCER FOR PRODUCT ORDER FULFILLMENT

CROSS REFERENCE TO RELATED APPLICATIONS

This application is a non-provisional of and claims the benefit of U.S. provisional patent application No. 62/689,938 filed Jun. 26, 2018, the disclosure of which is incorporated herein by reference in its entirety.

BACKGROUND

1. Field

The exemplary embodiments generally relate to storage and retrieval system and, more particularly, to vertical sequencing of items in the storage and retrieval system.

2. Brief Description of Related Developments

Generally, in storage and retrieval systems case units or items are picked and transported to an outbound packaging cell (e.g., a human picking cell and/or an automated palletizer). These picked case units are sequenced according to a product order for placement on a pallet or other shipping container.

The case units output from the multilevel storage and retrieval systems are transferred to a packing station where the case units are placed on pallets for shipping. Generally the pallets include case units of similar size and shape so that stable case levels, sometimes with paperboard sheets disposed between the levels, are formed on the pallets. In some instances each level of tier of the pallet is separately formed and then placed on the pallet to form stacked tiers. Mixed pallets are also possible. Generally when forming a pallet layer cases are placed in a buffer station or other location at the palletizing station so that the dimensions of the case are measured. A computer or other processor determines an arrangement (e.g., sequence) of the cases based on the dimensions and instructs a robot to pick the cases for placement in the pallet layer. In other instances, the sequencing of the items is performed by automation or humans picking the items from storage shelves where the items are transferred from storage to outbound conveyors in a sequenced order. This sequencing generally occurs during horizontal transfer of the items and at rates that are generally slower than rates at which the items can be palletized or packed into other shipping containers.

It would be advantageous to sort case units for placement on a pallet during vertical transport of the case units out of the storage and retrieval system storage structure to increase throughput of the storage and retrieval system.

BRIEF DESCRIPTION OF THE DRAWINGS

The foregoing aspects and other features of the disclosed embodiment are explained in the following description, taken in connection with the accompanying drawings, wherein:

FIGS. 3 and 3A are schematic illustrations of portions of the storage and retrieval system in accordance with aspects of the disclosed embodiment;

FIG. 10 is a schematic illustration of a portion of the storage and retrieval system in accordance with aspects of the disclosed embodiment;

DETAILED DESCRIPTION

Although the aspects of the disclosed embodiment will be described with reference to the drawings, it should be understood that the aspects of the disclosed embodiment can be embodied in many forms. In addition, any suitable size, shape or type of elements or materials could be used.

Figure 1A:
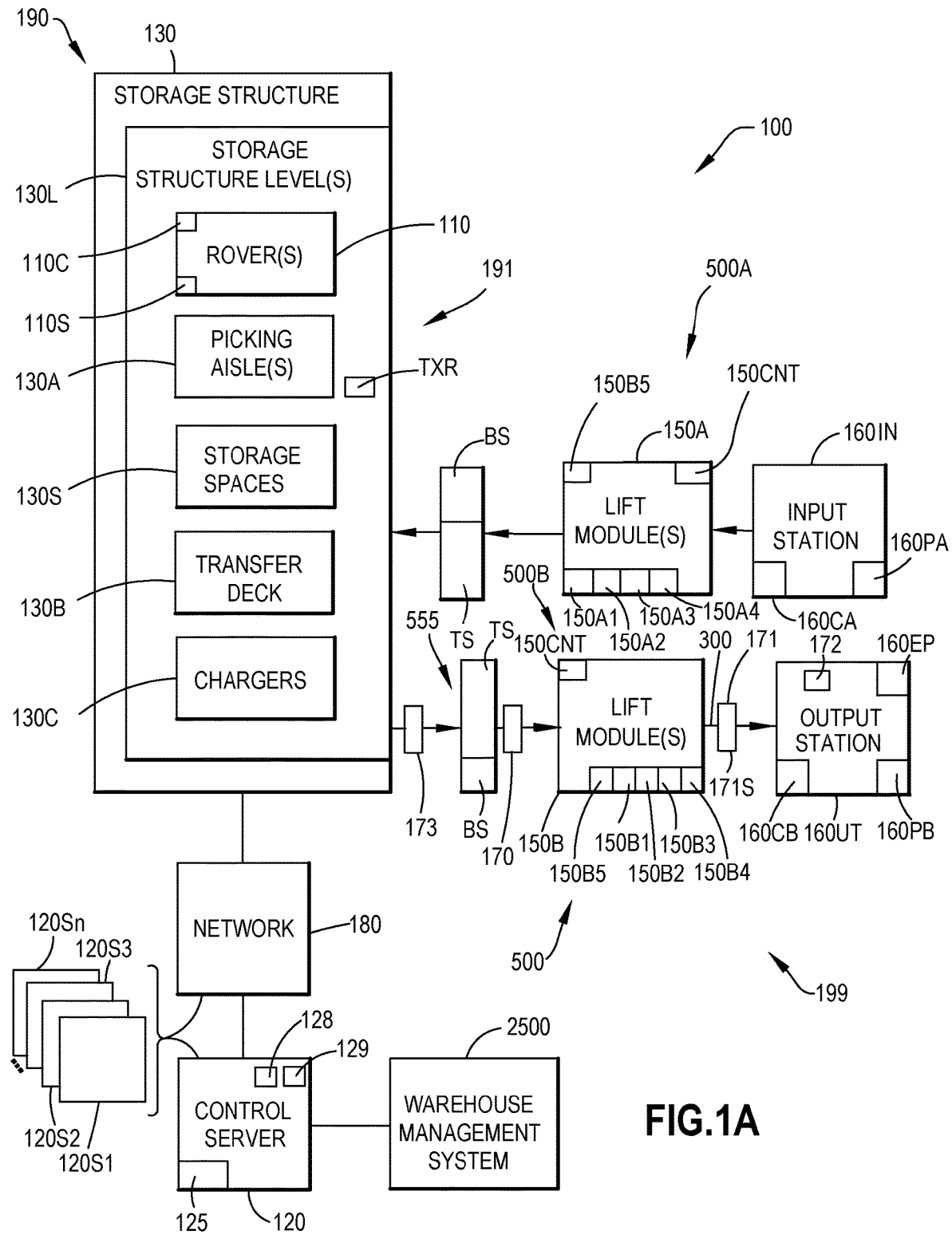
FIG. 1A is a schematic illustration of an automated storage and retrieval system in accordance with aspects of the disclosed embodiment.

FIG. 1A is a schematic illustration of an automated storage and retrieval system 100 including a multi-level transport system 190 in accordance with aspects of the disclosed embodiment. Each level 130L of the multi-level transport system 190 includes an asynchronous level transport system 191 that is separate and distinct from the asynchronous level transport system 191 at each other level 130L of the multi-level transport system 190. The multi-level transport system 190 is coupled to and feeds an infeed order sequence 173 of mixed cases to a lifting transport system 500 that connects each asynchronous level transport system 191 to a case output having a predetermined mixed case out order sequence. As shown, the lifting transport system 500 (see also FIG. 5A) may have separate inbound and outbound transport sections 500A, 500B. The outbound transport section 500B has one or more lift transport cells 150CEL (see also FIG. 5A), each or at least one of which has more than one independent lift axis 150X1-150Xn (FIG. 5A) coupled to each other and controlled in a cooperative manner as will be described herein. Each of the independent lift axis 150X1-150Xn of the lift transport cell 150CEL (also referred to herein as "cell" 150CEL) independently feeds cases, from any of the asynchronous level transport systems 191, through a common output 300 of the cell 150CEL that creates an ordered sequence of mixed cases 171 from the common output 300 in accordance with the predetermined mixed case out order sequence. The output of a cell 150CEL generates a predetermined case our order sequence of mixed cases 172 for a corresponding order fill station 160UT. In other aspects, the output of the more than one cell are superposed or aggregated to generate the predetermined case our order sequence of mixed cases 172 for the order fill station 160UT. The inbound transport section 500A may be similar to the outbound transport section 500B, or may have any suitable number of independent lift axes that may be coupled or uncoupled with respect to an inbound flow of cases to the storage structure 130.

The ordered sequence of mixed cases 171 from the more than one independent lift axis 150X1-150Xn, of the lifting transport system 500, is decoupled from the infeed order sequence 173 of each asynchronous level transport system 191, and effects a resequencing of cases, along the more than one independent lift axis 150X1-150Xn, between infeed to the more than one independent lift axis 150X1-150Nx and the output 300 of the more than one independent lift axis 150X1-150Xn so that the output ordered sequence of cases 171 has a superior sequence order relative to the predetermined case out order sequence of mixed cases 172 than the infeed order sequence 173 of cases at each level 130L; and so that in one aspect, outfeed transport work, outputting cases through the multi-level transport system 190 and the lifting transport system 500 is optimally distributed (e.g., in desired optimization strategies of one or more transactions) over the levels 130L of the multi-level transport system 190.

While the aspects of the disclosed embodiment are described herein with respect to the storage and retrieval system 100, it should be understood that the aspects of the disclosed embodiment are equally applicable to any suitable material handling center(s) including, but not limited to, warehouses, distribution centers, cross-docking facilities, order fulfillment centers/facilities, packaging facilities, shipping facilities, or other suitable facility or combination of facilities for performing one or more functions of material or inventory handling. In accordance with aspects of the disclosed embodiment the automated storage and retrieval system 100 may operate in a retail distribution center or warehouse to, for example, fulfill orders received from retail stores for case units (for simplicity and ease of explanation the term "case unit(s)" or the synonymous term "case" is generally used herein for referring to both individual case units and pickfaces, where a pickface is formed of multiple case units that are moved as a unit) such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes or on pallets. In still other examples, the case units are a combination of uncontained and contained items. It is noted that the case units, for example, include cased units of goods (e.g. case of soup cans, boxes of cereal, etc.), individual goods that are adapted to be taken off of or placed on a pallet, a product, a package, a box, a tote, a mailer, a bucket and/or other types of containers. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the embodiments the storage and retrieval system described herein may be applied to any environment in which case units are stored and retrieved.

Figure 1B:
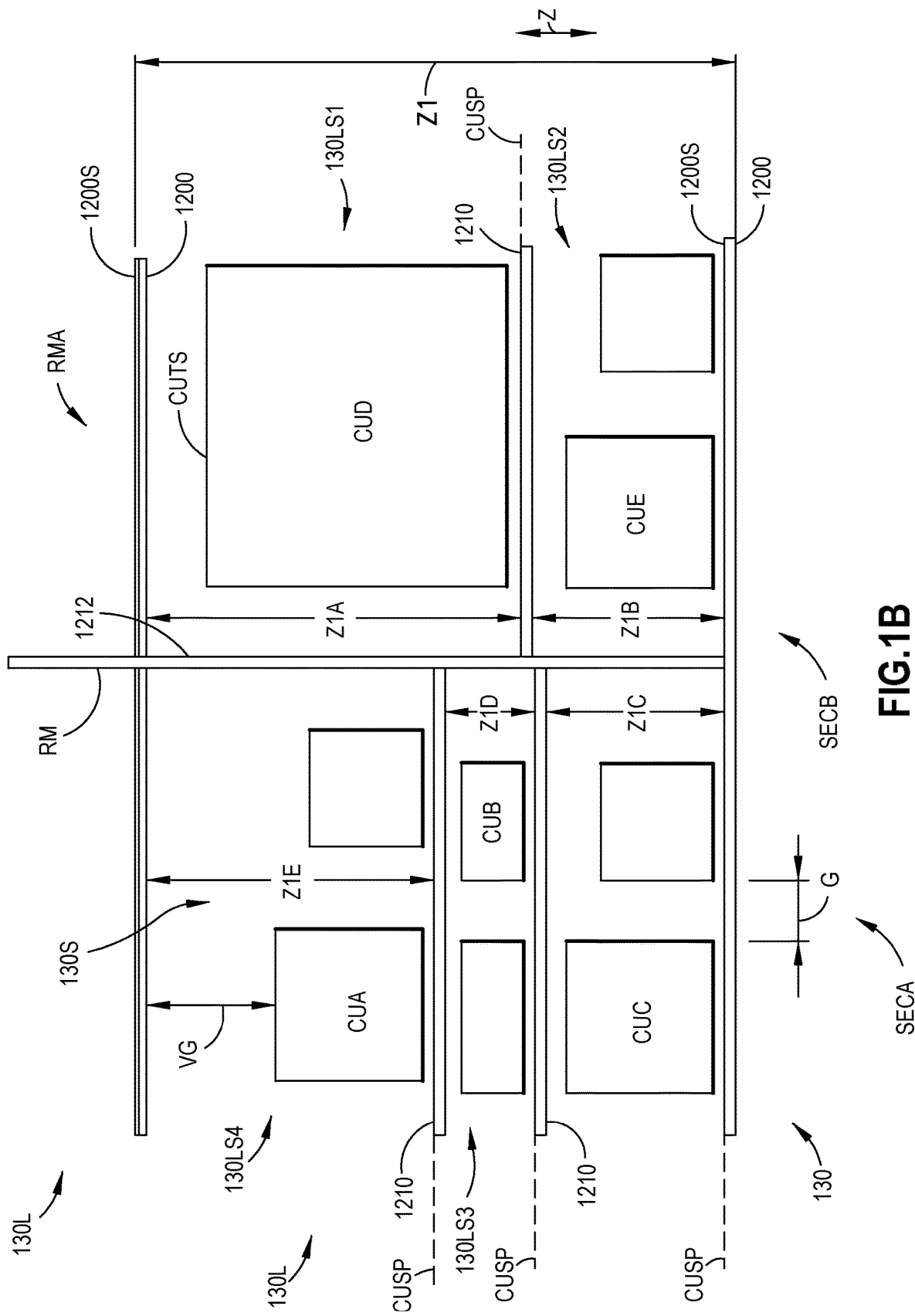
FIGS. 1B and 1C are schematic illustrations of portions of the automated storage and retrieval system in accordance with aspects of the disclosed embodiment.
Figure 1C:
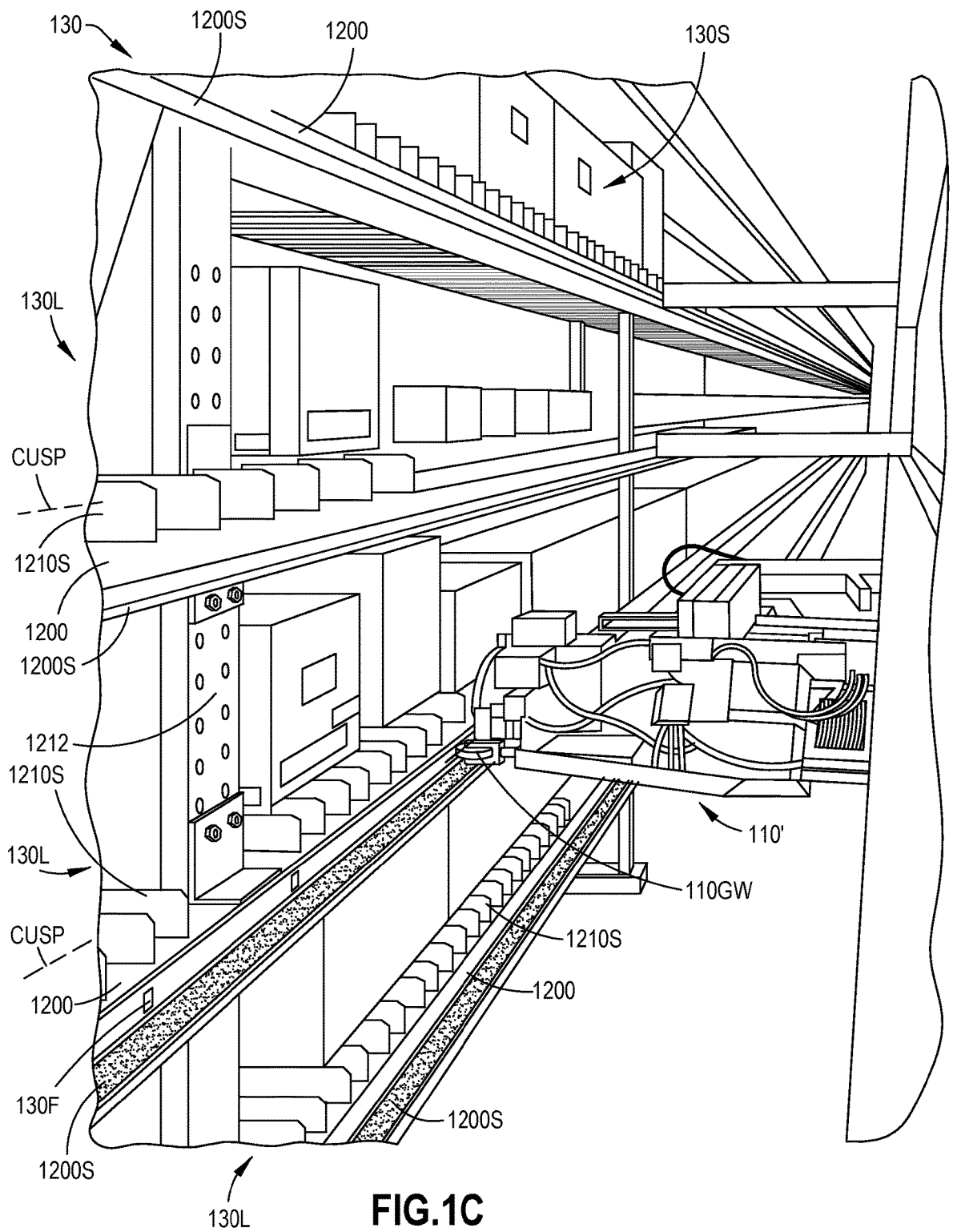
Figure 1D:
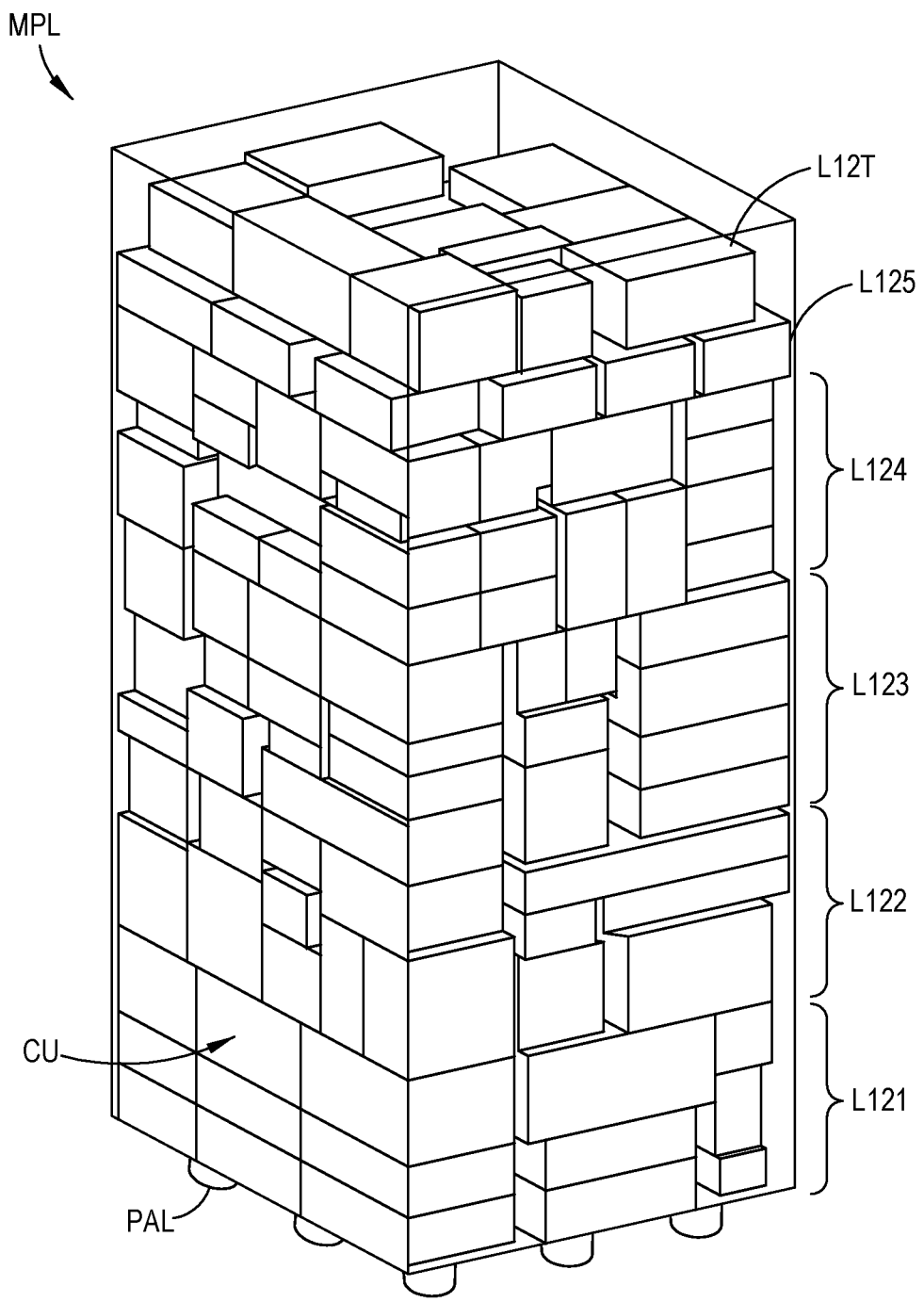
FIG. 1D is a schematic illustration of a mixed pallet load formed by the automated storage and retrieval system in accordance with aspects of the disclosed embodiment.

Also referring to FIG. 1D, it is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL leave the storage and retrieval system 100, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In one aspect of the exemplary embodiment, the storage and retrieval system 100 may be configured to generally include an in-feed section, a multi-level transport system 190, and an output and resequencing section 199 (where, in one aspect, storage of items is optional) as will be described in greater detail below. As may be realized, in one aspect of the disclosed embodiment the system 100 operating, for example, as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case pallet loads MPL. The in-feed section may generally be capable of resolving the uniform pallet loads to individual cases, and transporting the cases via suitable transport, for input to the storage and resequencing section 199. In other aspects the output section assembles the appropriate group of ordered case units, that may be different in SKU, dimensions, etc. into bags, totes or other suitable containers according to the predetermined order sequence of picked items at the operator station 160EP (such as to fill a customer order).

Figure 13:
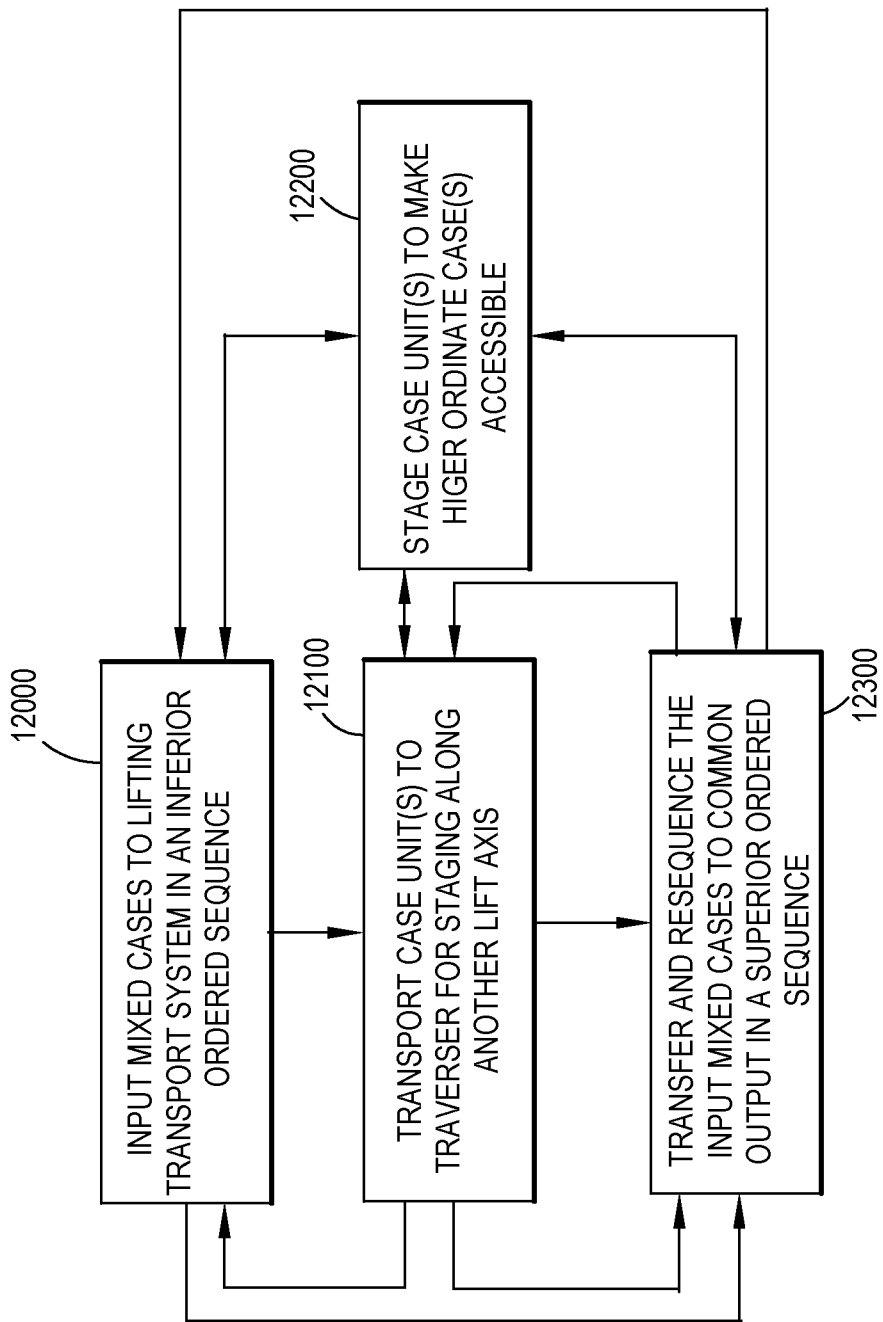
FIG. 13 is a flow diagram of a vertical case unit sequencing in accordance with aspects of the disclosed embodiment.

As may also be realized, as illustrated in FIG. 13, in one aspect of the disclosed embodiment the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and sequence the corresponding groups of cases (in the manner described herein) at an operator station 160EP where items are picked from the different case units CU, and/or the different case units CU themselves, are placed in one or more bag(s), tote(s) or other suitable container(s) TOT by an operator 1500, or any suitable automation, in a predetermined order sequence of picked items according to, for example, an order, fulfilling one or more customer orders, in which the case units CU are sequenced at the operator station 160EP in accordance with the predetermined order sequence, noting that the sequencing of the case units CU as described herein effects the sequencing of the case units CU at the operator station 160EP.

Figure 5A:
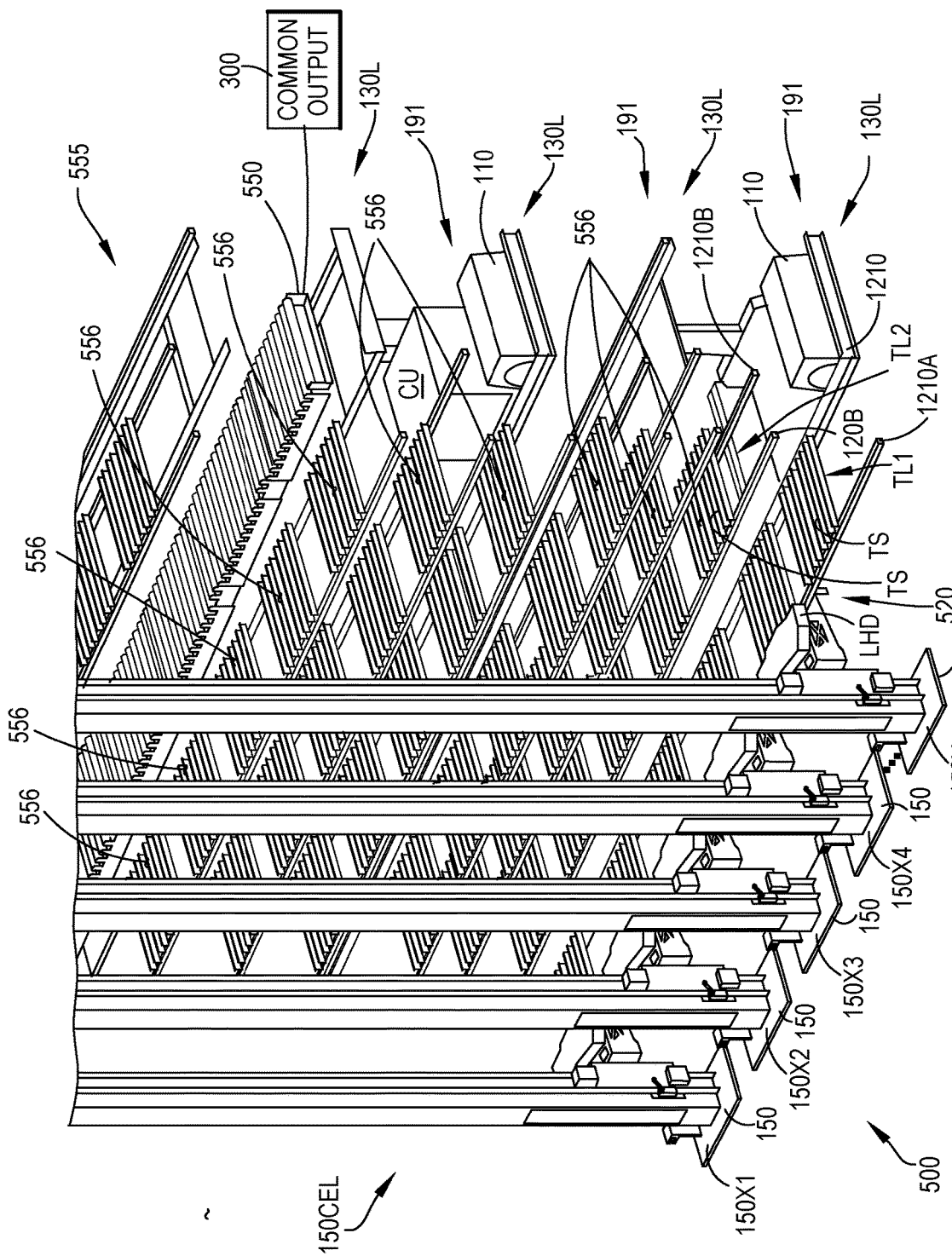
FIGS. 5A, 5B, 5C, and 5D are schematic illustrations of portions of the storage and retrieval system in accordance with aspects of the disclosed embodiment.
Figure 5B:
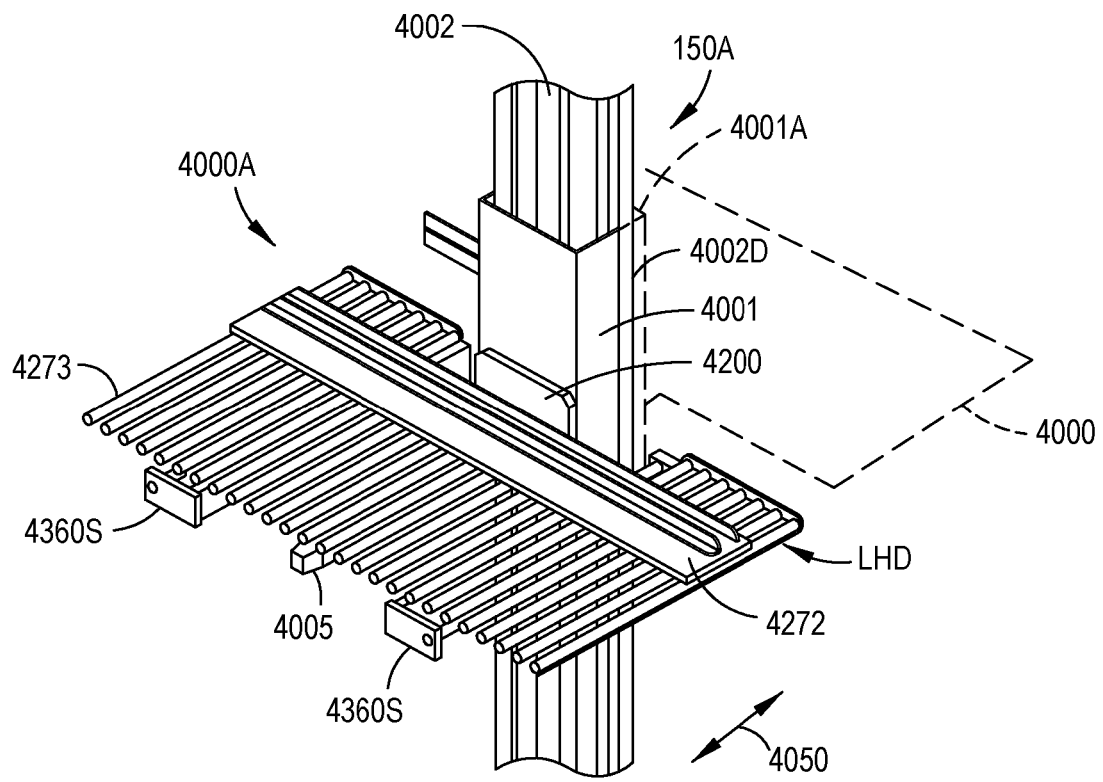
Figure 5C:
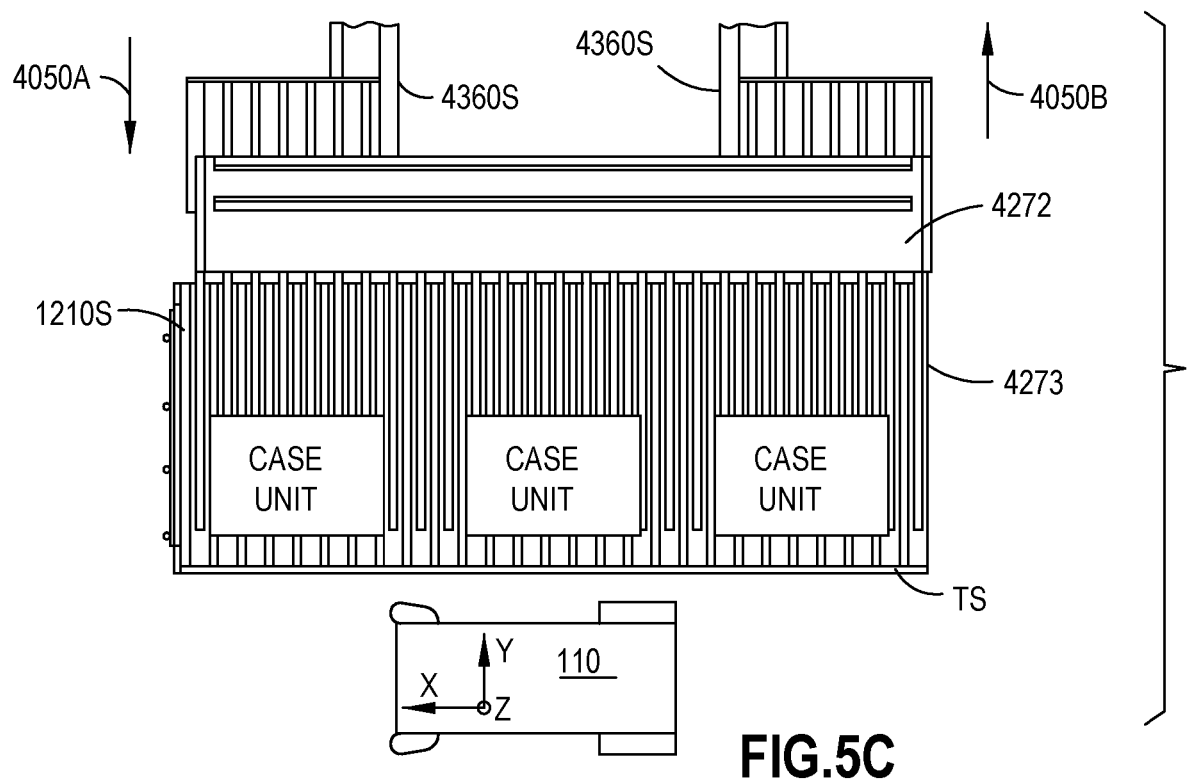

Referring to FIGS. 1A and 5A, the output and resequencing section 199 includes, at least a lifting transport system 500 (FIG. 5A) with more than one independent lift axis 150X1-150Xn (see FIG. 5A, where in one aspect each lift axis is a lift 150B, while in other aspects each lift axis may be any suitable lifting device as described herein with respect to lifts 150) that are coupled or uncoupled so as to form a common infeed interface 555 frame 777 (see FIG. 7, e.g., so that the infeed interface 555 frame 777 is common to each lift axis 150X1-150Xn) and couple the multi-level transport system 190 to the output stations(s) 160=through a common output 300. Each of the lift axes 150X1-150Xn is configured to independently hold at least one case unit and reciprocate along a vertical axis (i.e., the Z axis or lift travel axis) of the lift axis independently raising and lowering the at least one case unit (singly or in groups, or in pickfaces) to provide lifting transport of mixed cases between more than one level 130L of the multi-level transport system 190, as will be described in greater detail below.

In the exemplary embodiment, and referring to FIG. 1D, the output and resequencing section 199 generates the pallet load MPL in what may be referred to as a structured architecture of mixed case stacks. The structured architecture of the pallet load MPL described herein is representative and in other aspects the pallet load MPL may have any other suitable configuration. For example, the structured architecture may be any suitable predetermined configuration such as a truck bay load or other suitable container or load container envelope holding a structural load. The structured architecture of the pallet load MPL may be characterized as having several flat case layers L121-L125, L12T, at least one of which is formed of non-intersecting, free-standing and stable stacks of multiple mixed cases. The mixed case stacks of the given layer have substantially the same height, to form as may be realized substantially flat top and bottom surfaces of the given layer, and may be sufficient in number to cover the pallet area, or a desired portion of the pallet area. Overlaying layer(s) may be orientated so that corresponding cases of the layer(s) bridge between the stacks of the supporting layer. Thus, stabilizing the stacks and correspondingly the interfacing layer(s) of the pallet load. In defining the pallet load into a structured layer architecture, the coupled 3-D pallet load solution is resolved into two parts that may be saved separately, a vertical (1-D) part resolving the load into layers, and a horizontal (2-D) part of efficiently distributing stacks of equal height to fill out the pallet height of each layer. As will be described below, the output and resequencing section 199 outputs case units so that the two parts of the 3-D pallet load solution are resolved. The predetermined structure of the mixed pallet load MPL defines an order of case units, whether the case units are a singular case unit pickface or a combined case unit pickface provided by the output and resequencing sections 199 to a load construction system (which may be automated or manual loading). As may be realized, separate portions of the predetermined structure of the mixed pallet load MPL (e.g., a separate layer, or a portion of the layer) may each define the output case units desired for sequencing by the output and resequencing section(s) 199.

In accordance with aspects of the disclosed embodiment, referring again to FIG. 1A, the automated storage and retrieval system 100 includes input stations 1601N (which include depalletizers 160PA and/or conveyors 160CA for transporting items to lift modules 150A for entry into storage) and output stations 160UT (which include palletizers 160PB, operator stations 160EP and/or conveyors 160CB for transporting case units from lift modules 150B for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of autonomous rovers/vehicles or transport vehicles 110 (referred to herein as "bots"). It is noted that the depalletizers 160PA may be configured to remove case units from pallets so that the input station 1601N can transport the items to the lift modules 150 for input into the storage structure 130. The palletizers 160PB may be configured to place items removed from the storage structure 130 on pallets PAL (FIG. 1D) for shipping.

Figure 14:
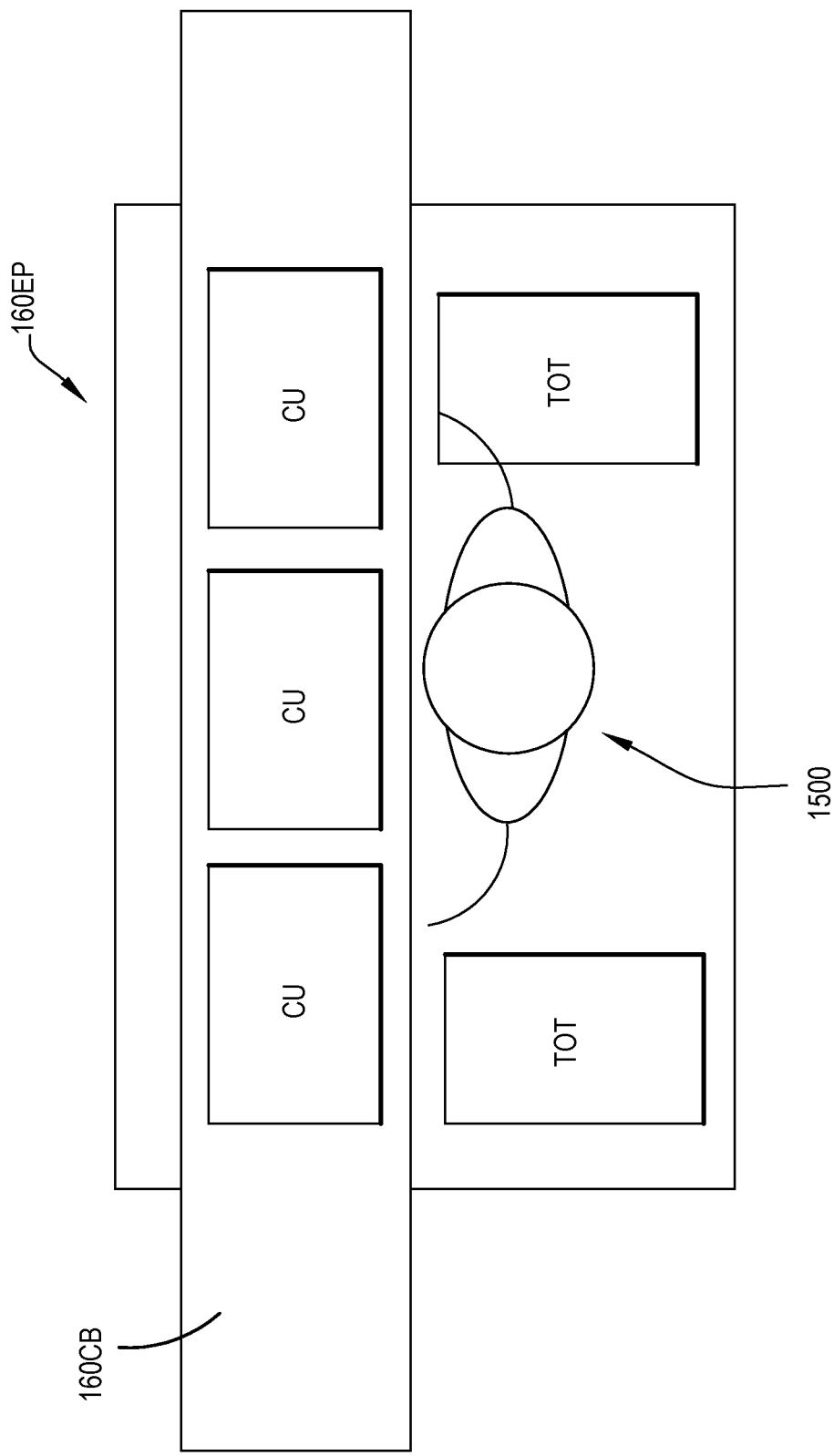
FIG. 14 is a schematic illustration of a portion of the storage and retrieval system in accordance with aspects of the disclosed embodiment.

The lift modules 150 and the respective lift axis (whether inbound or outbound) may be shown as reciprocating lifts in the figures; however, in other aspects the lift modules 150 may be any suitable vertically configured item handling device(s) such as, for example, an elevator (e.g., reciprocating lift) 150A1, 150B1, escalator 150A2, 150B2, angled conveyor belt 150A3, 150B3, unmanned aerial vehicle (e.g., a drone, quadcopter, multi-copter, etc.) 150A4, 150B4, and/or crane/hoist 150A5, 150B5. As used herein the lift modules 150 (e.g., in the outbound direction) may be referred to as the lifting transport system 500 that defines the output and resequencing section 199. In one aspect the output and resequencing section 199 is configured to pick one or more cases from one or more transfer deck levels (e.g., each transfer deck level corresponding to a storage structure level 130L) and transport the one or more cases to a load fill section or cell (such as output station 160UT) of the storage and retrieval system 100. The term load fill section or load fill cell (used interchangeably herein, and generally referred to as a load fill) refers to either a pallet load fill section/cell (such as for the creation of a mixed pallet load MPL) or an itemized load fill section/cell as described with respect to FIG. 14.

At least the storage structure 130 (including one or more of the picking aisles 130A, storage spaces 130S and transfer deck 130B of each different storage structure level 130L) and bots 110 may be collectively referred to herein as the multi-level transport system 190. Each level 130L of the multi-level transport system 190 having a corresponding asynchronous level transport system 191 (which includes, e.g., the bots 110, the picking aisles 130A, storage spaces 130S and transfer deck 130B of the respective level 130L), of mixed cases, that is separate and distinct from the level transport system 191 corresponding to each other level 130L of the multi-level transport system 190. The asynchronous level transport system 190 defines an array of level asynchronous transport axes X and Y (see e.g., FIGS. 2A and 2B—as described below), corresponding to the respective level 130L, and being configured to hold and asynchronously transport at least one case unit providing transport of mixed cases along the array of the level transport axes X and Y as will be described below.

Also referring to, for example, FIGS. 1B, 1C and 3, the storage structure 130 may include multiple storage rack modules RM, configured in a high density three dimensional rack array RMA, that are accessible by storage or deck levels 130L. As used herein the term "high density three dimensional rack array" refers to a storage array in which a total number of deck levels that is less than a total number of rack levels where, for example, the three dimensional rack array RMA has undeterministic open shelving distributed along picking aisles 130A where multiple stacked shelves 1210 are accessible from a common picking aisle travel surface or picking aisle level (e.g. case units are placed at each picking aisle level within dynamically allocated storage spaces so that the vertical space/gap VG and horizontal space/gap G between case units is minimized at each picking aisle level, as described in for example, U.S. Pat. No. 9,856,083 issued on Jan. 2, 2018, the disclosure of which is incorporated herein by reference in its entirety).

Referring to, for example, FIGS. 1A, 1B, 1C and 3, each storage level 130L includes pickface storage/handoff spaces 130S (referred to herein as storage spaces 130S) formed by the rack modules RM. The storage spaces 130S formed by the rack modules, in one aspect, include shelves that are disposed along storage or picking aisles 130A (that are connected to the transfer deck 130B) which, e.g., extend linearly through the rack module array RMA and provide bot 110 access to the storage spaces 130S and transfer deck(s) 130B. In other aspects, the storage spaces 130S formed by the rack modules may include slots, receptacle, stalls, cribs, cordoned areas, hooks, racks, or other suitable locations with a configuration that allows the bots to pick and place case units to and from the storage spaces. In one aspect, the shelves of the rack modules RM are arranged as multi-level shelves that are distributed along the picking aisles 130A. As may be realized the bots 110 travel on a respective storage level 130L along the picking aisles 130A and the transfer deck 130B for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one transfer deck 130B at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011 the disclosure of which is incorporated herein by reference in its entirety. In other aspects, the storage structure may not have transfer decks on one or more of the level 130L, where the picking aisles may extend so that the bots 110 have access to one or more lifts disposed on a side of the picking aisle in a manner similar to that described in, for example, U.S. Pat. No. 8,974,168 issued on Mar. 10, 2015, the disclosure of which is incorporated herein by reference in its entirety.

Figure 2A:
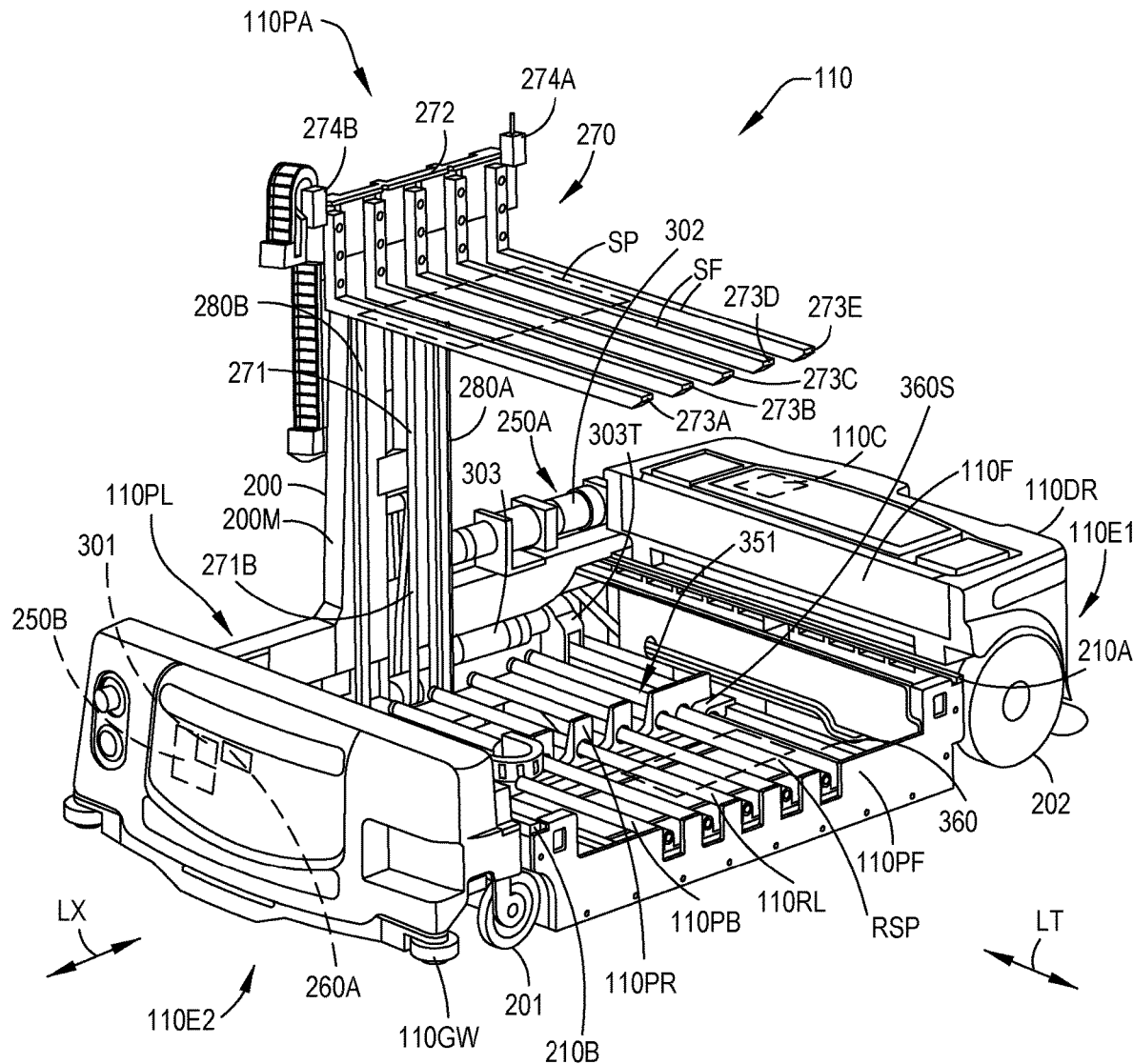
FIG. 2A is a schematic illustration of a transport vehicle in accordance with aspects of the disclosed embodiment.
Figure 2B:
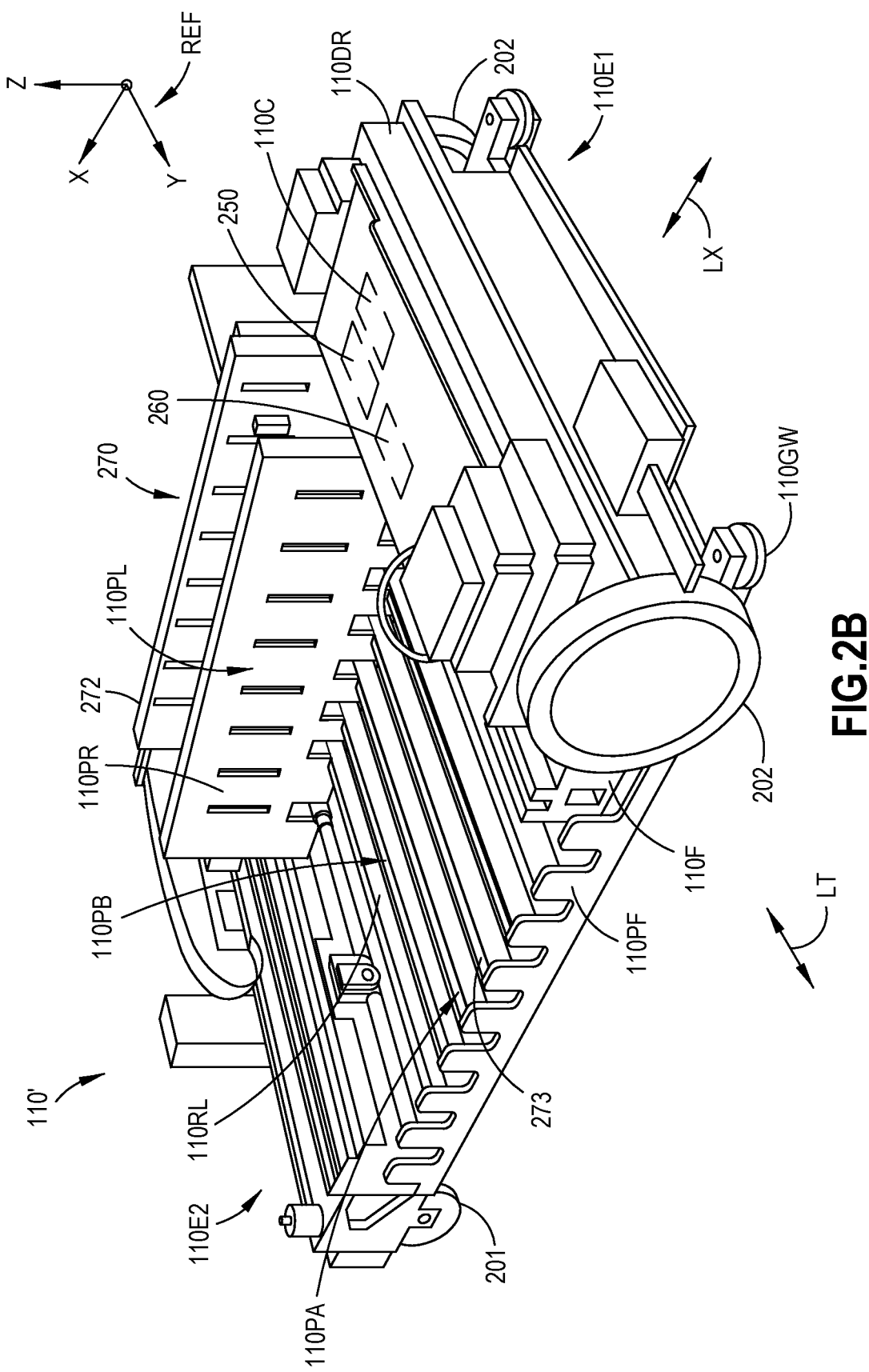
FIG. 2B is a schematic illustration of a transport vehicle in accordance with aspects of the disclosed embodiment.

In one aspect of the disclosed embodiment, the transfer decks 130B are substantially open and configured for the undeterministic traversal of bots 110 along multiple travel lanes (e.g. along an asynchronous X transport axis with respect to the bot frame of reference REF illustrated in FIGS. 2A and 2B) across and along the transfer decks 130B. As may be realized, the transfer deck(s) 130B at each storage level 130L communicate with each of the picking aisles 130A on the respective storage level 130L. Bots 110 bi-directionally traverse between the transfer deck(s) 130B and picking aisles 130A on each respective storage level 130L so as to travel along the picking aisles (e.g. along the asynchronous X transport axis with respect to the bot frame of reference REF illustrated in FIGS. 2A and 2B) and access the storage spaces 130S disposed in the rack shelves alongside each of the picking aisles 130A (e.g. bots 110 may access, along an asynchronous Y transport axis (with respect to the bot frame of reference REF illustrated in FIGS. 2A and 2B), storage spaces 130S distributed on both sides of each aisle such that the bot 110 may have a different facing when traversing each picking aisle 130A, for example, referring to FIGS. 2A and 2B, drive wheels 202 leading a direction of travel or drive wheels trailing a direction of travel). As may be realized, throughput outbound from the storage array in the horizontal plane corresponding to a predetermined storage or deck level 130L is effected by and manifest in the combined or integrated throughput along both the asynchronous X and Y transport axes. As noted above, the transfer deck(s) 130B also provides bot 110 access to each of the lifts 150 on the respective storage level 130L where the lifts 150 feed and remove case units (e.g. along the Z throughput axis, see, e.g., FIGS. 2A, 2B, 3, 4A, and 4B) to and/or from each storage level 130L and where the bots 110 effect case unit transfer between the lifts 150 and the storage spaces 130S.

In other aspects, of the disclosed embodiments, the transfer decks 130B may be deterministic, in a manner substantially similar to that of the picking aisles. For example, the transfer decks 130B may include any suitable number of guide features 130BS1, 130BS2, such as rails, guides, tracks, etc., which form one or more travel paths HSTP1, HSTP2 for the bots 110 and providing access to the lifts 150 (e.g., along the asynchronous X transport axis with respect to the bot frame of reference REF illustrated in FIGS. 2A and 2B) across and along the transfer decks 130B. The deterministic travel paths HSTP1, HSTP2 of the transfer decks 130B may be arranged transverse to the picking aisles 130A of a respective level 130L. The bots 110 may be suitably configured to transition between rails 1200S of the deterministic picking aisle 130A (e.g., along the asynchronous Y transport axis with respect to the bot frame of reference REF illustrated in FIGS. 2A and 2B) and a deterministic travel path HSTP1, HSTP2 in any suitable manner. For example, the bots 110 may include sets of substantially orthogonal wheels as described in, for example, U.S. Pat. No. 5,370,492, issued on Dec. 6, 1994 and/or U.S. Pat. No. 6,389,981, issued on May 21, 2002, the disclosures of which are incorporated herein by reference in their entireties. In still other aspects, the bots 110 may include separable traversal unit(s) that roll on and roll off of a bot main frame. For example, the bot main frame traverses the one of the deterministic picking aisle 130A and the deterministic travel path(s) HSTP1, HSTP2 of the transfer deck 130B (e.g., along one of the asynchronous X and Y axes) and the separable unit traverses another of the deterministic picking aisle 130A and the deterministic travel path(s) HSTP1, HSTP2 of the transfer deck 130B (e.g., along another of the asynchronous X and Y axes). Suitable examples of autonomous transports having a main frame and a separable traversal unit can be found in, for example, U.S. Pat. No. 4,459,078, issued Jul. 10, 1984, the disclosure of which is incorporated herein by reference in its entirety.

As described above, referring also to FIG. 3, in one aspect the storage structure 130 includes multiple storage rack modules RM that are configured in a three dimensional array RMA, where the racks are arranged in aisles 130A and the aisles 130A are configured for bot 110 travel within the aisles 130A. In this aspect, the transfer deck 130B has an undeterministic transport surface on which the bots 110 travel where the undeterministic transport surface 130BS has more than one juxtaposed travel lane (e.g. high speed bot travel paths HSTP) connecting the aisles 130A (in other aspects, each high speed bot travel path may be deterministic as noted above). As may be realized, the juxtaposed travel lanes are juxtaposed along a common undeterministic (or deterministic as shown in FIG. 3A) transport surface 130BS between opposing sides 130BD1, 130BD2 of the transfer deck 130B. As illustrated in FIG. 3, in one aspect the aisles 130A are joined to the transfer deck 130B on one side 130BD2 of the transfer deck 130B but in other aspects, the aisles are joined to more than one side 130BD1, 130BD2 of the transfer deck 130B in a manner substantially similar to that described in U.S. patent application Ser. No. 13/326,674 filed on Dec. 15, 2011, the disclosure of which was previously incorporated by reference herein in its entirety. As will be described in greater detail below, the other side 130BD1 of the transfer deck 130B includes deck storage racks (e.g. interface stations TS and buffer stations BS) that are distributed along the other side 130BD1 of the transfer deck 130B so that at least one part of the transfer deck is interposed between the deck storage racks (such as, for example, buffer stations BS or transfer stations TS) and the aisles 130A. The deck storage racks are arranged along the other side 130BD1 of the transfer deck 130B so that the deck storage racks communicate with the bots 110 from the transfer deck 130B and with the lift modules 150 (e.g. the deck storage racks are accessed by the bots 110 from the transfer deck 130B and by the lifts 150 for picking and placing pickfaces so that pickfaces are transferred between the bots 110 and the deck storage racks and between the deck storage racks and the lifts 150 and hence between the bots 110 and the lifts 150).

Referring again to FIG. 1A, each storage level 130L may also include charging stations 130C for charging an on-board power supply of the bots 110 on that storage level 130L such as described in, for example, U.S. Pat. No. 9,082,112 issued on Jul. 14, 2015, the disclosure of which is incorporated herein by reference in its entirety.

The bots 110 may be any suitable independently operable autonomous transport vehicles that carry and transfer case units along the asynchronous X and Y transport axes throughout the storage and retrieval system 100. In one aspect the bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. Pat. No. 8,425,173 issued on Apr. 23, 2013; U.S. Pat. No. 9,561,905 issued on Feb. 7, 2017; U.S. Pat. No. 8,965,619 issued on Feb. 24, 2015; U.S. Pat. No. 8,696,010 issued on Apr. 15, 2014; U.S. Pat. No. 9,187,244 issued on Nov. 17, 2015; U.S. patent application Ser. No. 13/326,952 filed on Dec. 15, 2011; U.S. Pat. No. 9,499,338 on Nov. 22, 2106; U.S. patent application Ser. No. 14/486,008 filed on Sep. 15, 2014; and U.S. Pat. No. 9,850,079 issued on Dec. 26, 2017, the disclosures of which are incorporated by reference herein in their entireties. Other suitable examples of bots, e.g., for use on deterministic transfer decks, can be found in U.S. Pat. No. 4,459,078 issued on Jul. 10, 1984; U.S. Pat. No. 5,370,492 issued on Dec. 6, 1994; and U.S. Pat. No. 8,974,168 issued on Mar. 10, 2015, the disclosures of which have previously been incorporated herein by reference in their entireties. The bots 110 (described in greater detail below) may be configured to place case units, such as the above described retail merchandise, into picking stock in the one or more levels of the storage structure 130 and then selectively retrieve ordered case units. As may be realized, in one aspect, the array of level asynchronous transport axes X and Y (e.g. pickface/case transport axes) of the storage array are defined by the picking aisles 130A, at least one transfer deck 130B, the bot 110 and the extendable end effector (as described herein) of the bot 110 (and in other aspects the extendable end effector of the lifts 150 also, at least in part, defines the asynchronous Y transport axis). The pickfaces/case units are transported between an inbound section of the storage and retrieval system 100, where pickfaces inbound to the array are generated (such as, for example, input station 160IN) and a load fill section of the storage and retrieval system 100 (such as for example, output station 160UT), where outbound pickfaces from the array are arranged to fill a load in accordance with a predetermined load fill order sequence of mixed cases.

As will be described herein, the transport of mixed case(s)/pickfaces coincident with transport on at least one of (or in other aspects on at least one of each of the more than one of) the array of level asynchronous transport axes X and Y is based on an infeed order sequence 173 (FIG. 1A) to the lifting transport system 500 (FIGS. 1A and 5) that may be freely selected based any suitable optimization strategy of one or more transactions of the respective asynchronous level transport system 191, a desired optimal transaction/action (e.g., pickface and/or traverse along one or more level asynchronous transport axes X and Y), a distribution of case unit(s) within the storage structure 130 (e.g., on each storage level 130L, one or more desired levels, and/or a desired portion of one or more storage levels 130L), availability of a bot 110, and/or an availability of a lift 150. Different (or common) optimization strategy(ies) may be applied to the transactions/actions of one or more asynchronous level transport systems 191 (or portions of one or more asynchronous level transport systems 191) by, for example, control server 120. The optimization strategy(ies) include, but are not limited to, a time optimal strategy favoring minimum times from pick aisle rack to lift infeed and/or load balancing across a level(s) (or portion(s) of the level(s)) so that the transaction rate at desired section of the level(s) (or portion(s) of the level(s)) is distributed substantially constant for the given transaction (e.g., bot pick/places per hour) and, for example, approaching high (e.g., over 1000 transaction per hour for 40 bots per level) throughput rates at the level(s) (or portion(s) of a level(s)). Moreover, different optimization strategies may be applied along or in combination at different levels 130L or within on or more portions of a common level 130L.

The infeed order sequence 173 forms an inferior ordered sequence of mixed cases 170 (FIG. 1A—e.g., inferior sequencing in sequence order) relative to the predetermined case out ordered sequence of mixed cases 172. As will also be described below, the resequencing of mixed case pickfaces coincident with the transport and output of the mixed case pickfaces by the lifting transport system 500 is decoupled from the transport of mixed case(s)/pickfaces by the array of level asynchronous transport axes X and Y, and where the ordered sequence of mixed cases 171 forms a superior ordered sequence of mixed cases 171S (FIG. 1A—e.g., a superior sequencing in sequence order) relative to the predetermined case out ordered sequence of mixed cases 172 (and the inferior ordered sequence of mixed cases 170 provided by the array of level asynchronous transport axes X and Y).

The bots 110, lift modules 150 and other suitable features of the storage and retrieval system 100 are controlled in any suitable manner such as by, for example, one or more central system control computers or computing environment (e.g. referred to as a "control server") 120 through, for example, any suitable network 180. The control server 120 may be any suitable computing environment that includes a server computer or any other system providing computing capability. In other aspects, the control server 120 may employ a plurality of computing devices that may be arranged, for example, in one or more server banks or computer banks or other arrangements. Such computing devices may be located in a single installation or may be distributed among one or more geographical locations. For example, the control server 120 may include a plurality of computing devices that together form a hosted computing resource, a grid computing resource and/or any other distributed computing arrangement. In some aspects, the control server 120 forms an elastic computing resource where the allotted processing, network, and storage capacities (or other computing resources) may change over time. In one aspect the network 180 is a wired network, a wireless network or a combination of wireless and wired networks using any suitable type and/or number of communication protocols. Examples of the network 180 include, but are not limited to, the Internet, intranets, extranets, wide area networks (WANs), local area networks (LANs), satellite networks, cable networks, Ethernet networks or any other suitable network configuration.

In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. In one aspect, the control server 120 may include, or have communicably coupled thereto, a number of component controllers 120S1-120Sn that receive commands from the control server 120 for managing operation of one or more components of the automated storage and retrieval system 100.

The control server 120 and/or component controllers 120S1-120Sn may, in one aspect, be configured to control the features of the storage and retrieval system in the manner described herein. For example, one or more of the component controllers 120S1-120Sn may be responsible for assigning tasks to a respective one or more of the independent lift axis 150X1-150Xn (based on, e.g., commands received from the control server 120) so that each lift axis 150X1-150Xn, individually or collectively, output mixed case units at a common output of the lift axes 150X1-150Xn where the output case units have superior ordered sequence of mixed cases 171S in accordance to a predetermined superior case out ordered sequence of mixed cases as described herein. One or more other component controllers 120S1-120Sn may be responsible for assigning tasks to a respective level 130L of the asynchronous level transport system 191 for controlling the respective level asynchronous transport axes X and Y for supplying an inferior ordered sequence of mixed cases 170 to the independent lift axis(es) (150X1-150Xn) as described herein.

Here the superior ordered sequence of mixed cases 171S is effected through control of each lift axis 150X1-150Xn by one or more of one or more of the control server 120 and the respective component controller 120S1-120Sn. In one aspect, the control server 120 may include one or more models 125 of the storage and retrieval system 100 and/or the components (e.g., lift axes 150X1-150Xn, asynchronous level transport system(s) 191, etc.), where the one or more models 125 model performance aspects, and constraints, of the storage and retrieval system components described herein. The one or more models may, at least in part, determine transport trajectories for case units throughout the storage and retrieval system that are effected by one or more of the component controllers 120S1-120Sn, so that the superior ordered sequence of mixed cases 171S is output at the common output of the lift axes 150X1-150Xn. The one or more models 125 may be updated, for example, via sensory and actuation data from the component controllers 120S1-120Sn, on a substantially real time bases, enabling an "on the fly" or in motus determination of optimum case unit transport solutions (e.g., accounting for receding planning horizon, level shutdown, autonomous vehicle failure, lift module shutdown, storage pick action failure, storage put/place action failure, or any other disturbances that would disrupt or otherwise affect storage and retrieval system operation) for generating the superior ordered sequence of mixed cases 171S over a predetermined time period.

Referring also to FIG. 1B the rack module array RMA of the storage structure 130 includes vertical support members 1212 and horizontal support members/rails 1200 that define the high density automated storage array as described herein. Rails 1200S may be mounted to one or more of the vertical and horizontal support members 1212, 1200 in, for example, picking aisles 130A and be configured so that the bots 110 ride along the rails 1200S through the picking aisles 130A. At least one side of at least one of the picking aisles 130A of at least one storage level 130L may have one or more storage shelves (e.g. formed by rails 1210, 1200 and slats 1210S or other suitable case supports) provided at differing heights so as to form multiple shelf levels 130LS1-130LS4 between the storage or deck levels 130L defined by the transfer decks 130B (and the rails 1200S which form an aisle deck). Accordingly, there are multiple rack shelf levels 130LS1-130LS4, corresponding to each storage level 130L, extending along one or more picking aisles 130A communicating with the transfer deck 130B of the respective storage level 130L. As may be realized, the multiple rack shelf levels 130LS1-130LS4 effect each storage level 130L having stacks of stored case units (or case layers) that are accessible from a common deck (e.g., formed by the rails 1200S) of a respective storage level 130L (e.g. the stacks of stored cases are located between storage levels).

As may be realized, bots 110 traversing a picking aisle 130A, at a corresponding storage level 130L, have access (e.g. for picking and placing case units) to each storage space 130S that is available on each shelf level 130LS1-130LS4, where each shelf level 130LS1-130LS4 is located between adjacent vertically stacked storage levels 130L on one or more side(s) PAS1, PAS2 (see e.g. FIG. 3) of the picking aisle 130A. As noted above, each of the storage shelf levels 130LS1-130LS4 is accessible by the bot 110 from the rails 1200S (e.g. from a common picking aisle deck formed by the rails 1200S that corresponds with a transfer deck 130B on a respective storage level 130L). As can be seen in FIG. 1B there are one or more intermediate shelf rails 1210 vertically spaced (e.g. in the Z direction) from one another (and from rails 1200S) to form multiple stacked storage spaces 130S each being accessible by the bot 110 from the common rails 1200S. As may be realized, the horizontal support members 1200 also form shelf rails (in addition to shelf rails 1210) on which case units are placed.

In one aspect, each stacked shelf level 130LS1-130LS4 (and/or each single shelf level as described below) of a corresponding storage level 130L defines an open and undeterministic two dimensional storage surface (e.g. having a case unit support plane CUSP as shown in FIG. 1B) that facilitates a dynamic allocation of pickfaces both longitudinally (e.g. along a length of the aisle or coincident with a path of bot travel defined by the picking aisle) and laterally (e.g. with respect to rack depth, transverse to the aisle or the path of bot travel). Dynamic allocation of the pickfaces and case units that make up the pickfaces is provided, for example, in the manner described in U.S. Pat. No. 8,594,835 issued on Nov. 26, 2013, the disclosure of which is incorporated by reference herein in its entirety. For example, the controller, such as control server 120 monitors the case units stored on the shelves and the empty spaces or storage locations between the case units. The empty storage locations are dynamically allocated such that, for exemplary purposes only, one case having a first size is replaced by three cases each having a second size which when combined fits into the space previously reserved for the first size case, or vice versa. Dynamic allocation substantially continuously resizes the empty storage locations as case units are placed on and removed from the storage shelves (e.g. the storage locations do not have a predetermined size and/or location on the storage shelves). As such, case unit (or tote) pickfaces of variable lengths and widths are positioned at each two dimensional storage location on the storage shelves (e.g. on each storage shelf level 130LS1-130LS4) with minimum gaps G (e.g. that effect picking/placing of case units free from contact with other case units stored on the shelves, see FIG. 1B) between adjacent stored case units/storage spaces.

As described above, the spacing between the rails 1200, 1210 (e.g. storage shelves) is a variable spacing so as to minimize (e.g. provide only sufficient clearance for insertion and removal of case units from a respective storage location) the vertical gap VG between vertically stacked case units. As will be described below (e.g., with respect to sections SECA, SECB in, e.g., FIGS. 1B and 3), in one aspect the vertical spacing between rails 1200, 1210 varies along a length of a respective picking aisle 130A while in other aspects the spacing between rails or horizontal support members 1200, 1210 may be substantially continuous along a picking aisle 130A. As may be realized and as described in greater detail below, the spacing between the rails 1200, 1210 on one side PAS1 (FIG. 3) of a picking aisle 130A may be different than the spacing between rails 1200, 1210 on an opposite side PAS2 (FIG. 3) of the same picking aisle 130A. As may be realized, any suitable number of shelves 1210 may be provided between the decks/rails 1200S of adjacent vertically stacked storage levels 130L where the shelves have the same or differing pitches between the shelves (e.g., case units located in a vertical stack on one side of the picking aisle and case units located in a vertical stack on an opposite side of the picking aisle on storage shelves having a substantially similar or different pitches).

In one aspect of the disclosed embodiment, referring to FIG. 1B, a vertical pitch between rack shelf levels 130LS1-130LS4 (that corresponds to each storage level 130L) is varied so that a height Z1A-Z1E between the shelves is different, rather than equal to, for example, minimize a vertical gap VG between an upper or top surface CUTS of a case unit CU and a bottom of the storage shelf (e.g., formed by rails 1200, 1210) located directly above the case unit. As can be seen in FIG. 1B, minimizing the gaps G, VG in both the horizontal and vertical directions results in a densely packed case unit arrangement within the storage shelves so as to form the high density three dimensional rack array RMA where, for example, the high density multi-level shelving aisles increases throughput along the X throughput axis and enables an ordered/sorted (e.g. according to the predetermined load out sequence) multi-pick of two or more case units from a common picking aisle in one common pass of the picking aisle as will be described below. For example, still referring to FIG. 1B, one section SECB of the storage level 130L includes two storage shelves (e.g., formed by rails 1200, 1210) where one shelf has a pitch of Z1A and the other shelf has a pitch of Z1B where Z1A and Z1B are different from each other. This differing pitch allows for the placement of case units CUD, CUE having differing heights in a stack one above the other on a common storage level 130L. In other aspects pitches Z1A, Z1B may be substantially the same. In this aspect the storage level 130L includes another storage section SECA that has three storage shelves where one shelf has a pitch of Z1E, one storage shelf has a pitch of Z1D and the other storage shelf has a pitch of Z1C where Z1E, Z1D and Z1C are different from each other. In other aspects at least two of the pitches Z1E, Z1D and Z1C are substantially the same. In one aspect the pitch between the shelves is arranged so that larger and/or heavier case units CUC, CUE are arranged closer to the deck/rail 1200S than smaller and/or lighter case units CUD, CUA, CUB. In other aspects the pitch between the shelves is arranged so that the case units are arranged in any suitable positions that may or may not be related to case unit size and weight.

In other aspects, the vertical pitch between at least some of the rack shelves is the same so that the height Z1A-Z1E between at least some shelves is equal while the vertical pitch between other shelves is different. In still other aspects, the pitch of rack shelf levels 130LS1-130LS4 on one storage level is a constant pitch (e.g. the rack shelf levels are substantially equally spaced in the Z direction) while the pitch of rack shelf levels 130LS1-130LS4 on a different storage level is a different constant pitch.

In one aspect, the storage space(s) 130S defined by the storage shelf levels 130LS1-130LS4 between the storage or deck levels 130L accommodates case units of different heights, lengths, widths and/or weights at the different shelf levels 130LS1-130LS4 as described in, for example, U.S. Pat. No. 9,884,719 issued on Feb. 6, 2018, the disclosure of which is incorporated by reference herein in its entirety. For example, still referring to FIG. 1B the storage level 130L includes storage sections having at least one intermediate shelf 1210. In the example shown, one storage section includes one intermediate shelf/rail 1210 while another storage section includes two intermediate shelves/rail 1210 for forming shelf levels 130LS1-130LS4. In one aspect the pitch Z1 between storage levels 130L may be any suitable pitch such as, for example, about 32 inches to about 34 inches while in other aspects the pitch may be more than about 34 inches and/or less than about 32 inches. Any suitable number of shelves may be provided between the decks/rails 1200S of adjacent vertically stacked storage levels 130L where the shelves have the same or differing pitches between the shelves.

In one aspect of the disclosed embodiment the storage or deck levels 130L (e.g. the surface on which the bots 110 travel) are arranged at any suitable predetermined pitch Z1 that is not, for example, an integer multiple of the intermediate shelf pitch(es) Z1A-Z1E. In other aspects the pitch Z1 may be an integer multiple of the intermediate shelf pitch, such as for example, the shelf pitch may be substantially equal to the pitch Z1 so that the corresponding storage space has a height substantially equal to the pitch Z1. As may be realized, the shelf pitch Z1A-Z1E is substantially decoupled from the storage level 130L pitch Z1 and corresponds to general case unit heights as illustrated in FIG. 1B. In one aspect of the disclosed embodiment case units of different heights are dynamically allocated or otherwise distributed along each aisle within a storage space 130S having a shelf height commensurate with the case unit height. The remaining space between the storage levels 130L, both along the length of the aisle coincident with the stored case unit (e.g. in the X direction with respect to the rack frame of reference REF2 (see, e.g., FIG. 3) where the X direction is the same in the bot frame of reference REF (see, e.g., FIGS. 2A and 2B) as the bot travels through a picking aisle 130A) and alongside the stored case unit, being freely usable for dynamic allocation for cases of a corresponding height. As may be realized, the dynamic allocation of case units having different heights onto shelves having different pitches provides for stored case layers of different heights, between storage levels 130L on both sides of each picking aisle 130A, with each case unit being dynamically distributed along a common picking aisle 130A so that each case unit within each stored case layer being independently accessible (e.g. for picking/placing) by the bot in the common aisle. This high density placement/allocation of case units and the arrangement of the storage shelves provides maximum efficiency of storage space/volume use between the storage levels 130L, and hence of maximum efficiency of the rack module array RMA, with optimized distribution of case unit SKU's, as each aisle length may include multiple case units of different heights, yet each rack shelf at each shelf level may be filled by dynamic allocation/distribution (e.g. to fill the three dimensional rack module array RMA space in length, width and height, to provide a high density storage array).

In one aspect, referring to FIGS. 1C and 2B each of the storage levels 130L includes a single level of storage shelves to store a single level of case units (e.g. each storage level includes a single case unit support plane CUSP) and the bots 110 are configured to transfer case units to and from the storage shelves of the respective storage level 130L. For example, the bot 110' illustrated in FIG. 2B is substantially similar to bot 110 described herein however, the bot 110' is not provided with sufficient Z-travel of the transfer arm 110PA for placing case units on the multiple storage shelf levels 130LS1-130LS4 (e.g. accessible from a common rail 1200S as shown in, e.g., FIG. 1B) as described above. Here the transfer arm drive 250 (which may be substantially similar to one or more of drive 250A, 250B) includes only sufficient Z-travel for lifting the case units from the case unit support plane CUSP of the single level of storage shelves, for transferring the case units to and from the payload area 110PL and for transferring the case units between the fingers 273 of the transfer arm 110PA and the payload bed 110PB. Suitable examples of bots 110' can be found in, for example, U.S. Pat. No. 9,499,338 issued on Nov. 22, 2106, the disclosure of which is incorporated herein by reference in its entirety.

In one aspect of the disclosed embodiment, referring also to FIG. 3, the rack shelves 1210 (inclusive of the rack shelf formed by rail 1200) are sectioned SECA, SECB longitudinally (e.g. along the length of the picking aisle 130A in the X direction, with respect to a storage structure frame of reference REF2) to form ordered or otherwise matched rack shelf sections along each picking aisle 130A. The aisle shelf sections SECA, SECB are ordered/matched to each other based on, for example, a pick sequence of a bot 110 traversing the aisle in a common pass picking case units destined for a common order fill (e.g. based on the order out sequence). In other words, a bot 110 makes a single pass (e.g. traversal in a single direction) down a single or common picking aisle while picking one or more case units from aisle shelf sections SECA, SECB on a common side of the picking aisle 130A to build a pickface on the bot 110 where the pickface includes case units that are arranged on the bot according to, for example, the infeed order sequence 173 (FIG. 1A) to the lifting transport system 500. Each of the aisle rack sections SECA, SECB includes intermediate shelves in the manner described above. In other aspects some of the aisle shelves do not include intermediate shelves while others do include intermediate shelves.

In one aspect, the ordered aisle rack sections SECA, SECB include shelf pitches that are different between sections SECA, SECB. For example, aisle rack section SECA has shelves with one or more pitches while aisle rack section SECB has shelves with one or more different pitches (e.g. different than the pitches of the shelves in section SECA). In accordance with the aspects of the disclosed embodiment, the pitch of at least one intermediate shelf of one aisle rack section SECA, SECB is related to the pitch of at least one intermediate shelf of another of the ordered aisle rack sections SECA, SECB of the common picking aisle 130A. The different pitches of the intermediate shelves/rails 1210 in the ordered aisle rack section SECA, SECB are selected so as to be related and to effect multiple (at least two) ordered picks (i.e. picks in an ordered sequence) with a bot 110, in accordance with a mixed SKU load out sequence (e.g. palletizing to a common pallet load), from shelves of different pitches, from a common pass of a common picking aisle 130A. As may be realized, the mixed load output from the storage and retrieval system 100 (e.g. to fill a truck loadport/pallet load) is sequenced in a predetermined order according to various load out picking aisles (e.g. aisles from which case units are picked for transfer to an outgoing pallet) and the shelf pitch in the ordered sections SECA, SECB facilitates a bot 110 pick of more than one case unit in ordered sequence according to an order of the load out sequence in a common picking aisle pass (e.g. more than one case unit is picked in a predetermined order from a common picking aisle in one pass of the common picking aisle). The different aisle shelf pitches of the ordered rack sections SECA, SECB are so related to increase the probability of such an ordered multi-pick (the picking of two or more case units from a single aisle with a single pass of the aisle as described above) so that the multi-pick is performed by each bot order fulfillment pass along each aisle, and so related such that more than a majority of cases picked in the storage and retrieval system 100 by the bots 110 and destined for a common load out (e.g. a common pallet load) are picked by a common bot 110 according to the infeed order sequence 173 to the lifting transport system 500 (e.g. the two or more cases picked by the bot 110 are picked from the same picking aisle in a single pass, e.g. the bot travels in a single direction once through the picking aisle). As may be realized, in one aspect of the disclosed embodiment both sides PAS1, PAS2 of the picking aisle 130A have ordered aisle rack sections SECA, SECB where one ordered section may be matched with one or more sections on the same side PAS1, PAS2 of the common picking aisle 130A. As may be realized, the matched aisle rack sections may be located adjacent one another or spaced apart from one another along the picking aisle 130A.

Referring again to FIG. 3 each transfer deck or storage level 130L includes one or more lift pickface interface/handoff stations TS (referred to herein as interface stations TS) where case unit(s) (of single or combined case pickfaces) or totes are transferred between the lift load handling devices LHD and bots 110 on the transfer deck 130B. The interface stations TS are located at a side of the transfer deck 130B opposite the picking aisles 130A and rack modules RM, so that the transfer deck 130B is interposed between the picking aisles and each interface station TS. As noted above, each bot 110 on each picking level 130L has access to each storage location 130S, each picking aisle 130A and each lift 150 on the respective storage level 130L, as such each bot 110 also has access to each interface station TS on the respective level 130L. In one aspect the interface stations are offset from high speed bot travel paths HSTP along the transfer deck 130B so that bot 110 access to the interface stations TS is undeterministic to bot speed on the high speed travel paths HSTP. As such, each bot 110 can move a case unit(s) (or pickface, e.g. one or more cases, built by the bot) from every interface station TS to every storage space 130S corresponding to the deck level and vice versa.

Figure 6A:
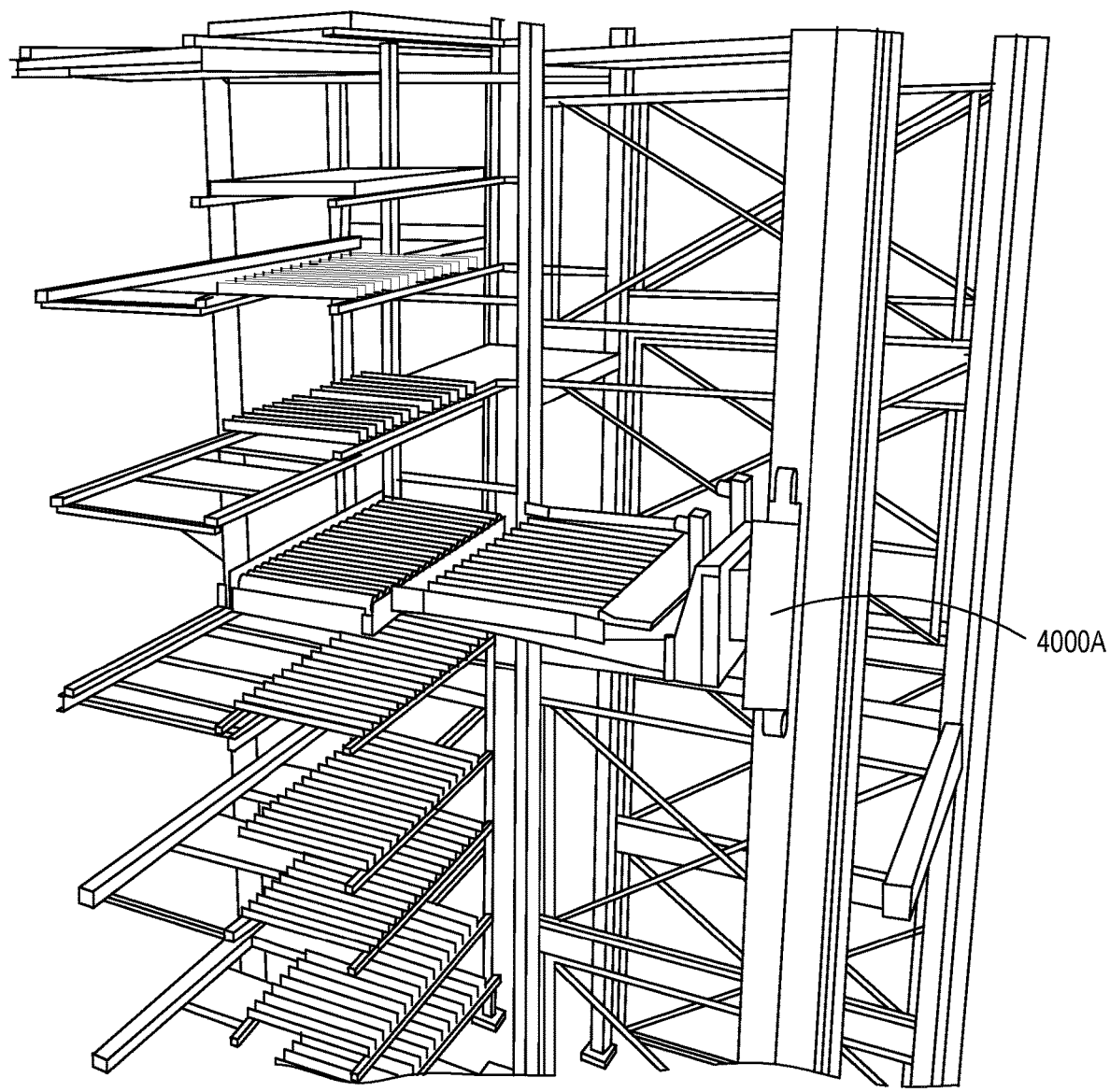
FIGS. 6A and 6B are schematic illustrations of portions of the storage and retrieval system in accordance with aspects of the disclosed embodiment.

In one aspect the interface stations TS are configured for a passive transfer (e.g. handoff) of case units (and/or pickfaces) between the bot 110 and the load handing devices LHD of the lifts 150 (e.g. the interface stations TS have no moving parts for transporting the case units) which will be described in greater detail below. For example, also referring to FIG. 6C the interface stations TS and/or buffer stations BS include one or more stacked levels TL1, TL2 of transfer rack shelves RTS (e.g. so as to take advantage of the lifting ability of the bot 110 with respect to the stacked rack shelves RTS) which in one aspect are substantially similar to the storage shelves described above (e.g. each being formed by rails 1210, 1200 and slats 1210S, or other suitable case unit support structure) such that bot 110 handoff (e.g. pick and place) occurs in a passive manner substantially similar to that between the bot 110 and the storage spaces 130S (as described herein) where the case units or totes are transferred to and from the shelves. In one aspect the buffer stations BS on one or more of the stacked levels TL1, TL2 also serve as a handoff/interface station with respect to the load handling device LHD of the lift 150. In one aspect, where the bots, such as bots 110', are configured for the transfer of case units to a single level 130L of storage shelves, the interface stations TS and/or buffer stations BS also include a single level of transfer rack shelves (which are substantially similar to the storage rack shelves of the storage levels 130L described above with respect to, for example, FIG. 1C). As may be realized, operation of the storage and retrieval system with bots 110' serving the single level storage and transfer shelves is substantially similar to that described herein. As may also be realized, load handling device LHD handoff (e.g. pick and place) of case units (e.g. individual case units or pickfaces) and totes to the stacked rack shelves RTS (and/or the single level rack shelves) occurs in a passive manner substantially similar to that between the bot 110 and the storage spaces 130S (as described herein) where the case units or totes are transferred to and from the shelves. In other aspects the shelves may include transfer arms (substantially similar to the bot 110 transfer arm 110PA shown in FIGS. 2A and/or 2B, although Z direction movement may be omitted when the transfer arm is incorporated into the interface station TS shelves) for picking and placing case units or totes from one or more of the bot 110 and load handling device LHD of the lift 150. Suitable examples of an interface station with an active transfer arm are described in, for example, U.S. Pat. No. 9,694,975 issued on Jul. 4, 2017, the disclosure of which is incorporated by reference herein in its entirety.

In one aspect, the location of the bot 110 relative to the interface stations TS occurs in a manner substantially similar to bot location relative to the storage spaces 130S. For example, in one aspect, location of the bot 110 relative to the storage spaces 130S and the interface stations TS occurs in a manner substantially similar to that described in U.S. Pat. No. 9,008,884 issued on Apr. 14, 2015 and U.S. Pat. No. 8,954,188 issued on Feb. 10, 2015, the disclosures of which are incorporated herein by reference in their entireties. For example, referring to FIGS. 1A and 1C, the bot 110 includes one or more sensors 110S that detect the slats 1210S or a locating feature 130F (such as an aperture, reflective surface, RFID tag, etc.) disposed on/in the rail 1200S. The slats 1210S and/or locating features 130F are arranged so as to identify a location of the bot 110 within the storage and retrieval system, relative to e.g. the storages spaces and/or interface stations TS. In one aspect the bot 110 includes a controller 110C that, for example, counts the slats 1210S to at least in part determine a location of the bot 110 within the storage and retrieval system 100. In other aspects the location features 130F may be arranged so as to form an absolute or incremental encoder which when detected by the bot 110 provides for a bot 110 location determination within the storage and retrieval system 100.

Figure 6B:
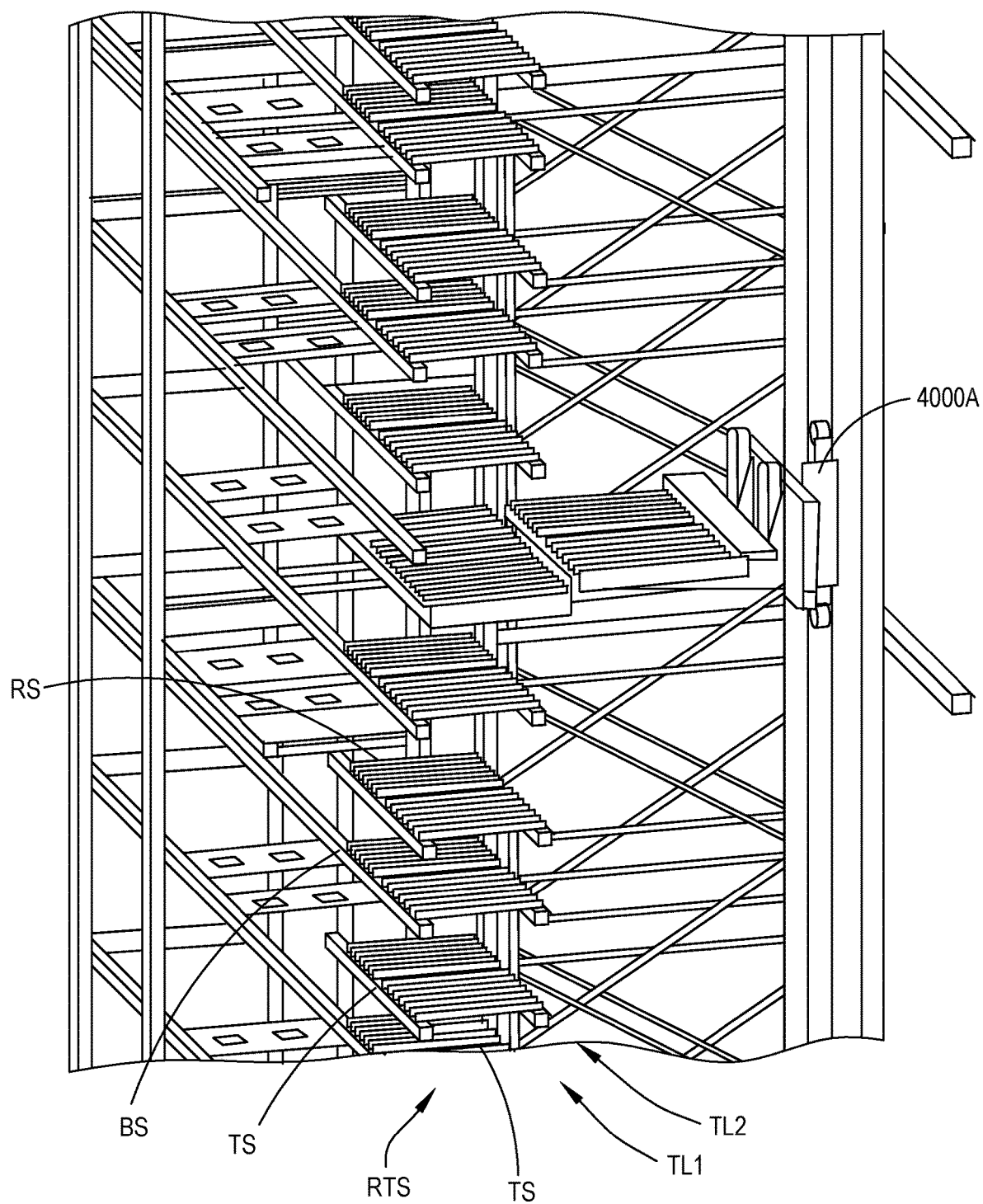

As may be realized, referring to FIGS. 3 and 6B, the transfer rack shelves RTS at each interface/handoff station TS, in one aspect, define multi-load stations (e.g. having one or more storage case unit holding locations for holding a corresponding number of case units or totes) on a common transfer rack shelf RS. As noted above, each load of the multi-load station is a single case unit/tote or a multi-case pickface (e.g. having multiple case units/totes that are moved as a single unit) that is picked and paced by either the bot or load handling device LHD. As may also be realized, the bot location described above allows for the bot 110 to position itself relative to the multi-load stations for picking and placing the case units/totes and pickfaces from a predetermined one of the holding locations of the multi-load station. The interface/handoff stations TS define multi-place buffers (e.g. buffers having one or more case holding location—see FIG. 5C—arranged along, for example, the X axis of the bot 110 as the bot 110 interfaces with the interface station TS) where inbound and/or outbound case units/totes and pickfaces are temporarily stored when being transferred between the bots 110 and the load handling devices LHD of the lifts 150.

In one aspect one or more peripheral buffer/handoff stations BS (substantially similar to the interface stations TS and referred to herein as buffer stations BS) are also located at the side of the transfer deck 130B opposite the picking aisles 130A and rack modules RM, so that the transfer deck 130B is interposed between the picking aisles and each buffer station BS. The peripheral buffer stations BS are interspersed between or, in one aspect as shown in FIG. 3, otherwise in line with the interface stations TS. In one aspect the peripheral buffer stations BS are formed by rails 1210, 1200 and slats 1210S and are a continuation of (but a separate section of) the interface stations TS (e.g. the interface stations and the peripheral buffer stations are formed by common rails 1210, 1200). As such, the peripheral buffer stations BS, in one aspect, also include one or more stacked levels TL1, TL2 of transfer rack shelves RTS as described above with respect to the interface stations TS while in other aspects the buffer stations include a single level of transfer rack shelves. The peripheral buffer stations BS define buffers where case units/totes and/or pickfaces are temporarily stored when being transferred from one bot 110 to another different bot 110 on the same storage level 130L as will be described in greater detail below. As maybe realized, in one aspect the peripheral buffer stations are located at any suitable location of the storage and retrieval system including within the picking aisles 130A and anywhere along the transfer deck 130B.

Still referring to FIGS. 3 and 6B in one aspect the interface stations TS are arranged along the transfer deck 130B in a manner akin to parking spaces on the side of a road such that the bots 110 "parallel park" at a predetermined interface station TS for transferring case units to and from one or more shelves RTS at one or more levels TL1, TL2 of the interface station TS. In one aspect, a transfer orientation of the bots 110 (e.g. when parallel parked) at an interface station TS is the same orientation as when the bot 110 is travelling along the high speed bot transport path HSTP (e.g. the interface station is substantially parallel with a bot travel direction of the transfer deck and/or a side of the transfer deck on which the lifts 150 are located). Bot 110 interface with the peripheral buffer stations BS also occurs by parallel parking so that a transfer orientation of the bots 110 (e.g. when parallel parked) at a peripheral buffer station BS is the same orientation as when the bot 110 is travelling along the high speed bot transport path HSTP.

The outbound lifts 150B in FIG. 3 are representative of the lifting and transport system 500 where the outbound lifts 150B have a common output 300 that is supplied case units from a traverse 550, as described herein. The common output 300 may form or be connected to one or more conveyor sections 160CBT, 160CBL, 160CBR for transporting the case units output by the lifting and transport system 500 to one or more sides of palletizer 160PB. In another aspect, one or more of the outbound lifts 150B may be representative of a lifting and transport system 500 such that a plurality of lifting and transport systems 500 are disposed along the transfer deck 130B. Here each respective lifting and transport system 500 may have a common output 300' that is coupled to, for example, the conveyor section 160CBT for transporting case units to one or more of conveyors sections 160CBR, 160CBL (e.g., to one or more sides of the palletizer 160PB). The conveyor section 160CBT may be bidirectional so that case units can be transferred between the plurality of lifting and transport systems 500.

Figure 4A:
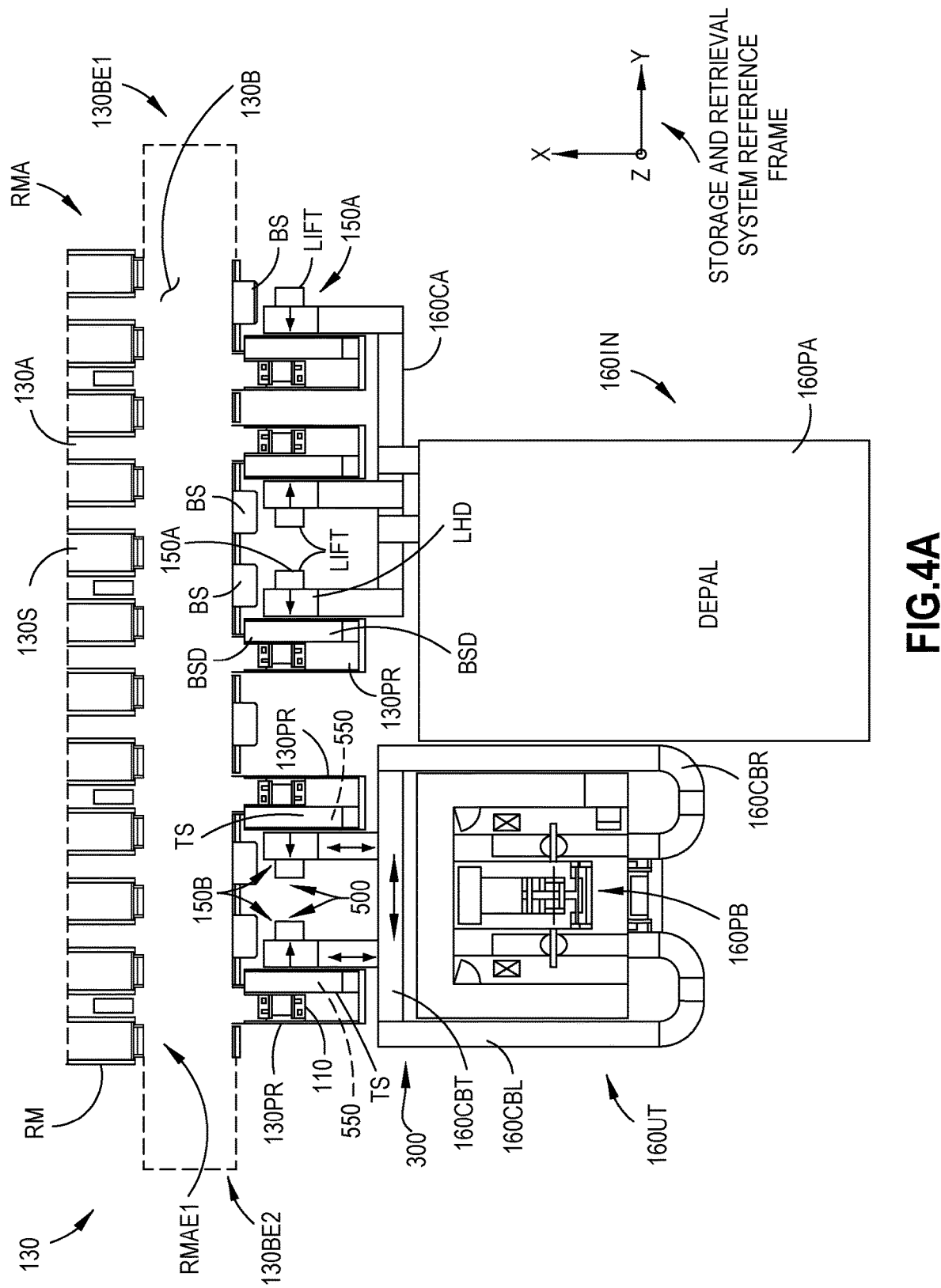
FIG. 4A is a schematic illustration of a portion of the storage and retrieval system in accordance with aspects of the disclosed embodiment.

In another aspect, referring to FIG. 4A, at least the interface stations TS are located on an extension portion or pier 130PR that extends from the transfer deck 130B. In one aspect, the pier 130PR is similar to the picking aisles where the bot 110 travels along rails 1200S affixed to horizontal support members 1200 (in a manner substantially similar to that described above). In other aspects, the travel surface of the pier 130PR may be substantially similar to that of the transfer deck 130B. Each pier 130PR is located at the side of the transfer deck 130B, such as a side that is opposite the picking aisles 130A and rack modules RM, so that the transfer deck 130B is interposed between the picking aisles and each pier 130PR. The pier(s) 130PR extends from the transfer deck at a non-zero angle relative to at least a portion of the high speed bot transport path HSTP. In other aspects the pier(s) 130PR extend from any suitable portion of the transfer deck 130B including the ends 130BE1, 130BE2 of the transfer deck 130B. As may be realized, peripheral buffer stations BSD (substantially similar to peripheral buffers stations BS described above) may also be located at least along a portion of the pier 130PR.

As can be seen in FIG. 4A, lifts 150 (outbound lift modules 150B and inbound lift modules 150A) are disposed adjacent respective piers 130PR in a manner similar to that described herein where the lifts 150 are disposed adjacent the transfer stations TS and buffer stations BS of the transfer deck 130B (see, e.g., FIGS. 3 and 5A). In FIG. 4A, a single representative lift 150A, 150B is illustrated adjacent each pier 130PR; however, it should be understood that the single representative lift 150A, 150B may be representative of one or more lifts 150. In particular, one or more of the single representative outbound lifts 150B may be representative of the lifting transport system 500 described herein. In this aspect, the common output 300 includes one or more conveyor sections 160CBT, 160CBR, 160CBL, where at least one of the conveyors sections is bidirectional. For example, conveyor section 160CBT may be bidirectional so as to transfer case units to either one of conveyors sections 160CBL, 160CBR (e.g., to either side of the palletizer 160PB) and/or to transfer case units between lifting and transport systems 500 connected to the conveyor section 160CBT to effect resequencing of case units to the (superior) ordered sequence of mixed cases 171 in the manner described herein. In other aspects, such as where a single outbound lift 150B is disposed at a pier 130PR, the conveyor section 160CBT may function as the traverse 550 so that case units can be transferred between outbound conveyors 150B of the piers 130PR to effect resequencing of case units to the (superior) ordered sequence of mixed cases 171 in the manner described herein. In still other aspects, there may be a plurality of lifting and transport sections 500 disposed on a common side of a common pier 130PR (e.g., one or more of the single representative outbound lifts 150B may be representative of a plurality of lifting and transport sections 500) in a manner substantially similar to that described above with respect to FIG. 3 where the plurality of lifting and transport sections 500 are disposed along the transfer deck 130B.

Figure 4B:
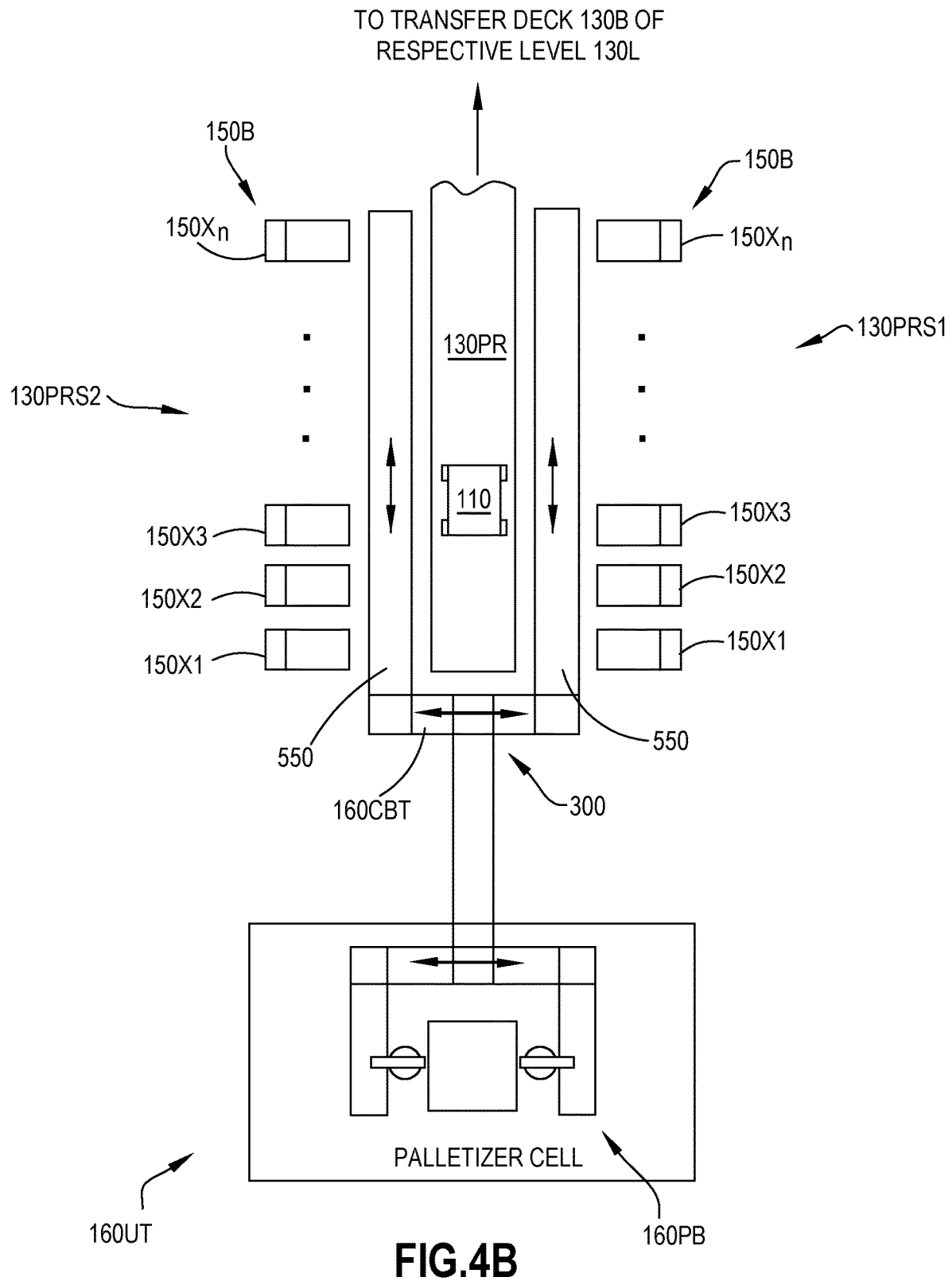
FIG. 4B is a schematic illustration of a portion of the storage and retrieval system in accordance with aspects of the disclosed embodiment.

While FIG. 4A illustrates the lifting and transport systems 500 on a single side of a respective pier 130PR, in other aspects there may be a lifting and transport system 500 disposed on opposite sides of the pier 130PR as illustrated in FIG. 4B. In FIG. 4B, the common output 300 includes conveyor section 160CBT. The conveyor section 160CBT may be bidirectional so as to transport case units between the lifting and transport systems 500 disposed on the opposite sides of the pier 130PR. As may be realized, where case units are transferred between lifting and transport systems 500, the traverse 550 of the respective lifting and transport system 500 may be bidirectional so as to transport the case units to any one or more of the lift axes 150X1-150Xn of the respective lifting and transport system 500 for resequencing the case units as described herein.

Referring now to FIGS. 5A, 5B, 5C, 6A, and 6B, as described above, in one aspect the interface stations TS are passive stations and as such the load transfer device LHD of the lifts 150 have one or more active transfer arm or pick head 4000A. In one aspect the inbound lift modules 150A and the outbound lift modules 150B may have different types of pick heads while in other aspects the inbound lift modules 150A and the outbound lift modules 150B have the same type of pick head as described in, for example, U.S. Pat. No. 9,856,083 issued on Jan. 2, 2018 (U.S. application Ser. No. 14/997,920), the disclosure of which is incorporated herein by reference in its entirety. In one aspect, the one or more pick head 4000A of the lifts 150 may, at least in part, define the asynchronous transport axis Y, while in other aspects, the Y direction movement of the one or more pick head 4000A may be separate and distinct from the asynchronous transport axis Y.

In one aspect, the lifts 150 (e.g., both the inbound and outbound lifts 150A, 150B) have a vertical mast 4002 along which a slide 4001 travels under the motive force of any suitable drive unit 4002D (e.g. connected to, for example, control server 120) configured to lift and lower the slide (and the one or more pick heads 4000A mounted thereto as well as any case units disposed on the one or more pick head 4000A). The lifts 150 include one or more pick head 4000A mounted to the slide 4001 so that as the slide moves vertically the one or more pick head 4000A moves vertically with the slide 4001. In the aspect illustrated in FIGS. 5A-5C the one or more pick head 4000A includes one or more tines or fingers 4273 mounted to a base member 4272. The base member 4272 is movably mounted to one or more rail 4360S of frame 4200 which in turn is mounted to the slide 4001. Any suitable drive unit 4005, such as a belt drive, chain drive, screw drive, gear drive, etc. (which is substantially similar in form but may not be similar in capacity to drive 4002D as the drive 4005 may be smaller than drive 4002D) is mounted to the frame 4200 and coupled to the base member 4272 for driving the base member 4272 (with the finger(s)) in the direction of arrow 4050. While a single pick head 4000A is illustrated in FIGS. 5A-6B, in other aspects there may be two or more independently pick head portions on a common lift 150 as described in U.S. Pat. No. 9,856, 083. In addition, while the one or more pick head 4000A is illustrated in FIGS. 5A-6B as being disposed on a single side of vertical mast 4002, in other aspects, a pick head 4000 (substantially similar to the one or more of pick head 4000A) may extend from an opposite side of the vertical mast 4002 than the one or more pick head 4000A. The pick head 4000 may be mounted to the same slide 4001 as the one or more pick head 4000A so as to move vertically along the vertical mast 4002 as a unit with the one or more pick head 4000A. In other aspects, the pick head 4000 may be mounted to a separate and distinct slide 4001A so that the pick heads 4000 and 4000A can each move individually vertically along the vertical mast 4002 independent of (e.g., separate from) each other. The opposingly extended pick heads may be employed where there are transfer stations TS (or buffer stations BS) disposed on opposite sides of the vertical mast 4002.

Figure 5D:
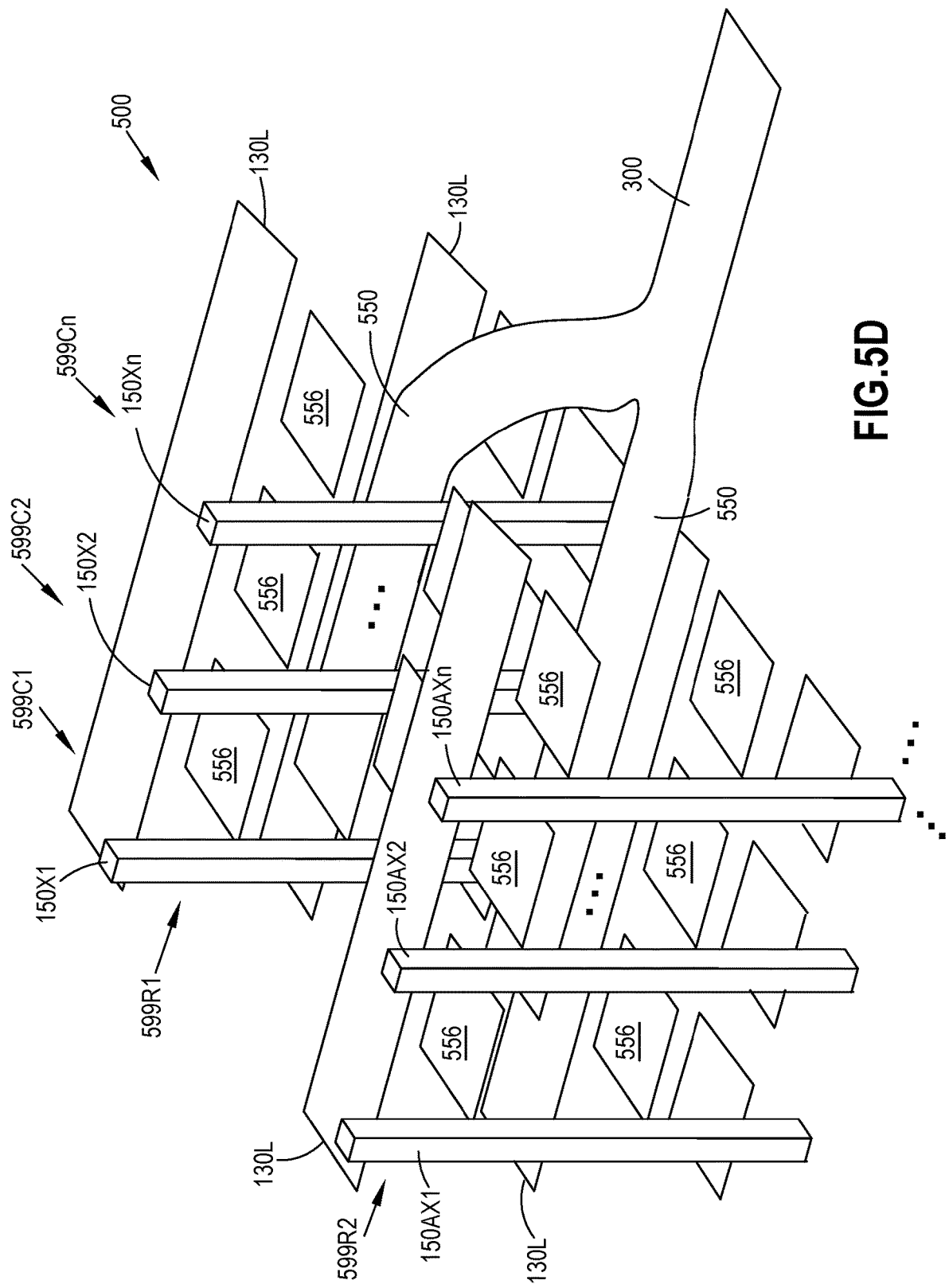

Referring to FIG. 5A, the lifts 150 (at least the outbound lifts 150B) are arranged adjacent one another (e.g., side by side substantially in a row) so as to form the lifting transport system 500 with the more than one independent lift axis 150X1-150Xn arrayed in at least one direction. In other aspects, as illustrated in FIG. 5D, the lifts 150 (at least the outbound lifts) are arranged in a two dimensional array of more than one independent lift axis so as to form the lifting transport system 500. Each row 599R1, 599R2 (two rows are shown for exemplary purposes but it should be understood that there may be any suitable number of rows) may include any suitable number of lifts 150X1-150Xn, 150AX1-150AXn and there may be any suitable number of columns 599C1-599Cn. As may be realized, at least a transport path for bots 110 (indicated by the level 130L in FIG. 5D) and different infeed stations 556 may be provided for each row 599R1, 599R2 of lifts 150. There may also be a traverse 550 corresponding to each row 599R1, 599R2 of lifts 150, where the traverse 550 of the different rows 599R1, 599R2 may merge into a common output 300. In other aspects, the traverse 550 of the different rows 599R1, 599R2 may not merger into a common output. An infeed interface 555 communicably couples the multi-level transport system 190 with each of the more than one independent lift axis 150X1-150Xn. The infeed interface 555 includes different infeed stations 556 (FIG. 5A) distributed at each asynchronous level transport system 191 for each of the more than one independent lift axis 150X1-150Xn (and/or 150AX1-150AXn) so that each of the more than one independent lift axis 150X1-150Xn (and/or 150AX1-150AXn) has a different corresponding infeed station 556 at each asynchronous level transport system 191 through which mixed cases feed from the multi-level transport system 190 to each of the more than one independent lift axis 150X1-150Xn (and/or 150AX1-150AXn).

Each of the independent lift axes 150X1-150Xn (it is noted that (lift axes 150AX1-150AXn are substantially similar to lift axes 150X1-150Xn and any description of lift axes 150X1-150Xn equally applies to lift axes 150AX1-150AXn) are communicably coupled to each asynchronous level transport system 191 (a portion of which is illustrated in FIG. 5), through the infeed interface 555, so as to provide for exchange of at least one case unit CU between each asynchronous level transport system 191 and each independent lift axis 150X1-150Xn. For example, each independent lift axis 150X1-150Xn is communicably coupled to each level asynchronous transport axis X and Y of the array of level asynchronous transport axes corresponding to each asynchronous level transport system 191. The communicable coupling between the independent lift axes 150X1-150Xn and each asynchronous level transport system 191 also provides for mixed cases being transferred from at least one asynchronous level transport system infeed (e.g., such as the infeed interface 555 (e.g., which includes a respective transfer station TS or respective buffer station BS) between an inbound lift 150A and a respective one of the levels 130L) to each of the more than one independent lift axis 150X1-150Xn so that mixed cases are output by the independent lift axis 150X1-150Xn from the multi-level transport system 190. In one aspect, the mixed cases are output substantially continuously through the common output 300 in a predetermined case out ordered sequence of mixed cases 172 decoupled from an available sequence of mixed cases (e.g., an infeed order sequence 173) from and created by the multi-level transport system 190 at the infeed interface 555 and that feed the more than one independent lift axis 150X1-150Xn through the infeed interface 555. The more than one independent lift axis 150X1-150Xn of the lifting transport system 500 define a lift transport stream 999 (see, e.g., FIGS. 8, 8B, 8C, 10, 10C, 12, and 12C) of mixed cases from the infeed interface 555, where the lift transport stream 800 has the available sequence of mixed cases (e.g., an infeed order sequence 173), to the common output 300 where the lift transport stream 800 has the predetermined case out ordered sequence of mixed cases 172, and at least one lift axis 150X1-150Xn from the more than one independent lift axis 150X1-150Xn defines a pass through or pass by (e.g., bypass) with respect to another of the more than one independent lift axis 150X1-150Xn effecting on the fly/in motus resequencing from the available sequence of mixed cases (e.g., an infeed order sequence 173) in the lift transport stream 999 to the predetermined case out ordered sequence of mixed cases 172 at the common output 300.

Each independent lift axis 150X1-150Xn, of the more than one lift axis 150X1-150Xn, is communicably coupled to each other independent lift axis 150X1-150Xn of the more than one lift axis 150X1-150Xn and forms or is otherwise communicably coupled to a common output 300 (see FIGS. 1A, 3, 4A, and 4B—also referred to as a common lift transport output) of mixed cases output by each of the more than one independent lift axis 150X1-150Xn. The more than one independent lift axis 150X1-150Xn commonly outputs the mixed cases from the lifting transport system 500 through the common output 300. For example, still referring to FIG. 5A, each independent lift axis 150X1-150Xn has a corresponding output section 520 and a traverse 550 operably connecting the corresponding output section 520 of each independent lift axis 150Xa-150Xn to the common output 300 so that mixed cases from each independent lift axis 150X1-150Xn reach the common output 300 via the traverse 550. As illustrated in FIG. 5A, the traverse 550 operably interconnects at least two of the independent lift axis 150X1-150Xn. As described herein, the traverse 550 is configured so as to form an alternate/bypass path for mixed cases transported and output by the more than one independent lift axis 150X1-150Xn of the lifting transport system 500 effecting resequencing, at least in part, from the inferior ordered sequence of mixed cases 170, at infeed of the lifting transport system 500, to the superior ordered sequence of mixed cases 171S, at output of the lifting transport system 500; where the inferior ordered sequence of mixed cases 170 and the superior ordered sequence of mixed cases 171S respectively are of inferior sequencing in sequence order and superior sequencing in sequence order relative to the predetermined case out ordered sequence of mixed cases 172.

The more than one lift axis 150X1-150Xn are configured so as to create, at and from the common output 300, an ordered sequence of mixed cases in accordance to a predetermined case out ordered sequence of mixed cases 172. As described in greater detail herein, the more than one independent lift axis 150X1-150Xn are configured so as to resequence the mixed case units (e.g., received from the asynchronous level transport system(s) 191) and effect a change in the ordered sequence of the mixed cases, with the lifting transport system 500 on the fly (in motus), from the inferior ordered sequence of mixed cases 170 (FIG. 1A), at the infeed (e.g., such as at the transfer stations TS or buffer stations BS of the outbound lifts 150B) of the lifting transport system 500, to the superior ordered sequence of mixed cases 171S (FIG. 1A), at the common output 300 of the lifting transport system 500. For example, in conjunction with or in lieu of alternate/bypass path for mixed cases formed by the traverse 550, at least one independent lift axis 150X1-150Xn is configured so as to form an alternate/bypass path for mixed cases transported and output by the more than one independent lift axis 150X1-150Xn of the lifting transport system 500 effecting resequencing, at least in part, from the inferior ordered sequence of mixed cases 170, at the infeed of the lifting transport system 500, to the superior ordered sequence of mixed cases 171S, at the output of the lifting transport system 500.

The superior ordered sequence of mixed cases 171S at the common output 300 is created on the traverse 550, and substantially within the bounds defined by the outermost independent lift axes (which as illustrated in FIG. 5A would be the independent lift axes 150X1 and 150Xn at the extreme ends of the row of independent lift axes 150X1-150Xn). The superior ordered sequence of mixed cases 171S (e.g., the ordered sequence of mixed cases created at and from the common output in accordance to the predetermined case out ordered sequence of mixed cases 172) is produced substantially continuously and consistent with, for example, a high speed (over 500, and in one aspect over 1000, transfer actions per hour on a pallet) pallet builder (e.g., palletizer 160PB) building at least one mixed case pallet layer of mixed laterally distributed and stacked mixed cases (as illustrated and described with respect to FIG. 1D). The superior ordered sequence of mixed cases 171S is characterized by its sequence order of mixed case units that converges upon or nears the predetermined case out ordered sequence of mixed cases 172 so that there is a strong correlation between respective sequence orders of the superior ordered sequence of mixed cases 171S and the predetermined case out ordered sequence of mixed cases 172. The strong correlation may be such that the sequence order, of the superior ordered sequence of mixed cases 171S, is a near net sequence order to that of the predetermined case out ordered sequence of mixed cases 172. The inferior ordered sequence of mixed cases 170 is characterized by its sequence order of mixed cases that diverges from or is substantially neutral to the predetermined case out ordered sequence of mixed cases 172 so that there is a weak correlation (compared to the strong correlation of the superior ordered sequence of mixed cases 171S) between respective sequence orders of the inferior ordered sequence of mixed cases 170 and the predetermined case out ordered sequence of mixed cases 172.

As may be realized, the lift modules 150A, 150B and traverse 550 are under the control of any suitable controller, such as control server 120, such that when picking and placing case unit(s) the pick head is raised and/or lowered to a predetermined height corresponding to, for example, an interface station TS at a predetermined storage level 130L and/or the traverse 550 (e.g., to at least in part resequence the mixed cases). As may be realized, the lift modules 150A, 150B provide the Z transport axis (relative to both the bot frame of reference REF and the rack frame of reference REF2) of the storage and retrieval system 100 where the output lift modules 150B sort case units on the fly (in motus) for delivery to the output stations 160US as will be described below. At the interface stations TS the pick head 4000A, 4000B or individual portion thereof (e.g. effector LHDA, LHDB), corresponding to one or more case unit holding location(s) of the interface station TS from which one or more case unit(s) are being picked, is extended so that the fingers 4273 are interdigitated between the slats 1210S (as illustrated in FIG. 4B) underneath the case unit(s) being picked (i.e., underneath the pickface formed by the case(s) being picked). The lift 150A, 150B raises the pick head 4000A, 4000B to lift the case unit(s) from the slats 1210S and retracts the pick head 4000A, 4000B for transport of the case unit(s) to another level of the storage and retrieval system, such as for transporting the case unit(s) to output station 160UT. Similarly, to place one or more case unit(s) the pick head 4000A, 4000B or individual portion thereof (e.g. effector LHDA, LHDB), corresponding to one or more case unit holding location(s) of the interface station TS from which one or more case unit(s) are being placed, is extended so that the fingers 4273 are above the slats. The lift 150A, 150B lowers the pick head 4000A, 4000B to place the case unit(s) on the slats 1210S and so that the fingers 4273 are interdigitated between the slats 1210S underneath the case unit(s) being picked. In other aspects, the lift may have any suitable configuration for picking and placing case unit(s) from and to the interface station(s) TS. For example the pick head 4000A, 4000B may be configured with arms that push/pull (e.g., drag) case unit(s) to and from the interface station(s). As another example, the pick head 4000A, 4000B may be configured with a conveyor belt that conveys case unit(s) between the lift 150 and the interface station(s).

Referring now to FIGS. 2A, 3, 4A, and 4B, as noted above, the bot 110 includes a transfer arm 110PA that effects the picking and placement of case units from the stacked storage spaces 130S, interface stations TS and peripheral buffer stations BS, BSD defined at least in part, in the Z direction) by one or more of the rails 1210A, 1210B, 1200 (FIG. 5A) (e.g. where the storage spaces, interface stations and/or peripheral buffer stations may be further defined in the X and Y directions, relative to either of the rack frame of reference REF2 or the bot frame of reference REF, through the dynamic allocation of the case units as described above). As may be realized, the bot defines the X transport axis and, at least in part, the Y transport axis (e.g. relative to the bot frame of reference REF) as will be described further below. The bots 110, as noted above, transport case units between each lift module 150 and each storage space 130S on a respective storage level 130L.

The bots 110 include a frame 110F having a drive section 110DR and a payload section 110PL. The drive section 110DR includes one or more drive wheel motors each connected to a respective drive wheel(s) 202 for propelling the bot 110 along the X direction (relative to the bot frame of reference REF so as to define the X throughput axis). As may be realized, the X axis of bot travel is coincident with the storage locations when the bot 110 travels through the picking aisles 130A. In this aspect the bot 110 includes two drive wheels 202 located on opposite sides of the bot 110 at end 110E1 (e.g. first longitudinal end) of the bot 110 for supporting the bot 110 on a suitable drive surface however, in other aspects any suitable number of drive wheels are provided on the bot 110. In one aspect each drive wheel 202 is independently controlled so that the bot 110 may be steered through a differential rotation of the drive wheels 202 while in other aspects the rotation of the drive wheels 202 may be coupled so as to rotate at substantially the same speed. Any suitable wheels 201 are mounted to the frame on opposite sides of the bot 110 at end 110E2 (e.g. second longitudinal end) of the bot 110 for supporting the bot 110 on the drive surface. In one aspect the wheels 201 are caster wheels that freely rotate allowing the bot 110 to pivot through differential rotation of the drive wheels 202 for changing a travel direction of the bot 110. In other aspects the wheels 201 are steerable wheels that turn under control of, for example, a bot controller 110C (which is configured to effect control of the bot 110 as described herein) for changing a travel direction of the bot 110. In one aspect the bot 110 includes one or more guide wheels 110GW located at, for example, one or more corners of the frame 110F. The guide wheels 110GW may interface with the storage structure 130, such as with guide rails 1200S (FIG. 1C) within the picking aisles 130A, on the transfer deck 130B and/or at interface or transfer stations for interfacing with the lift modules 150 for guiding the bot 110 and/or positioning the bot 110 a predetermined distance from a location to/from which one or more case units are placed and/or picked up as described in, for example, U.S. patent application Ser. No. 13/326,423 filed on Dec. 15, 2011 the disclosure of which is incorporated herein by reference in its entirety. As noted above, the bots 110 may enter the picking aisles 130A having different facing directions for accessing storage spaces 130S located on both sides of the picking aisles 130A. For example, the bot 110 may enter a picking aisle 130A with end 110E2 leading the direction of travel or the bot may enter the picking aisle 130A with end 110E1 leading the direction of travel.

The payload section 110PL of the bot 110 includes a payload bed 110PB, a fence or datum member 110PF, a transfer arm 110PA and a pusher bar or member 110PR. In one aspect the payload bed 110PB includes one or more rollers 110RL that are transversely mounted (e.g. relative to a longitudinal axis LX of the bot 110) to the frame 110F so that one or more case units carried within the payload section 110PL can be longitudinally moved (e.g. justified with respect to a predetermined location of the frame/payload section and/or a datum reference of one or more case units) along the longitudinal axis of the bot, e.g., to position the case unit at a predetermined position within the payload section 110PL and/or relative to other case units within the payload section 110PL (e.g. longitudinal forward/aft justification of case units). In one aspect the rollers 110RL may be driven (e.g. rotated about their respective axes) by any suitable motor for moving the case units within the payload section 110PL. In other aspects the bot 110 includes one or more longitudinally movable pusher bar (not shown) for pushing the case units over the rollers 110RL for moving the case unit(s) to the predetermined position within the payload section 110PL. The longitudinally movable pusher bar may be substantially similar to that described in, for example, U.S. patent application Ser. No. 13/326,952 filed on Dec. 15, 2011, the disclosure of which was previously incorporated by reference herein in its entirety. The pusher bar 110PR is movable in the Y direction, relative to the bot 110 reference frame REF to effect, along with the fence 110PF and or pick head 270 of the transfer arm 110PA, a lateral justification of case unit(s) within the payload area 110PL in the manner described in U.S. Provisional Patent Application No. 62/107,135 filed on Jan. 23, 2015, previously incorporated herein by reference in their entireties.

Still referring to FIG. 6, the case units are placed on the payload bed 110PB and removed from the payload bed 110PB with the transfer arm 110PA along the Y transport axis. The transfer arm 110PA includes a lift mechanism or unit 200 located substantially within the payload section 110PL as described in, for example, U.S. Provisional Patent Application No. 62/107,135 filed on Jan. 23, 2015, previously incorporated herein by reference in their entireties. The lift mechanism 200 provides both gross and fine positioning of pickfaces carried by the bot 110 which are to be lifted vertically into position in the storage structure 130 for picking and/or placing the pickfaces and/or individual case units to the storage spaces 130S (e.g. on a respective storage level 130L on which the bot 110 is located). For example, the lift mechanism 200 provides for picking and placing case units at the multiple elevated storage shelf levels 130LS1-130LS4, TL1, TL2 accessible from the common picking aisle or interface station deck/rail 1200S (see e.g. FIGS. 1B and 5A).

The lift mechanism 200 is configured so that combined robot axis moves are performed (e.g. combined substantially simultaneous movement of the pusher bar 110PR, lift mechanism 200, pick head extension and fore/aft justification mechanism(s) such as, e.g., the longitudinally movable pusher bar described above), so that different/multi-sku or multi-pick payloads are handled by the bot. In one aspect, the actuation of the lifting mechanism 200 is independent of actuation of the pusher bar 110PR as will be described below. The decoupling of the lift mechanism 200 and pusher bar 110PR axes provides for combined pick/place sequences effecting a decreased pick/place cycle time, increased storage and retrieval system throughput and/or increased storage density of the storage and retrieval system as described above. For example, the lift mechanism 200 provides for picking and placing case units at multiple elevated storage shelf levels accessible from a common picking aisle and/or interface station deck 1200S as described above.

The lifting mechanism may be configured in any suitable manner so that a pick head 270 of the bot 110 bi-directionally moves along the Z axis (e.g. reciprocates in the Z direction—see FIG. 2A). In one aspect, the lifting mechanism includes a mast 200M and the pick head 270 is movably mounted to the mast 200M in any suitable manner. The mast is movably mounted to the frame in any suitable manner so as to be movable along the lateral axis LT of the bot 110 (e.g. in the Y direction so as to define the Y transport axis). In one aspect the frame includes guide rails 210A, 210B to which the mast 200M is slidably mounted. A transfer arm drive 250A, 250B may be mounted to the frame for effecting at least movement of the transfer arm 110PA along the lateral axis LT (e.g. Y axis) and the Z axis. In one aspect the transfer arm drive 250A, 250B includes an extension motor 301 and a lift motor 302. The extension motor 301 may be mounted to the frame 110F and coupled to the mast 200M in any suitable manner such as by a belt and pulley transmission 260A, a screw drive transmission (not shown) and/or a gear drive transmission (not shown). The lift motor 302 may be mounted to the mast 200M and coupled to pick head 270 by any suitable transmission, such as by a belt and pulley transmission 271, a screw drive transmission (not shown) and/or a gear drive transmission (not shown). As an example, the mast 200M includes guides, such as guide rails 280A, 280B, along which the pick head 270 is mounted for guided movement in the Z direction along the guide rails 280A, 280B. In other aspects the pick head is mounted to the mast in any suitable manner for guided movement in the Z direction. With respect to the transmissions 271, a belt 271B of the belt and pulley transmission 271 is fixedly coupled to the pick head 270 so that as the belt 271B moves (e.g. is driven by the motor 302) the pick head 270 moves with the belt 271B and is bi-directionally driven along the guide rails 280A, 280B in the Z direction. As may be realized, where a screw drive is employed to drive the pick head 270 in the Z direction, a nut may be mounted to the pick head 270 so that as a screw is turned by the motor 302 engagement between the nut and screw causes movement of the pick head 270. Similarly, where a gear drive transmission is employed a rack and pinion or any other suitable gear drive may drive the pick head 270 in the Z direction. In other aspects any suitable linear actuators are used to move the pick head in the Z direction. The transmission 260A for the extension motor 301 is substantially similar to that described herein with respect to transmission 271.

Still referring to FIG. 2A the pick head 270 of the bot 110 transfers case units between the bot 110 and a case unit pick/place location such as, for example, the storage spaces 130S, peripheral buffer stations BS, BSD and/or interface stations TS (see FIGS. 3, 4A, and 4B) and in other aspects substantially directly between the bot 110 and a lift module(s) 150. In one aspect, the pick head 270 includes a base member 272, one or more tines or fingers 273A-273E and one or more actuators 274A, 274B. The base member 272 is mounted to the mast 200M, as described above, so as to ride along the guide rails 280A, 280B. The one or more tines 273A-273E are mounted to the base member 272 at a proximate end of the tines 273A-273E so that a distal end of the tines 273A-273E (e.g. a free end) is cantilevered from the base member 272. Referring again to FIG. 1D, the tines 273A-273E are configured for insertion between slats 1210S that form the case unit support plane CUSP of the storage shelves.

One or more of the tines 273A-273E is movably mounted to the base member 272 (such as on a slide/guide rail similar to that described above) so as to be movable in the Z direction. In one aspect any number of tines are mounted to the base member 272 while in the aspect illustrated in the figures there are, for example, five tines 273A-273E mounted to the base member 272. Any number of the tines 273A-273E are movably mounted to the base member 272 while in the aspect illustrated in the figures, for example, the outermost (with respect to a centerline CL of the pick head 270) tines 273A, 273E are movably mounted to the base member 272 while the remaining tines 273B-273D are immovable relative to the base member 272.

In this aspect the pick head 270 employs as few as three tines 273B-273D to transfer smaller sized case units (and/or groups of case units) to and from the bot 110 and as many as five tines 273A-273E to transfer larger sized case units (and/or groups of case units) to and from the bot 110. In other aspects, less than three tines are employed (e.g. such as where more than two tines are movably mounted to the base member 272) to transfer smaller sized case units. For example, in one aspect all but one tine 273A-273E is movably mounted to the base member so that the smallest case unit being transferred to and from the bot 110 without disturbing other case units on, for example, the storage shelves has a width of about the distance X1 between slats 1210S (see FIG. 1D).

The immovable tines 373B-373D define a picking plane SP of the pick head 270 and are used when transferring all sizes of case units (and/or pickfaces) while the movable tines 373A, 373E are selectively raised and lowered (e.g. in the Z direction with the actuators 274A, 274B) relative to the immovable tines 373B-373D to transfer larger case units (and/or pickfaces). Still referring to FIG. 2A an example is shown where all of the tines 273A-273E are positioned so that a case unit support surface SF of each tine 273A-273E is coincident with the picking plane SP of the pick head 270 however, as may be realized, the two end tines 273A, 273E are movable so as to be positioned lower (e.g. in the Z direction) relative to the other tines 273B-273D so that the case unit support surface SF of tines 273A, 273E is offset from (e.g. below) the picking plane SP so that the tines 273A, 273E do not contact the one or more case units carried by the pick head 270 and do not interfere with any unpicked case units positioned in storage spaces 130S on the storage shelves or any other suitable case unit holding location.

The movement of the tines 273A-273E in the Z direction is effected by the one or more actuators 274A, 274B mounted at any suitable location of the transfer arm 110PA. In one aspect, the one or more actuators 274A, 274B are mounted to the base member 272 of the pick head 270. The one or more actuators are any suitable actuators, such as linear actuators, capable of moving one or more tines 273A-273E in the Z direction. In the aspect illustrated in, for example, FIG. 2A there is one actuator 274A, 274B for each of the movable tines 273A, 273E so that each moveable tine is independently movable in the Z direction. In other aspects one actuator may be coupled to more than one movable tine so that the more than one movable tine move as a unit in the Z direction.

As may be realized, movably mounting one or more tines 273A-273E on the base member 272 of the pick head 270 provides for full support of large case units and/or pickfaces on the pick head 270 while also providing the ability to pick and place small case units without interfering with other case units positioned on, for example, the storage shelves, interface stations and/or peripheral buffer stations. The ability to pick and place variably sized case units without interfering with other case units on the storage shelves, interface stations and/or peripheral buffer stations reduces a size of a gap GP (see FIG. 1B) between case units on the storage shelves. As may be realized, because the tines 273B-273D are fixed to the base member 272 there is no duplicative motion when picking/placing case units as the lifting and lowering of case units and/or pickfaces to and from the case unit holding location is effected solely by the lift motor 301, 301A.

Referring again to FIG. 2A, it is again noted that the pusher bar 110PR is movable independent of the transfer arm 110PA. The pusher bar 110PR is movably mounted to the frame in any suitable manner such as by, for example, a guide rod and slide arrangement and is actuated along the Y direction (e.g. in a direction substantially parallel to the extension/retraction direction of the transfer arm 110PA). In one aspect at least one guide rod 360 is mounted within the payload section 110PL so as to extend transversely relative to the longitudinal axis LX of the frame 110F. The pusher bar 110PR may include at least one slide member 360S configured to engage and slide along a respective guide rod 360. In one aspect, at least the guide rod/slide arrangement holds the pusher bar 110PR captive within the payload section 110PL. The pusher bar 110PR is actuated by any suitable motor and transmission, such as by motor 303 and transmission 303T. In one aspect the motor 303 is a rotary motor and the transmission 303T is a belt and pulley transmission. In other aspects the pusher bar 110PR may be actuated by a linear actuator having substantially no rotary components.

The pusher bar 110PR is arranged within the payload section 110PL so as to be substantially perpendicular to the rollers 110RL and so that the pusher bar 110PR does not interfere with the pick head 270. As can be seen in FIG. 10B, the bot 110 is in a transport configuration where at least one case unit would be supported on the rollers 110RL (e.g. the rollers collectively form the payload bed). In the transport configuration the tines 273A-273E of the pick head 270 are interdigitated with the rollers 110RL and are located below (along the Z direction) a case unit support plane RSP of the rollers 110RL. The pusher bar 110PR is configured with slots 351 into which the tines 273A-273E pass where sufficient clearance is provided within the slots 351 to allow the tines to move below the case unit support plane RSP and to allow free movement of the pusher bar 110PR without interference from the tines 273A-273E. The pusher bar 110PR also includes one or more apertures through which the rollers 110RL pass where the apertures are sized to allow free rotation of the rollers about their respective axes. As may be realized, the independently operable pusher bar 110PR does not interfere with the rollers 110RL, extension of the transfer arm 110PA in the transverse direction (e.g. Y direction) and the lifting/lowering of the pick head 270.

As noted above, because the pusher bar 110PR is a separate, standalone axis of the bot 110 that operates free of interference from the pick head 270 extension and lift axes, the pusher bar 110PR can be operated substantially simultaneously with the lifting and/or extension of the transfer arm 110PA. The combined axis moves (e.g. the simultaneous movement of the pusher bar 110PR with the transfer arm 110PA extension and/or lift axes) provides for increased payload handling throughput in along the Y transport axis and effects the ordered (e.g. according to a case transfer sequence of the respective asynchronous level transport system 191) multi-pick of two or more case units from a common picking aisle, in one common pass of the picking aisle as described in, for example, U.S. Pat. No. 9,856,083 issued on Jan. 2, 2018, the disclosure of which was previously incorporated herein by reference in its entirety.

Referring to FIGS. 1A and 5A, as noted above, the lifts 150 forming the more than one independent lift axis 150X1-150Xn is controlled by control server 120 so that when picking and placing case unit(s) the pick head is raised and/or lowered to a predetermined height corresponding to, for example, an interface station TS at a predetermined storage level 130L and/or the traverse 550 (e.g., to at least in part resequence the mixed cases). In one aspect, the control server 120 also controls the traverse 550 so that the traverse transfer case units, not only to the output station 160UT, but also between the more than one independent lift axis 150X1-150Xn. Here the more than one independent lift axis 150X1-150Xn resequences inferior ordered sequence of mixed cases 170 alone or in conjunction with the traverse 550 in any suitable manner, such as described below.

In one aspect, as described herein, the more than one lift axis 150X1-150Xn forms a bypass or pass through (on the fly or in motus) in the lift transport stream. As described herein, each level 130L of the multi-level transport system 190 has an asynchronous level transport system (where, e.g., asynchronous may refer to the bots 110 being undeterministic, and, at least in part, the transfer deck 130B being undeterministic so that each aisle/storage location communicates with the input/output stations at each level 130L). Each asynchronous level transport system 191 has a level transport rate TXR (FIG. 1) that may be optimized in any suitable manner for load balancing. The level transport rate TXR produces or otherwise defines load spreading so each bot 110 may effect a similar number (e.g., average number) of transactions (e.g., moving cases from storage to the input/output stations). In other aspects the level transport rate TXR may be time optimized to minimize transaction time to and from the storage racks for one or more cases, via one or more bots 110/asynchronous level transport axes X, Y of at least part of one or more asynchronous level transport system 191. In still other aspects, the level transport rate TXR may be a combination of load balancing and time optimization. As may be realized, the level transport rate TXR promotes a rate of optimization, for the asynchronous level transport system 191 (e.g., by load balancing and/or time optimization) over the sequence of mixed cases in the level transport transactions. In one aspect, at least some sequencing may be performed by the asynchronous level transport system(s) 191 in a manner similar to that described in, for example, United States pre-grant publication number 2016/0207711 published on Jul. 21, 2016 (application Ser. No. 14/997,902) and/or U.S. Pat. No. 9,850,079 issued on Dec. 26, 2017 (application Ser. No. 15/003,983), the disclosures of which are incorporated herein by reference in their entireties; however, in other aspects the sequencing of cases by the asynchronous level transport system(s) 191 may be a secondary consideration and be based on, for example, opportunity via level transfer rate optimization. The level transport rate produces or otherwise defines the available sequence of mixed cases (also referred to as the inferior ordered sequence of mixed cases 170) defined and effected by the level transport rate TXR at the infeed interface 555, see, e.g., FIG. 7 and equation [1] below.

Figure 7:
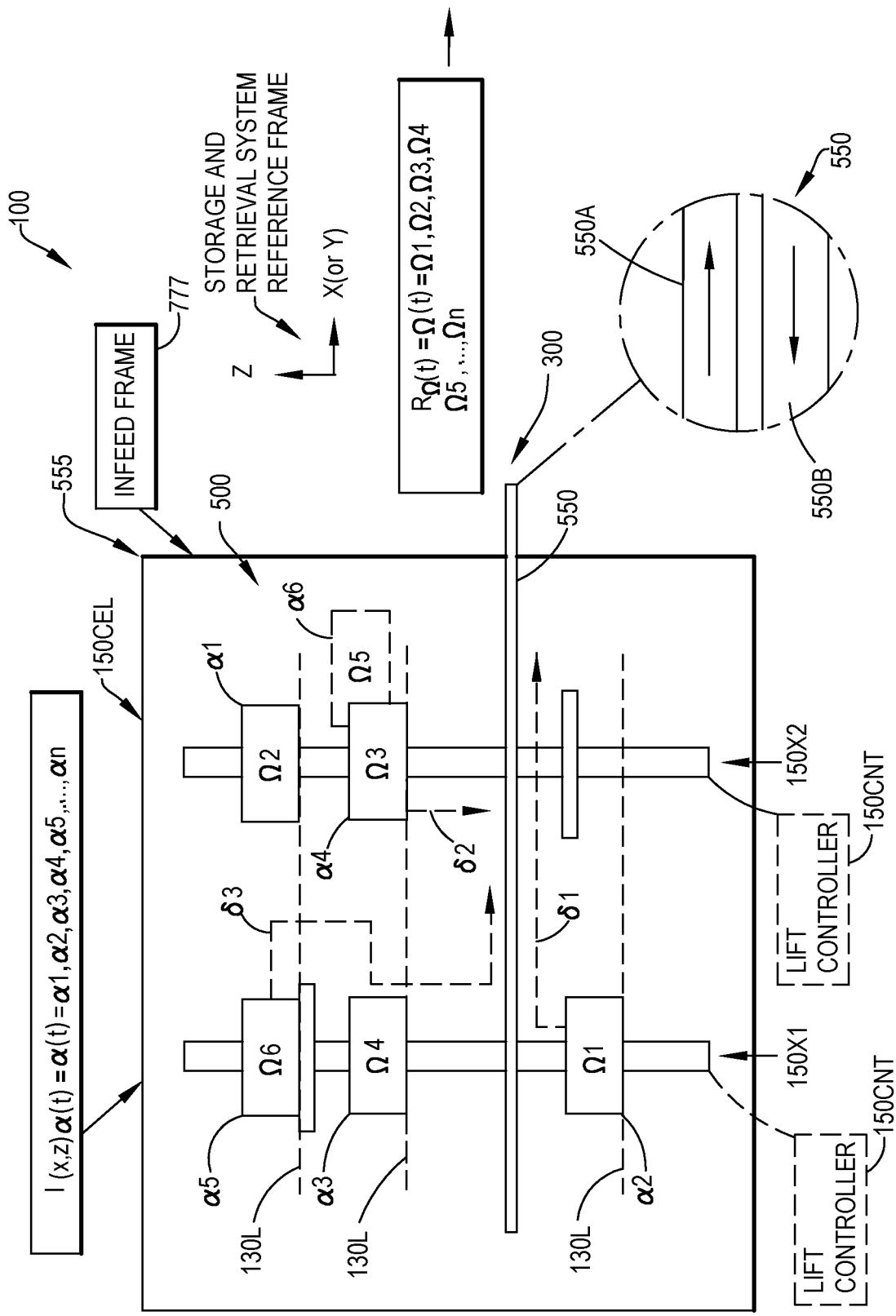
FIG. 7 is a schematic illustration of a portion of the storage and retrieval system in accordance with aspects of the disclosed embodiment.

In one aspect, referring to FIGS. 1A, 5A, and 7, the control server 120 may control the more than one lift axis 150X1-150Xn to sequence the cases (e.g., multi-lift case sequencing) so that the case units are picked by the more than one lift axis 150X1-150Xn in an inferior manner, from any of level 130L of the multi-level transport system 190, where the case units are transported to the traverse 550 in the superior ordered sequence of mixed cases 171S. By way of example, the control server 120 may include a system model 128 and a state maintenance and estimation module 129 substantially similar to those described in U.S. Pat. No. 9,733,638 issued on Aug. 15, 2017 (application Ser. No. 14/229,004) the disclosure of which is incorporated herein by reference in its entirety. The system model 128 may model performance aspects, and constraints of components (e.g., the lift axes 150X1-150Xn, the storage structure 130, bots 110, input and output stations, etc.) of the storage and retrieval system 100. The system model solution may explore state trajectories for action, such as transportation of cases in an order list by the more than one lift axis 150X1-150Xn. The system model may be updated, for example, via sensory and actuation data from lower level controllers (see controllers 120S1-120Sn described herein), on a substantially real time bases, enabling on the fly or in motus determination of optimum solutions over a predetermined time period. The state maintenance and estimation module 129 may be coupled to the state models and may facilitate estimation and maintenance of state trajectories generated with the state model. The state trajectory estimates this are dynamic and may account for uncertainty and disturbances, changes in resources, objectives and/or constraints and may be updated over a desired segment of the predetermined time period according to various disturbances and/or triggers (e.g., receding planning horizon, level shutdown, bot failure, storage pick action failure, storage put/place action failure, etc.)

The case units are transferred to, for example, the transfer stations TS on one or more levels 130L by the respective asynchronous level transport system 191 in the infeed order sequence 173 so that the case units are disposed on at the transfer stations TS in the inferior ordered sequence of mixed cases 170. The case units may be transferred by the multi-level transport system 190 to the infeed of the lift transport system 500 as a substantially continuous input stream of mixed cases, groups of mixed cases, pickfaces of mixed cases, etc. The infeed of the lift transport system 500 may be defined by an infeed interface 555 frame 777 (FIG. 7) which may not necessarily be a physical structure; rather the infeed interface 555 frame 777 defines the outer bounds of the X (or Y) and Z range of the lift transport system 500 within the storage and retrieval system 100. The more than one independent lift axis 150X1-150Xn utilize one or more of the transfer stations TS (on the different levels 130L of the multi-level transport system 190), the buffer stations BS (on the different levels 130L of the multi-level transport system 190), and the traverse 550 (or other suitable conveyor(s)) to transition the cases in/to the superior ordered sequence of mixed cases 171S.

The infeed interface 555 reference frame couples the "cell" 150CEL of more than one independent lift axis 150X1-150Xn (which are merged to a common output 300 as described herein) with the multi-level transport system 190 and each of the asynchronous level transport systems 191 on the different levels 130L so that each lift axis 150X1-150Xn has a different corresponding input/output station (e.g., also referred to herein as infeed stations 556) at each asynchronous level transport system 191 where the input/output station 556 form a multidimensional array I/O(x,z). The asynchronous level transport system 191 at its optimized transfer rate (of transactions) provides or inputs mixed cases at each of the array of input/output station 556 that, collectively define, via each input/output station 556 in combination, an available order sequence of mixed cases (also referred to as the inferior ordered sequence of mixed cases 170 at the infeed interface 555 (and correspondingly at each input/output station 556). The available order sequence of mixed cases 170 is thus determined by the level transport transaction rate TXR and may be considered as a three-dimensional array, with two dimensionally distributed input/output stations 556 (e.g. distributed in x and z) and variable with time (t). The available order sequence of mixed cases 170 may be characterized as I/O(x, z)(t). Further, for purposes of simplicity of the description, the infeed interface 555 may be treated as a common aggregated infeed interface 555 frame 777 (FIG. 7), the three-dimensional array being represented as a single common linear input axis variable with time, wherein the available order sequence of mixed cases from the asynchronous level transport system(s) 191 at the infeed interface 555 may be characterized as a normalized input $\alpha_i$, where $\alpha 1$, $\alpha 2$, $\alpha 3$, etc. are the order of mixed cases as available at the infeed interface 555 frame 777. As noted before, the available order sequence of mixed cases 170 does not correlate with, or has a weak correlation to the predetermined order sequence of predetermined case out order sequence of mixed cases 172.

The more than one independent lift axis 150X1-150Xn (e.g., a lift axis system having more than one lift axis merged to the common output 300) feeds mixed cases, via the infeed interface 555 frame, at the available order sequence of mixed cases 170, and has a configuration that creates an ordered sequence of mixed cases 171 (that may be characterized as normalized output $\Omega_i$) at the common output 300 that conforms with or has a strong correlation with the predetermined case out order sequence of mixed cases 172. As described further below, each of the more than one independent lift axis 150X1-150Xn is configured to define a corresponding pass through or bypass (also referred to as a switch) relative to another different one of the more than one independent lift axis 150X1-150Xn.

In the aspects of the disclosed embodiment described herein, the infeed feed rate $(I_{(x,z)\alpha}(t))$ to the lift transport system 500, at which the inferior ordered sequence of mixed cases 170 ($\alpha$(t)) is supplied to the output and resequencing section 199 by the a multi-level transport system 190, can be defined as $$I_{(x,z)\alpha}(t)=\alpha(t)=\alpha 1, \alpha 2, \alpha 3, \alpha 4, \alpha 5, \ldots, \alpha n \quad [1]$$

for any given predetermined period of time (e.g., horizon) where, $\alpha 1$ through $\alpha n$ represent ordinate case units, in a time ordered sequence of case units, that form the inferior ordered sequence of mixed cases 170 ($\alpha$(t)), transported to the lift transport system 500 by the multi-level transport system 190. For example, $\alpha 1$ is the first case unit to be transferred to the lift transport system 500, $\alpha 2$ is the second case unit to be transferred to the lift transport system 500, and so on. In addition, the "x" in equation 1 above may be changed to "y" or any other suitable substantially horizontal axis identifier (e.g., as axis substantially transverse to the transfer axis of the outbound lifts 150B) along which the case units are being transferred.

The infeed feed rate $I_{(x, z)\alpha}(t)$ is effected by the bots 110 of one or more of the respective asynchronous level transport system 191 of the a multi-level transport system 190. For example, bot 110 tasking/assignment may be optimized in a manner substantially similar to that described in U.S. Pat. No. 9,733,638, issued on Aug. 15, 2017, the disclosure of which is incorporated herein by reference in its entirety. As noted above, one or more of the component controllers 120S1-120Sn may manage operation of the bots 110 of the respective asynchronous level transport system 191. The component controllers 120S1-120Sn may have a controller hierarchy where upper level component controllers generated commands for lower level controllers (e.g., such as controllers 110C of the bots 110) to perform actions that effect the task assigned to the respective upper level component controllers. As an example, one or more of the component controllers 120S1-120Sn may independently determine the bot 110 assignments that will handle and move the case units corresponding to the tasks assigned to the one or more of the component controllers 120S1-120Sn. The one or more of the component controllers 120S1-120Sn may also use model predictive control in determining assignments for the bots 110. The one or more of the component controllers 120S1-120Sn thus may be configured to solve a bot 110 routing problem and may resolve traffic management and routing destination to provide an optimal solution to bot 110 tasking. The one or more of the component controllers 120S1-120Sn may select the optimal bot 110 from a number of selectable bots 110 of the respective asynchronous level transport system 191 and generate the bot assignment to the task. The one or more of the component controllers 120S1-120Sn assignments to the bots 110 (or bot controllers 110C) may determine destination (e.g., the selected storage location of an ordered case unit according to the task assignment) and path for the bot 110 to move from an origin or initial location of the bot 110 on the level 130L to the assigned destination. In one aspect, the storage locations/spaces 130S (FIG. 1A) may be arrayed along storage/picking aisles 130A (FIG. 1A), that may be interconnected by transfer decks 130B (FIG. 1A) providing substantially open or undeterministic riding surfaces (or in other aspects deterministic riding surfaces) as described herein. Accordingly multiple paths may be available for the bot 110 to proceed from the origin location (at the time of tasking) to the destination. The one or more of the component controllers 120S1-120Sn may select the optimal path for the given bot 110 and the problem of rover assignment and routing may be solved in a coordinated manner for all bots 110 of the respective asynchronous level transport system 191 over a predetermined period of time. Each bot 110 assignment (destination and path) may thus be optimized over the predetermined period of time (e.g. a time horizon), and the controller solution may be dynamically updated for desired time segments in the predetermined period of time to account for changing conditions, objectives, resources, and parameters of the a multi-level transport system 190.

In the aspects of the disclosed embodiment described herein, the superior ordered sequence of mixed cases 171S which has a strong correlation to the predetermined case out order sequence of mixed cases 172 ($\Omega$(t)), and which is output at an output rate ($R_\Omega$(t)) of the lift transport system 500 can be defined as $$R_\Omega(t) \cong \Omega(t) = \Omega 1, \Omega 2, \Omega 3, \Omega 4, \Omega 5, \ldots, \Omega n \quad [2]$$

over any given period of time (e.g., horizon) where, $\Omega 1$ through $\Omega n$ represent ordinate case units in a time ordered sequence of case units output from the lift transport system 500 at the common output 300. For example, $\Omega 1$ is the first case unit to be output from the lift transport system 500, $\Omega 2$ is the second case unit to be output from the lift transport system 500, and so on. Here the output rate $R_\Omega$(t) of the lift transport system 500 is substantially equal to or greater than the transaction rate of the high speed (over 500, and in one aspect over 1000, transfer actions per hour on a pallet) pallet builder (e.g., palletizer 160PB).

Also, in the aspects of the disclosed embodiment, $Z_x$(t) represents the aggregate linearized stream (e.g., lift axis feed rate) of cases processed through the lift transport system 500. For example, the flow of case unit through the lift transport system may be a channelized multi-stream flow where each lift axis 150X1-150Xn is arranged (e.g., the lift axes 150X1-150Xn form a cell of horizontally spread apart lift axes) along the X (or Y) axis (e.g., in a reference frame of the storage and retrieval system 100—see, e.g., FIGS. 3, 4A, 7) outputs a stream (e.g., a Z axis stream of case units) of the multi-stream flow where the output of each stream is aggregated with at least another Z axis stream of another lift axis 150X1-150Xn and channelized into a linear stream of case units (e.g., representative of the superior ordered sequence of mixed cases 171S ($\Omega$(t)) by the common output 300 of the lift transport system 500. It is again noted that the "x" in the term $Z_x$(t) may be changed to "y" or any other suitable substantially horizontal axis identifier (e.g., as axis substantially transverse to the transfer axis of the outbound lifts 150B) along which the case units are being transferred. As can be seen in, e.g., FIG. 3 (with respect to the common outputs 300'), 4A, and 4B (with respect to the individual stream of case units from the respective traverses 550 arranged in parallel) the Z axis streams may be aggregated along parallel paths to the common output 300; and/or in other aspects, as can be seen in, e.g., FIG. 3 (with respect to traverse 550), FIG. 4B (with respect to the aggregation of case units on the individual traverses 550). 5A, 6A, and 6B the Z axis streams may be aggregated along a common path to the common output 300.

The lift axis feed rate $Z_x$(t) may be a substantially constant feed rate that is substantially the same as the output rate $R_\Omega$(t) of the lift transport system 500. In some aspects, the lift axis feed rate $Z_x$(t) may be effected by one or more bypass switches $\delta 1$-$\delta n$ (see, e.g., $\delta 1$, $\delta 2$, $\delta 3$ in FIG. 7, however any suitable number of bypass switches may be provided) where $$\alpha(t)+\delta(t) \cong \Omega(t)$$

and δ(t) is a bypass switch rate for any given period of time (e.g. horizon), and where α(t) is not equal to ω(t). The output rate $R_\Omega(t)$ of the lift transport system 500 may be a time optimal output rate where each lift axis 150X1-150Xn picks case units from each level 130L in an order of availability of the case units (e.g., the availability of case units being effected by the infeed feed rate $I_{(x, z)\alpha}(t)$/inferior ordered sequence of mixed cases 170 (α(t)) where the order in which the case units are picks is decoupled from the superior ordered sequence of mixed cases 171S (Ω(t)).

Figure 7A:
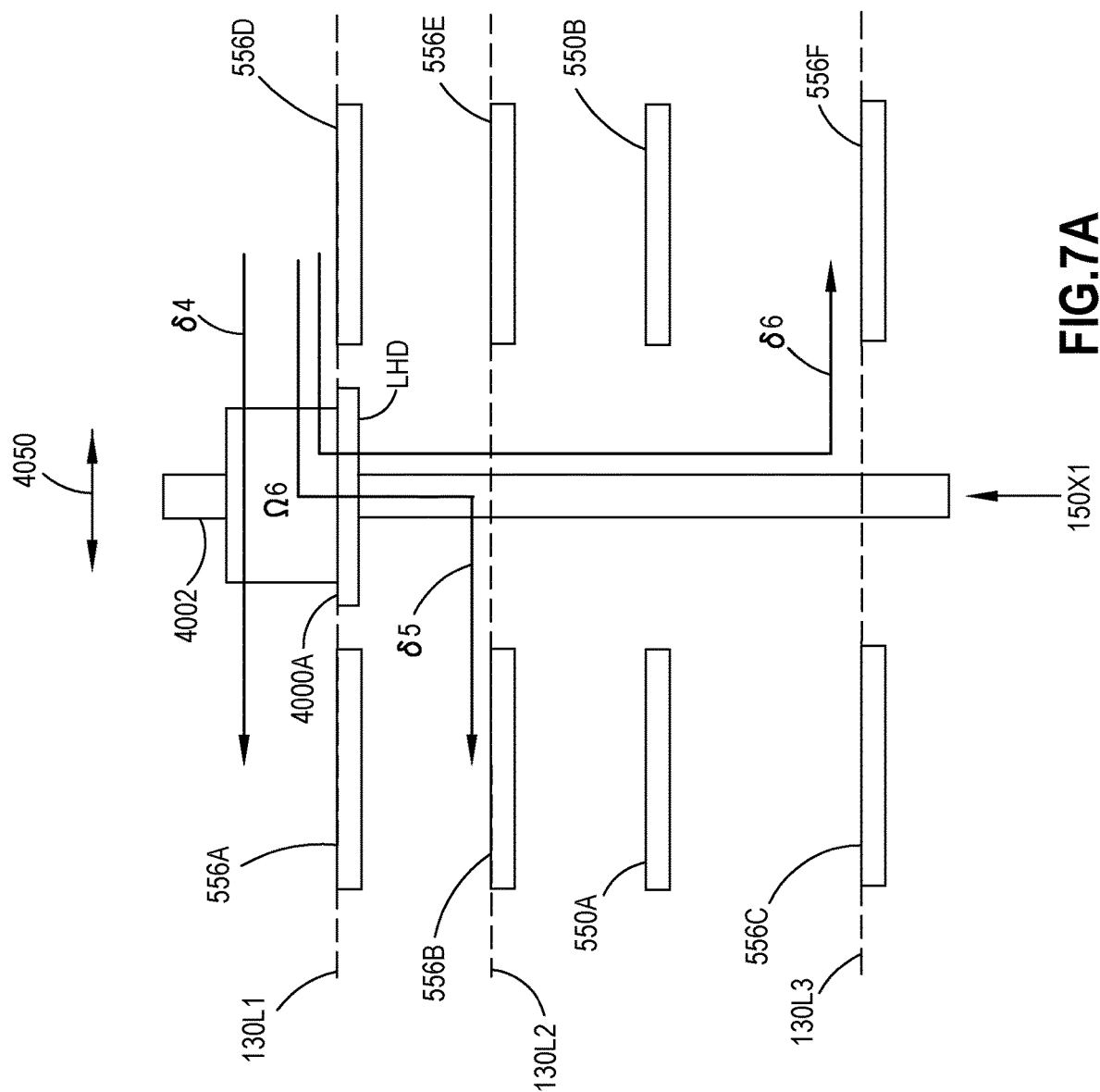
FIG. 7A is a schematic illustration of a portion of the storage and retrieval system in accordance with aspects of the disclosed embodiment.

Still referring to FIG. 7, as noted above, the lifting transport system includes one or more bypass switches δ1-δn. As will be described below, in one aspect, the one or more bypass switches δ1-δn may be effected with a lift axis 150X1-150Xn alone (e.g., the lift transport rate LRT is substantially equal to the bypass $δ_j$—see for example, switch δ2 in, e.g., FIG. 7 where α4 is to precede α3 in the superior ordered sequence of mixed cases 171S (Ω(t)) where the order is Ω3, Ω4, etc.). In yet another aspect, the one or more bypass switches δ1-δn may be effected with a lift axis 150X1-150Xn and a traverser 550 (e.g., the lift transfer rate LRT and the traverser travel or swap time is substantially equal to the bypass $δ_j$—see for example, switch δ1 in, e.g., FIG. 7 where α2 is to precede α1 in the superior ordered sequence of mixed cases 171S (Ω(t)) where the order is Ω1, Ω2, etc.). In still another aspect, the one or more bypass switches δ1-δn may be effected with a lift axis 150X1-150Xn and a lift pick and place (e.g., the lift transfer rate LRT and the pick place transaction rate TRT is substantially equal to the bypass $δ_j$—see for example, switches δ4-δ6 in, e.g., FIG. 7A). In yet another aspect, the one or more bypass switches δ1-δn may be effected with a lift axis 150X1-150Xn, a lift pick and place, and a traverser 550 (e.g., the lift transfer rate LRT, the pick place transaction rate TRT, and the traverser travel or swap time is substantially equal to the bypass $δ_j$—see for example, switch δ1 in, e.g., FIG. 7 where α6 is to precede α5 in the superior ordered sequence of mixed cases 171S (Ω(t)) where the order is Ω5, Ω6, etc.). In a pick and place operation of the lift axis 150X1-150Xn, a case unit is picked from one station 556 and placed at another station 556 along a common lift axis (as shown in FIG. 10) or on a traverser 550, and/or picked from one traverser 550A and placed on another traverser 550B (e.g., so that a transfer time of one case is increased so that other cases can be output with a higher priority). Referring also to FIG. 7A, in one aspect, the lifts 150 (lifts 150X1 is shown for exemplary purposes only) may be configured to bi-directionally extend in direction 4050 for picking and placing case units to opposite sides of the lift 150X1. For example, the lift 150X1 may have a first side on which infeed stations 556A-556C are located and an opposite side on which infeed stations 556D-556F are located. The lift load handling device LHD is configured to bi-directionally extend in direction 4050 for accessing each of the infeed stations 556A-556F. Here bypass switch δ4 formed by the at least one lift axis crosses the lift axis from one side to another side (e.g., a case unit is transferred between opposing infeed stations such as infeed stations 556A, 556D on a common level 130L1). Here the bypass switch δ4 swaps cases from side to side on a common level. In another aspect, bypass switch δ5 formed by the at least one lift axis crosses the lift axis from one side to another side and has a portion of the bypass path that extends along the lift axis and a level travel portion that extend in a plane of a respective level (e.g., a case unit is transferred between opposing infeed stations such as infeed stations 556B, 556D on different levels 130L1, 130L2). Here the bypass switch δ5 swaps cases from side to side on different levels. In yet another aspect, bypass switch δ6 formed by the at least one lift axis has at least a bypass path portion extending along the lift axis and a level travel portion (e.g., a case unit is transferred between infeed stations such as infeed stations 556D, 556F on a common side of the lift axis 150X1. Here the bypass switch δ6 swaps cases to different levels on a same side of the lift axis (as may be realized bi-directional extension capabilities are not necessary to effect bypass switch δ6). In other aspects, the switches δ1-δn may be used in any suitable combination thereof to prioritize the output of case units. The one or more bypass switches δ1-δn provide the respective lift axis 150X1-150Xn with a pass through Z axis stream of case units where the pass through, as will be described herein, is effected with the respective lift axis 150X1-150Xn alone or with the respective lift axis 150X1-150Xn and the traverse 550. The one or more bypass switches δ1-δn operate so as to maintain the time optimal output rate of $R_\Omega(t)$ of the lift transport system 500. For example, in a manner similar to that described above with respect to the bots 110, one or more of the component controllers 120S1-120Sn may manage operation of the lift axes 150X1-150Xn of a respective lift transport system 500. The component controllers 120S1-120Sn may have a controller hierarchy where upper level component controllers generate commands for lower level controllers (e.g., such as controllers 150CNT of the lifts 150B) to perform actions that effect the task assigned to the respective upper level component controllers. As an example, one or more of the component controllers 120S1-120Sn may independently determine the lift axis 150X1-150Xn assignments that will handle and move the case units corresponding to the tasks assigned to the one or more of the component controllers 120S1-120Sn. The one or more of the component controllers 120S1-120Sn may also use model predictive control in determining assignments for the lift axes 150X1-150Xn. The one or more of the component controllers 120S1-120Sn thus may be configured to solve a case unit transport problem, as described above, from the common infeed interface 555 frame 777 to the common output 300 for resequencing the case units from the inferior ordered sequence of mixed cases 170 (α(t)) to the superior ordered sequence of mixed cases 171S (Ω(t)). As such, the one or more of the component controllers 120S1-120Sn may resolve case unit traffic management over the lift axes 150X1-150Xn with the one or more bypass switches δ1-δn and route case units through the lift transport system 500 to provide an optimal solution to lift axis 150X1-150Xn tasking. The one or more of the component controllers 120S1-120Sn assignments to the lift axes 150X1-150Xn (or lift controllers 150CNT) may determine destination (e.g., e.g., a temporary storage location on another level 130L of the same or a different lift axis or on the traverse 550) and as a result a path for the case unit to move from an origin or initial location of the case unit on the infeed interface 555 frame 777 to the assigned temporary storage location and/or to the common output 300.

In one aspect, the temporary storage locations on the different levels 130L of the different lift axes 150X1-150X effected by the one or more bypass switches δ1-δn may provide multiple paths for case unit transfer the origin location (at the time of tasking) to the common output 300. The one or more of the component controllers 120S1-120Sn may select the optimal path for the given case unit and the problem of lift axis assignment and routing may be solved in a coordinated manner for all lift axis 150X1-150Xn of the respective lift transport system 500 over a predetermined period of time. Each lift axis 150X1-150Xn assignment (case unit destination and path) may thus be optimized over the predetermined period of time (e.g. a time horizon), and the controller solution may be dynamically updated for desired time segments in the predetermined period of time to account for changing conditions, objectives, resources, and parameters of the lift transport system 500. Here each outbound lift 150B (e.g., the independent lift axes 150X1-150Xn) pick case units from each level 130L in a manner that is decoupled from the final predetermined case out ordered sequence, which is substantially the same as the superior ordered sequence of mixed cases 171S ($\Omega(t)$). As such, each outbound lift 150B (e.g., the independent lift aces 150X1-150Xn) is free to pick case units from each level in the order the case units become available.

As an illustrative example, FIG. 7 shows an exemplary lift transport system 500 having two lift axes 150X1, 150X2 spaced apart from each other along, e.g., the X (or Y) axis of the storage and retrieval system 100. In FIG. 7, case units are supplied to the infeed interface 555 frame 777 on the different levels 130L at the infeed feed rate $I_{(x, z)\alpha}(t)$ in the inferior ordered sequence of mixed cases 170 ($\alpha(t)$). As can be seen in FIG. 7, ordinate case unit 2 ($\Omega 2$) in the superior ordered sequence of mixed cases 171S ($\Omega(t)$ is the first case unit to arrive at the infeed interface 555 frame 777 at lift axis 150X2. Ordinate case unit 1 ($\Omega 1$) in the superior ordered sequence of mixed cases 171S ($\Omega(t)$ is the second case unit to arrive at the infeed interface 555 frame 777 at lift axis 150X1. Ordinate case unit 5 ($\Omega 5$) in the superior ordered sequence of mixed cases 171S ($\Omega(t)$) is the third case unit to arrive at the infeed interface 555 frame 777 at lift axis 150X1. Ordinate case unit 3 ($\Omega 3$) in the superior ordered sequence of mixed cases 171S ($\Omega(t)$ is the fourth case unit to arrive at the infeed interface 555 frame 777 at lift axis 150X2. Ordinate case unit 4 ($\Omega 4$) in the superior ordered sequence of mixed cases 171S ($\Omega(t)$ is the fifth case unit to arrive at the infeed interface 555 frame 777 at lift axis 150X1. The arrival sequence of case units illustrated in FIG. 7 is not limited to five case units (there may be more or less than five) and the order of arrival of the case units is merely exemplary (the case units may arrive in any order and at any lift axis).

The lift axes 150X1 and 150X2 and/or the traverse 550 are controlled as described herein to transfer the case units $\Omega 1$-$\Omega n$ to the common output 600 in the superior ordered sequence of mixed cases 171S ($\Omega(t)$). As will be described in greater detail herein, the one or more bypass switches $\delta 1$-$\delta n$ and/or the traverse 550 may be used to temporarily store or buffer one of more of the case units $\Omega 1$-$\Omega n$ at a different location of the lift transport system 500 other than the respective origin location to effect resequencing of the case units to the superior ordered sequence of mixed cases 171S ($\Omega(t)$). In one aspect, the traverse 550 may be bidirectional to effect the buffering of the case units with the one or more bypass switches $\delta 1$-$\delta n$. In one aspect, the traverse 550 may include dual transport paths 550A, 550B (FIG. 7) where the dual transport paths (e.g., dual traversers) 550A, 550B provide for travel of the case units in opposite directions along the X (or Y) axis to effect buffering of the case units $\Omega 1$-$\Omega n$ along any lift axis 150X1-150Xn of the lift transport system 500 and/or buffering the case units on the traverser 550 itself while providing a substantially non-stop transport of case units $\Omega 1$-$\Omega n$ to the common output 300. In one aspect, the dual transport paths 550A, 550B may be vertically offset from each other or disposed in a common (e.g., the same) vertical plane.

Figure 8:
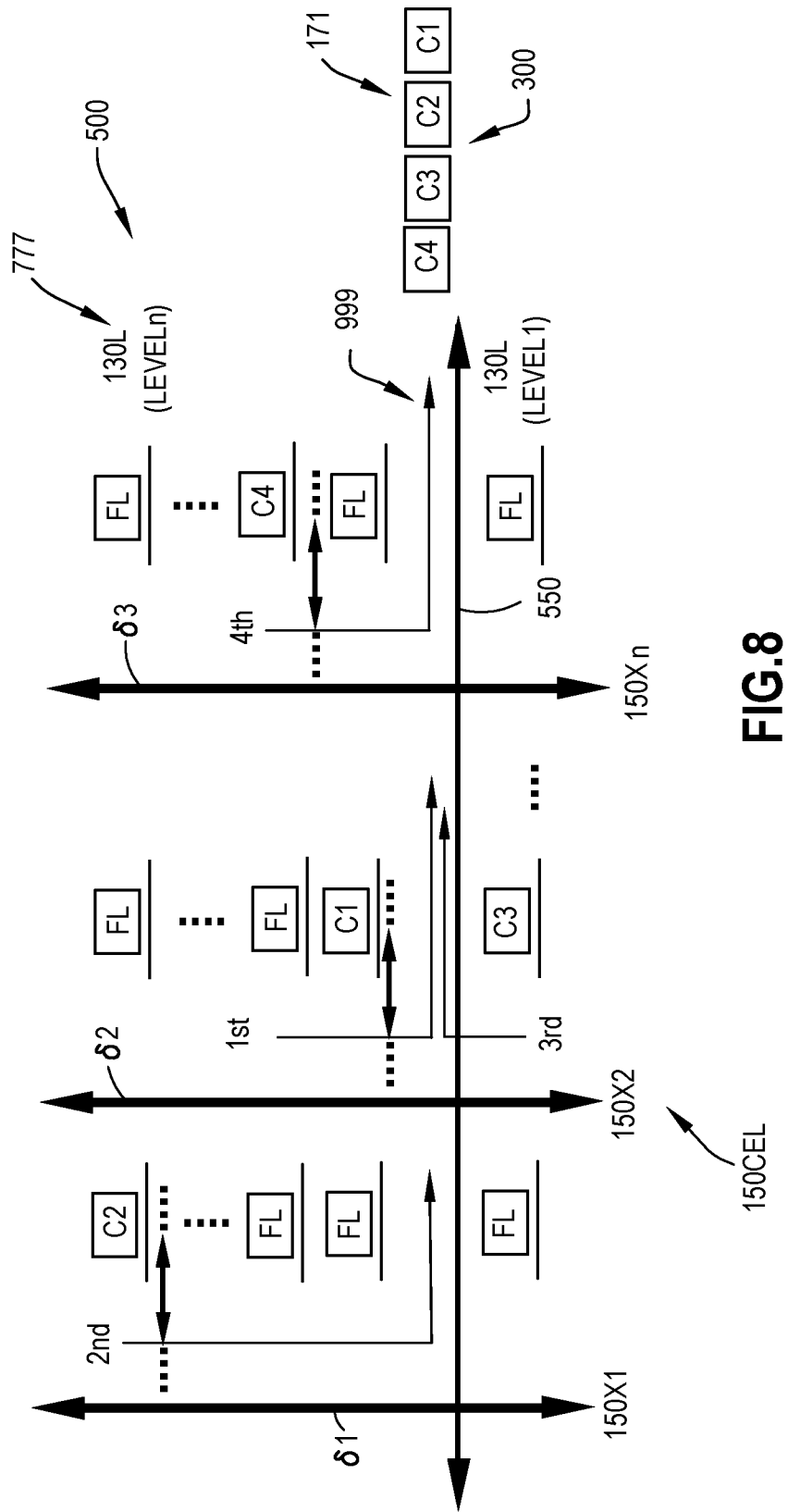
FIG. 8 is a schematic illustration of a portion of the storage and retrieval system in accordance with aspects of the disclosed embodiment.
Figure 8A:
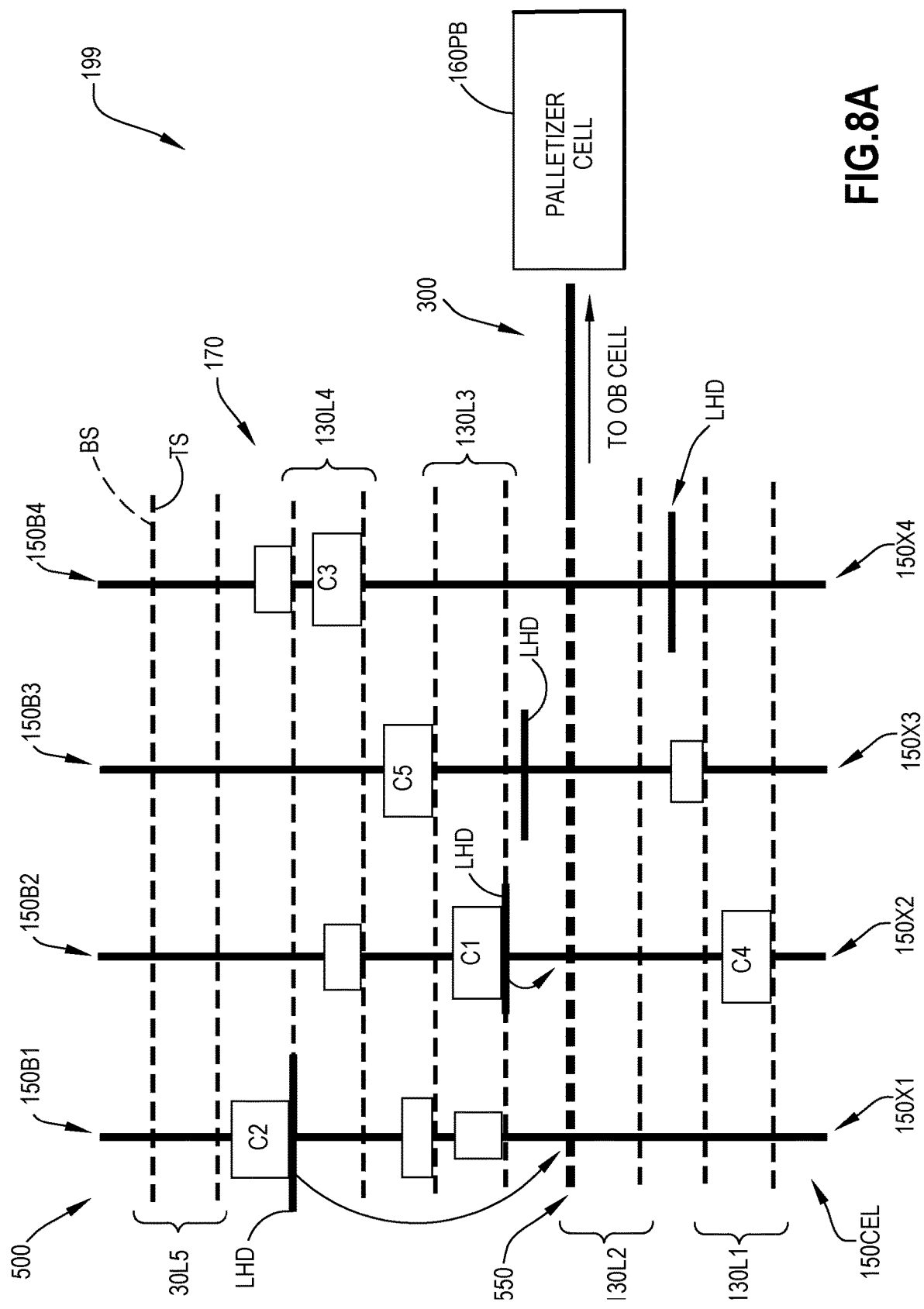
FIGS. 8A, 8B, and 8C are schematic illustrations of a portion of the storage and retrieval system in accordance with aspects of the disclosed embodiment.
Figure 8B:
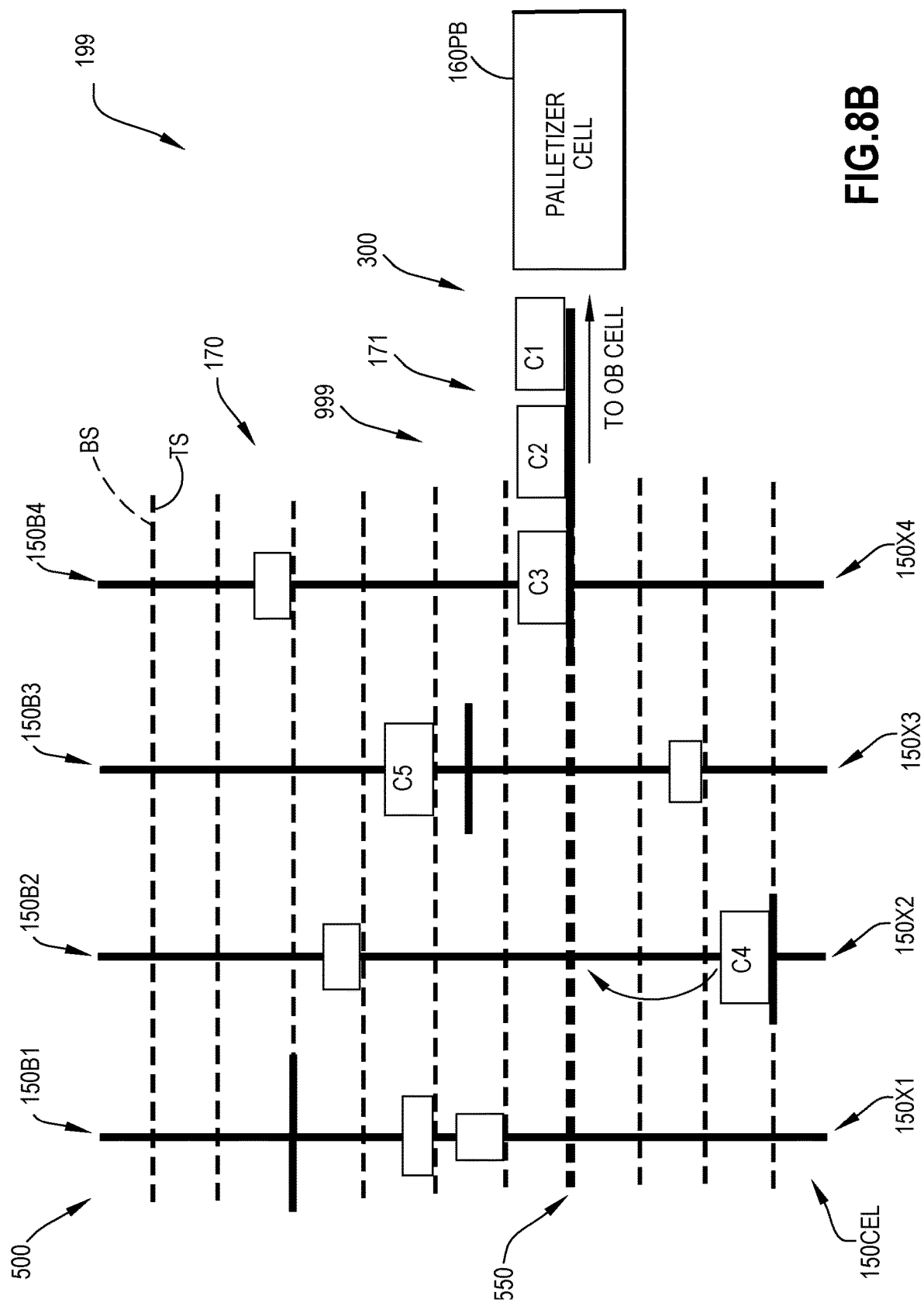
Figure 8C:
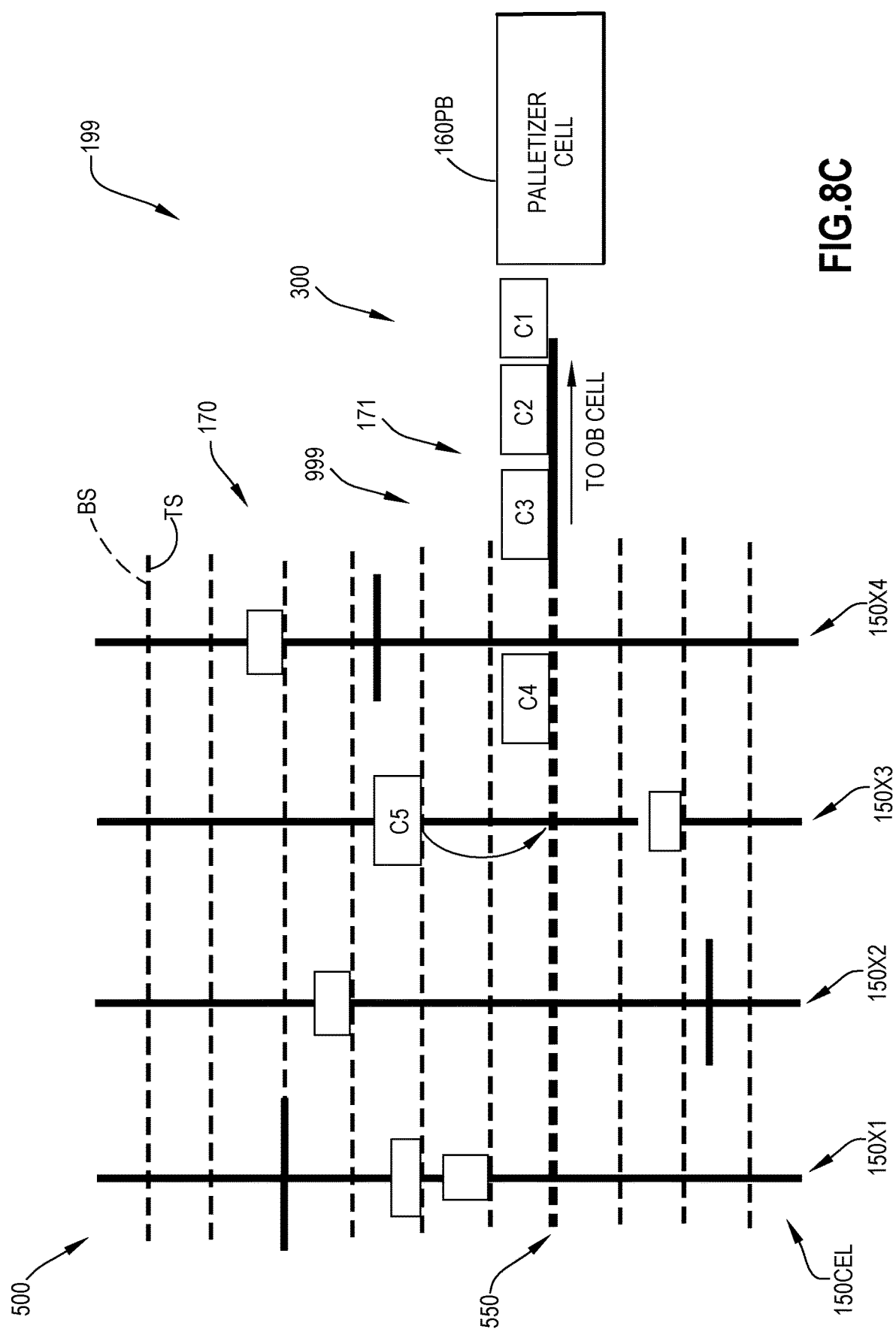

FIGS. 8 and 8A-8C illustrate one example of multi-lift case sequencing. FIG. 8 is representative of what is illustrated in FIGS. 8A-8C and illustrates in a two-dimensional plane the transfer of case units from the different levels 130L (level 1 to level n) of the common infeed interface 555 frame 777 formed by lift axes 150X1-150Xn. For illustrative purposes only, the case units being transferred to the common output 300 are at least case units C1-C4 (which can also be referred to as $\Omega 1$-$\Omega 4$). Case units labeled FL are not yet being transferred by occupy a lift axis transfer location at a respective level 130L. Here lift axes 150X1-150Xn transfer case units to the traverse 550 so that the case units are in the order C1, C2, C3, C4 corresponding to the superior ordered sequence of mixed cases 171S. As described above, the transfer of the case units from the respective lift axis 150X1-150Xn to the traverse 550 may be along parallel transport paths disposed between the lift axes 150X1 and the traverse 550 and/or the case units may be placed on the traverse 550 by the respective lift axis 150X1-150Xn.

FIGS. 8A-8C four independent lift axes 150X1-150X4 are illustrated for exemplary purposes only but in other aspects any suitable number of independent lift axes may be employed. Also, the resequencing of mixed cases will be described with respect to cases C1-C5 but in other aspects any suitable number of cases may be resequenced and output from the lifting transport system 500. Here each case C1-C5 ordinate is unique within the predetermined case out order sequence of mixed cases 172 (FIG. 1A), which is this example is C1, C2, C3, C4, C5, and thus, within the superior ordered sequence of mixed cases 171S (FIG. 1A) at the common output 300 of the lifting transport system 500; though each different unique case ordinate may include one or more cases of which one or more may be common cases to other different case ordinates.

As described herein, the more than one independent lift axes 150X1-150Xn (in this example, 150X1-150X4) have a configuration that resequences on the fly (or in motus) so that the output ordered sequence improves (e.g., there is a superior change in mixed case order compared to the inferior ordered sequence of mixed cases 170 input to the lifting transport system 500) regardless of input to the lifting transport system 500, and hence decouples the lifting transport system 500 output from the lifting transport system 500 input. As such, the lifting transport system 500 is configured to decouple bot(s) 110, from specific case(s) transfer to the lifts 150B1-150B4.

Figure 9:
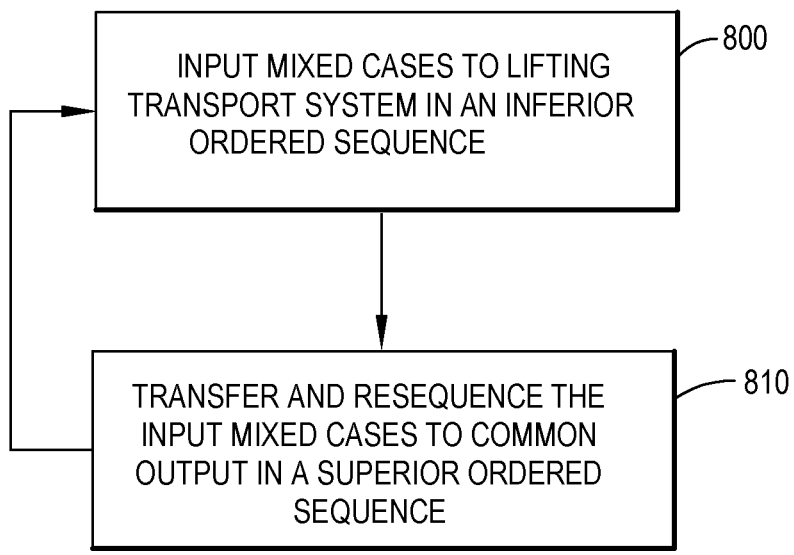
FIG. 9 is a flow diagram of a vertical case unit sequencing in accordance with aspects of the disclosed embodiment.

Here, the bots 110 of the respective asynchronous level transport system 191 input mixed case units to the lifting transport system 500 in the inferior ordered sequence of mixed cases 170 (FIG. 9, Block 800), such as by placing the case units C1-C5 on, e.g., transfer shelves TS in any suitable manner and in any suitable order, as noted herein. For example, case C2 is placed on level 130L4 at a transfer station corresponding to lift axis 150X1; case C1 is placed on level 130L3 at a transfer station corresponding to lift axis 150X2; case C5 is placed on level 130L3 at a transfer station corresponding to lift axis 150X3; case C4 is placed on level 130L1 at a transfer station corresponding to lift axis 150X2; and case C3 is placed on level 130L4 at a transfer station corresponding to lift axis 150X4. One or more lift axes 150X1-150X4 transfer and resequence the input mixed case units to the common output 300 in the superior ordered sequence of mixed cases 171S (FIG. 9, Block 810) according to the case out ordered sequence of mixed cases 172. In this example, lift axis 150X2 transfers case C1 from the transfer station TS on level 130L3 to the traverse 550. Lift axis 150X1 transfers case C2 from the transfer station TS on level 130L4 to the traverse 550, where case units C1 and C2 are placed on and travel along the traverse 550 so as to be in the ordered sequence C1, C2 (see FIG. 8B). Lift axis 150X4 transfers case C3 from the transfer station TS on level 130L4 to the traverse 550 so that case C3 follows case C2 in the ordered sequence. Lift axis 150X2 transfers case C4 from the transfer station TS on level 130L1 to the traverse 550 so that case C4 follows case C3; and lift axis 150X3 transfers case C5 from the transfer station TS on level 130L3 to the traverse 550 so that case C5 follows case C4 (see FIG. 8C). As may be realized, the case transfer and resequencing may continue with any lift axis(es) for any suitable number of cases to deliver the cases to the common output 300 in the superior order sequence of mixed cases 171 that has an improved sequence order (with respect to the case out ordered sequence of mixed cases 172) when compared with the inferior ordered sequence of mixed cases 170.

Figure 10A:
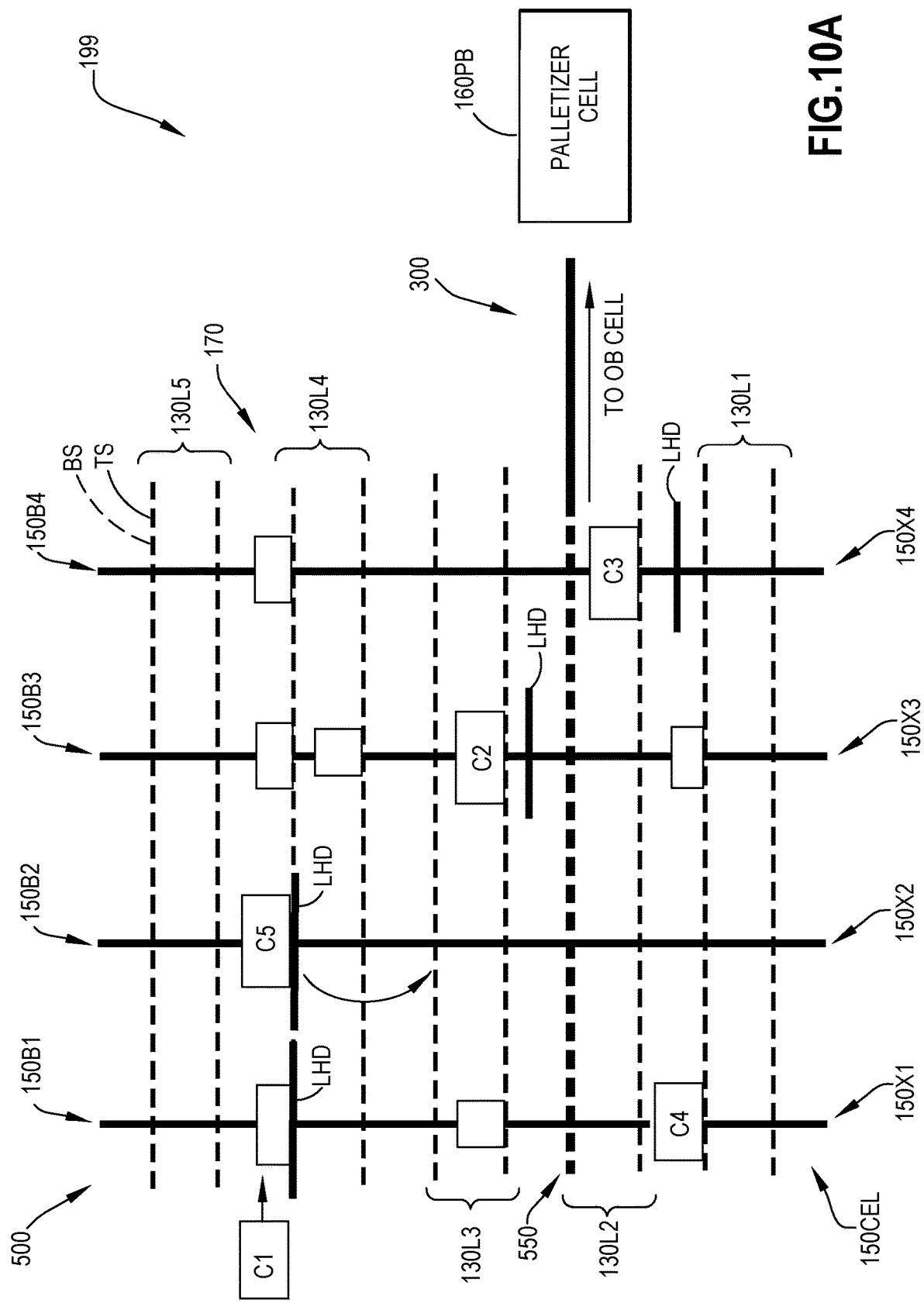
FIGS. 10A, 10B, and 10C are schematic illustrations of a portion of the storage and retrieval system in accordance with aspects of the disclosed embodiment.
Figure 10B:
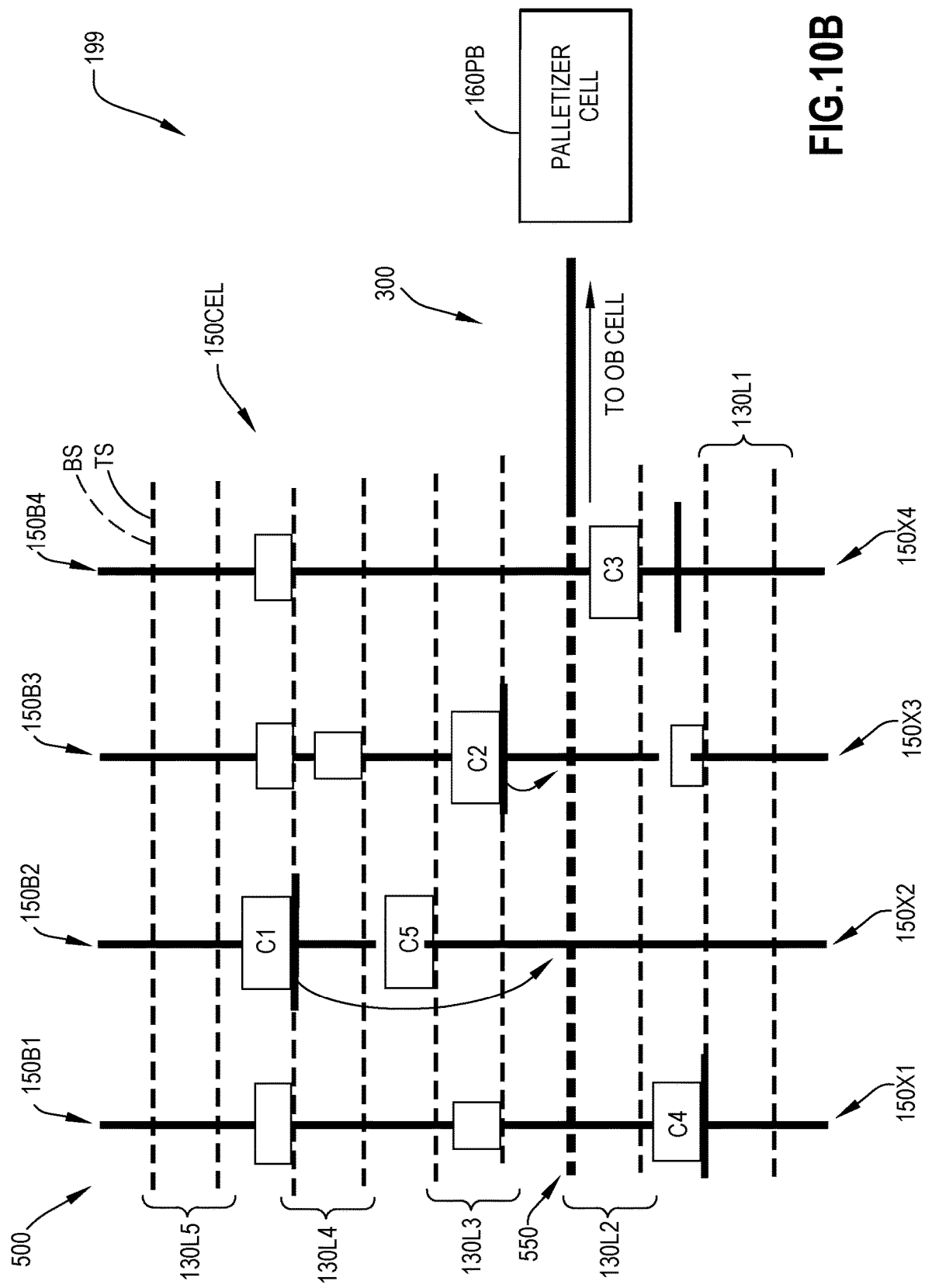
Figure 10C:
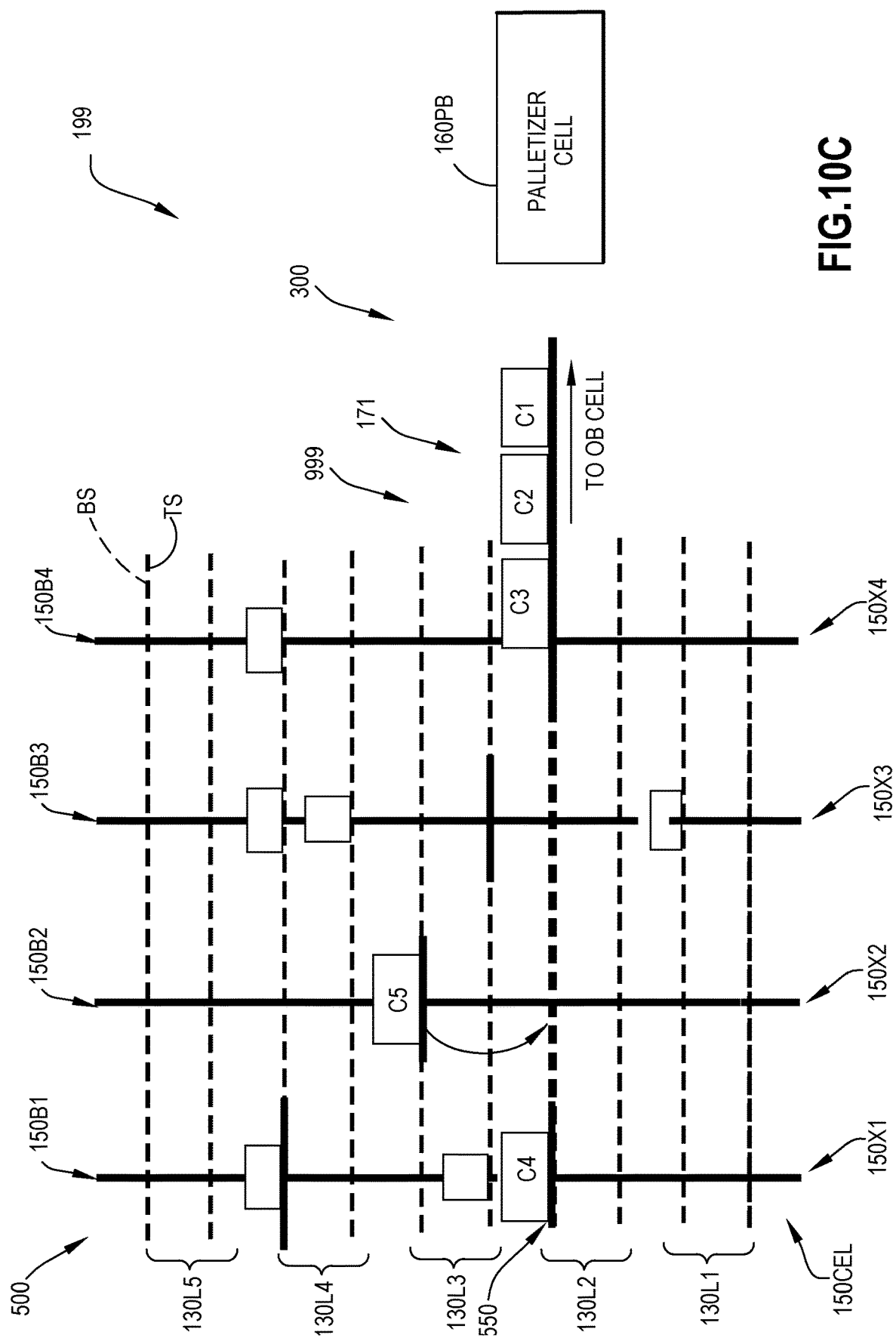

FIGS. 10 and 10A-10C illustrate another example of multi-lift case sequencing. FIG. 10 is representative of what is illustrated in FIGS. 10A-10C and illustrates in a two-dimensional plane the transfer of case units from the different levels 130L (level 1 to level n) of the common infeed interface 555 frame 777 formed by lift axes 150X1-150Xn with case buffering, by one or more lift axis 150X1-150Xn, between storage levels 130L so that the mixed cases output from by the lifting transport system 500 are resequenced and transported to the common output 300. Here at least one lift axis 150X1-150Xn defines a lift axis shunt or lift axis bypass path that stages (e.g., temporarily stores) case units on different transfer/buffer shelves or suitable conveyors to improve the ordered sequence of cases output from the lifting transport system 500.

In FIG. 10, and for illustrative purposes only, the case units being transferred to the common output 300 are at least case units C1-C4 (which can also be referred to as Ω1-Ω4). Case units labeled FL are not yet being transferred by occupy a lift axis transfer location at a respective level 130L. As can be seen in FIG. 10, case unit C3 and case unit C1 are arriving at the common infeed interface 555 frame 777 on the same level 130L (e.g., level n) and at the same lift axis 150X2. Here case unit C3 arrives before case unit C1; however, case unit C1 comes before case unit C3 in the ordered sequence of cases output from the lifting transport system 500. Here, lift axis 150X2 is controlled to remove case unit C3 from level n and place case unit C3 at an empty storage location at level 2 along the lift axis 150X2 so that case unit C1 is accessible. The lift axes 150X1-150Xn are controlled, as described above, to transfer the case units C1-C4 to the common output so that the case units are in the superior order sequence of mixed cases 171 at the common output 300. Again, the transfer of the case units from the respective lift axis 150X1-150Xn to the traverse 550 may be along parallel transport paths disposed between the lift axes 150X1 and the traverse 550 and/or the case units may be placed on the traverse 550 by the respective lift axis 150X1-150Xn.

In the example illustrated in FIGS. 10A-10C, the case units are transported and input to the lifting transport system 500 in a manner substantially similar to that described above (FIG. 11, Block 1000). Here, case C4 is placed on level 130L1 at a transfer station TS corresponding to lift axis 150X1; case C5 is placed on level 130L4 at a transfer station TS corresponding to lift axis 150X2; case C2 is placed on level 130L3 at a transfer station TS corresponding to lift axis 150X3; and case C3 is placed on level 130L2 at a transfer station TS corresponding to lift axis 150X4. In this example, case C1 is input to the lifting transport system 500 behind case C5 on level 130L4 at a buffer station BS corresponding to lift axis 150X2 where case C5 is blocking placement of case C1 onto the traverse 550.

Figure 11:
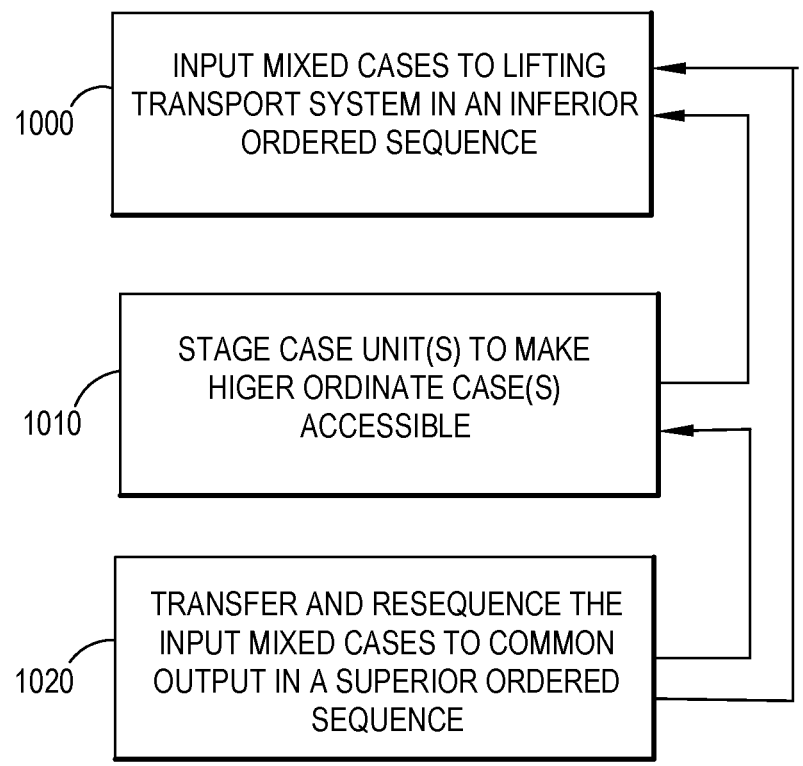
FIG. 11 is a flow diagram of a vertical case unit sequencing in accordance with aspects of the disclosed embodiment.

Case C5 is moved by lift axis 150X2 to a transfer station TS/buffer station BS or conveyor on another level (in this example, case C5 is staged on level 130L3—see FIG. 10B) that corresponds with the lift axis 150X2 so that a "hole is made" in the inferior ordered sequence of mixed cases 170 input to the lifting transport system 500 and a higher ordinate case(s) (in this example, case C1) in the superior ordered sequence of mixed cases 171S become(s) accessible to the respective lift axis 150X2 (FIG. 11, Block 1010). With case C5 staged on level 130L3, the lift axis 150X2 can remove case C1 from the transfer shelf TS or buffer shelf BS on level 130L4 and transfer/resequence case C1 to the traverse 550 (FIG. 10B; FIG. 11, Block 1020). In a manner similar to that described above, case units C2-C5 are resequenced and transferred to the traverse 550, by their respective lift axis 150X1-150X4, to the common output 300 in the superior ordered sequence of mixed cases 171S (FIG. 11, Block 1020).

Figure 12:
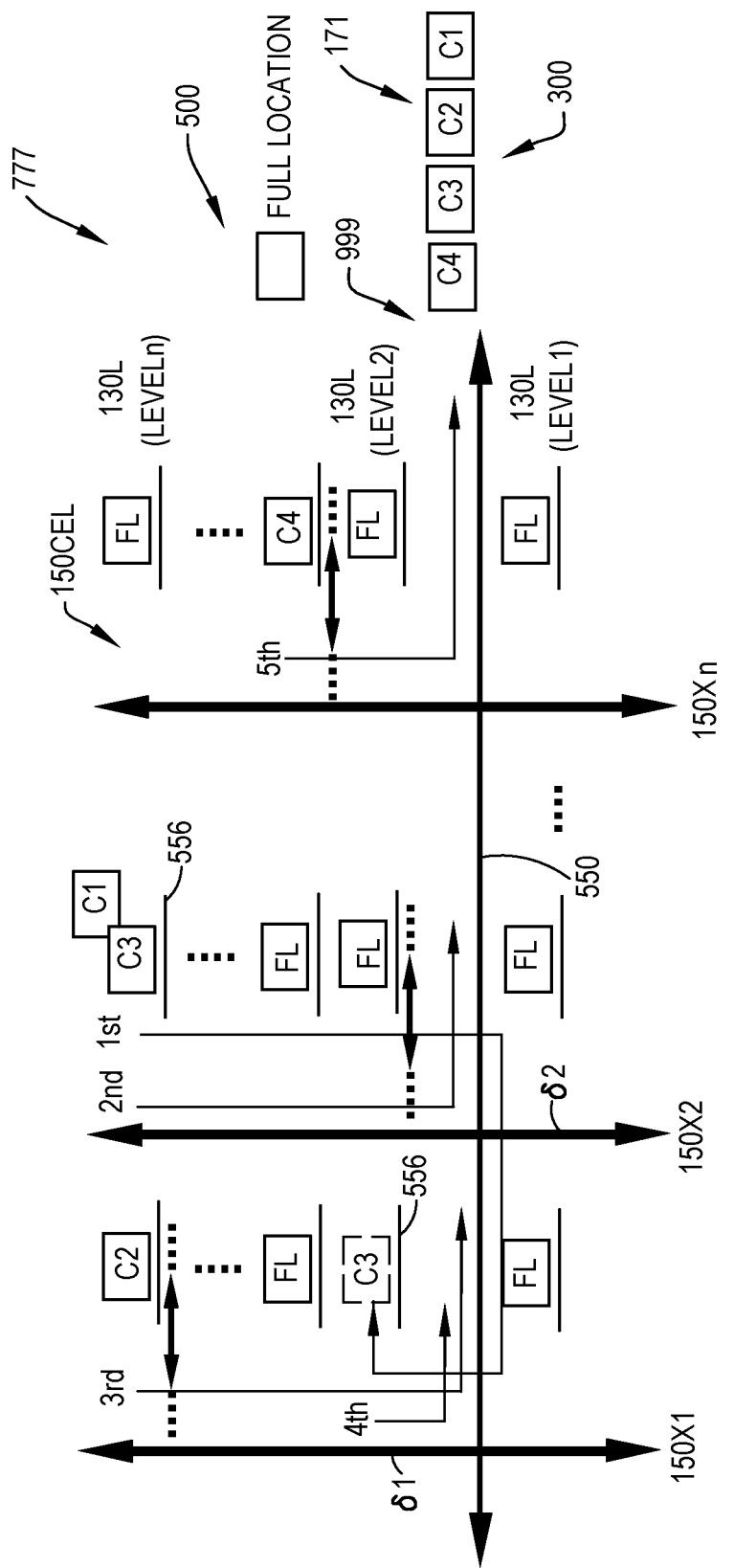
FIG. 12 is a schematic illustration of a portion of the storage and retrieval system in accordance with aspects of the disclosed embodiment.
Figure 12A:
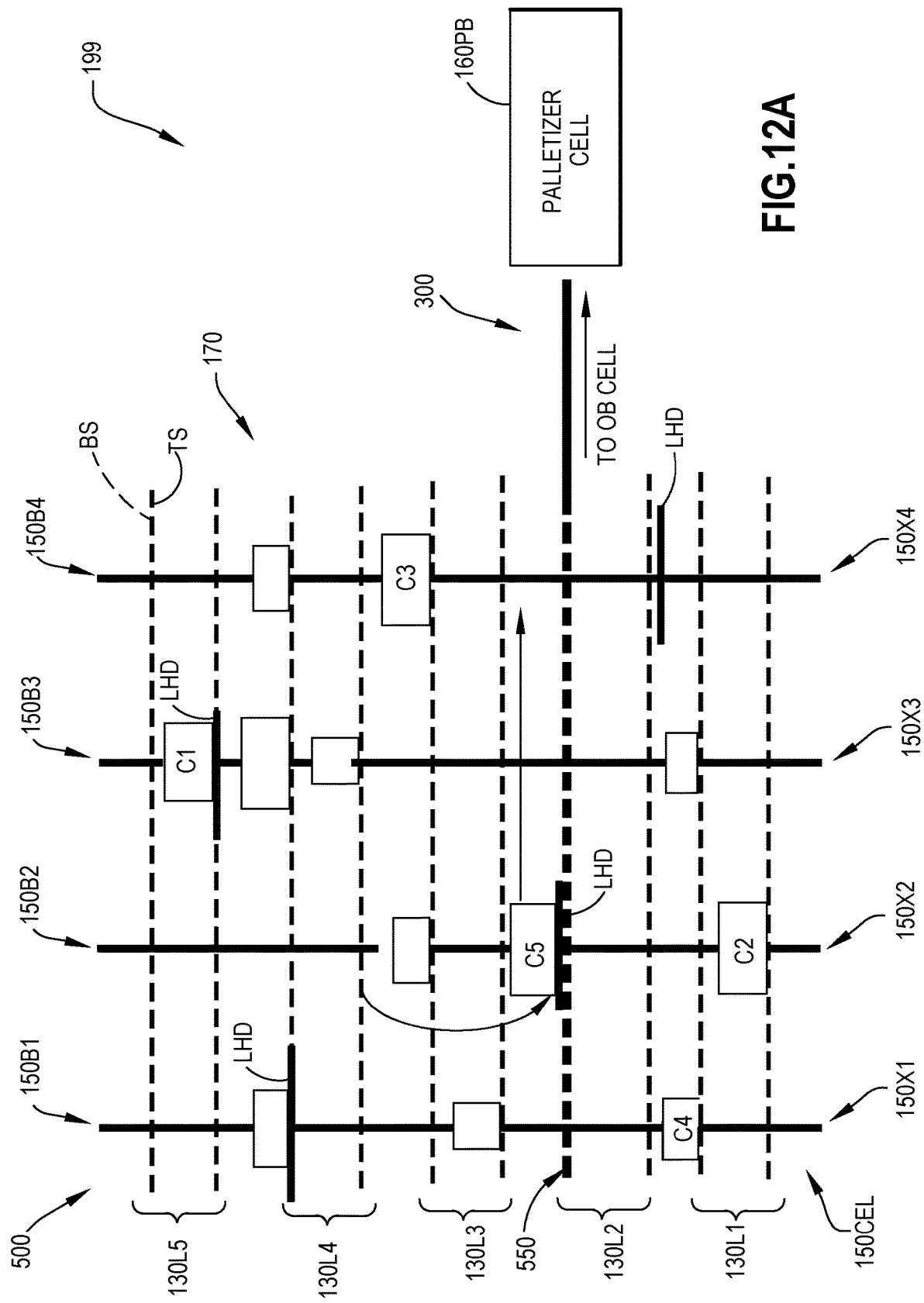
FIGS. 12A, 12B, and 12C are schematic illustrations of a portion of the storage and retrieval system in accordance with aspects of the disclosed embodiment.
Figure 12B:
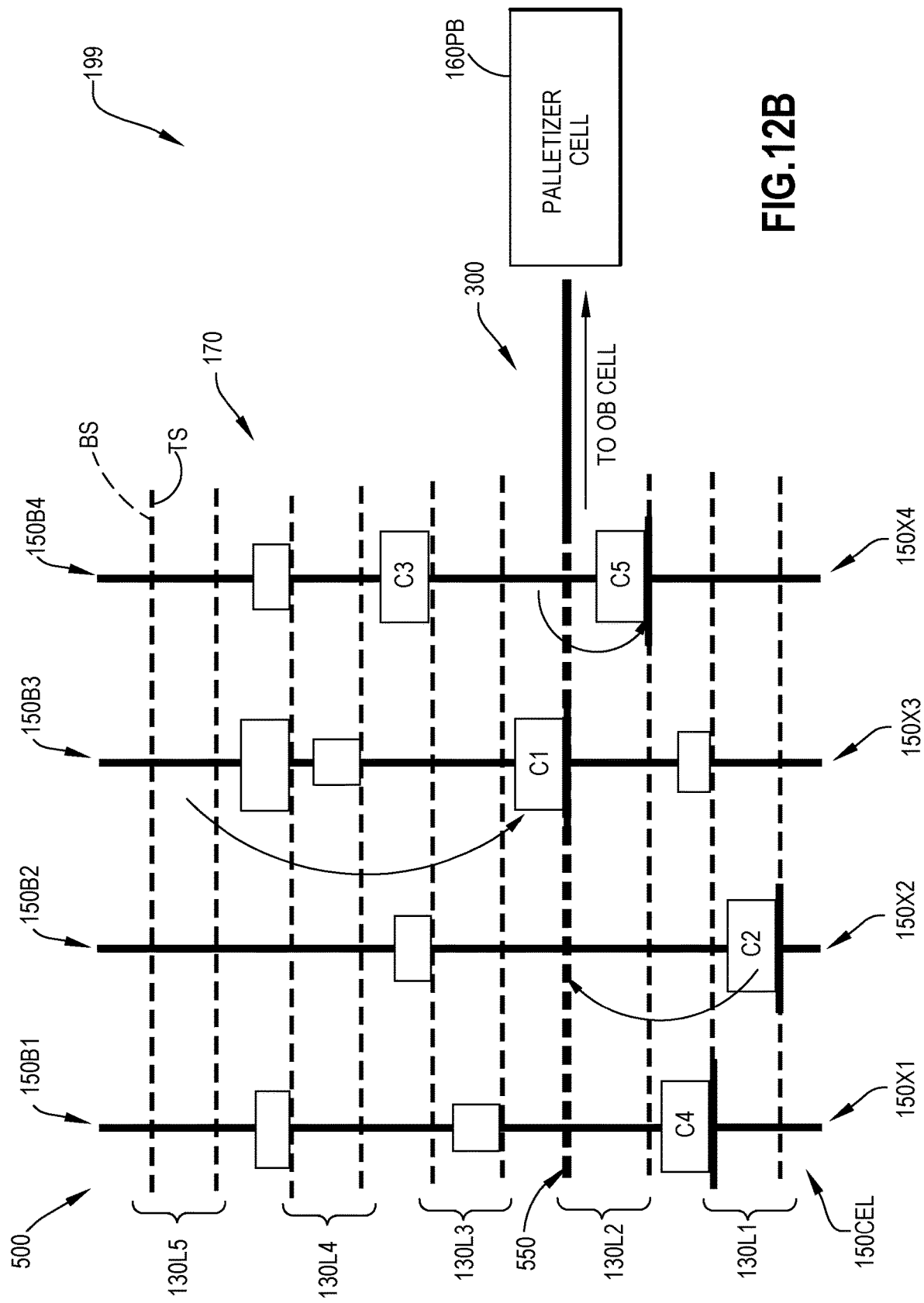
Figure 12C:
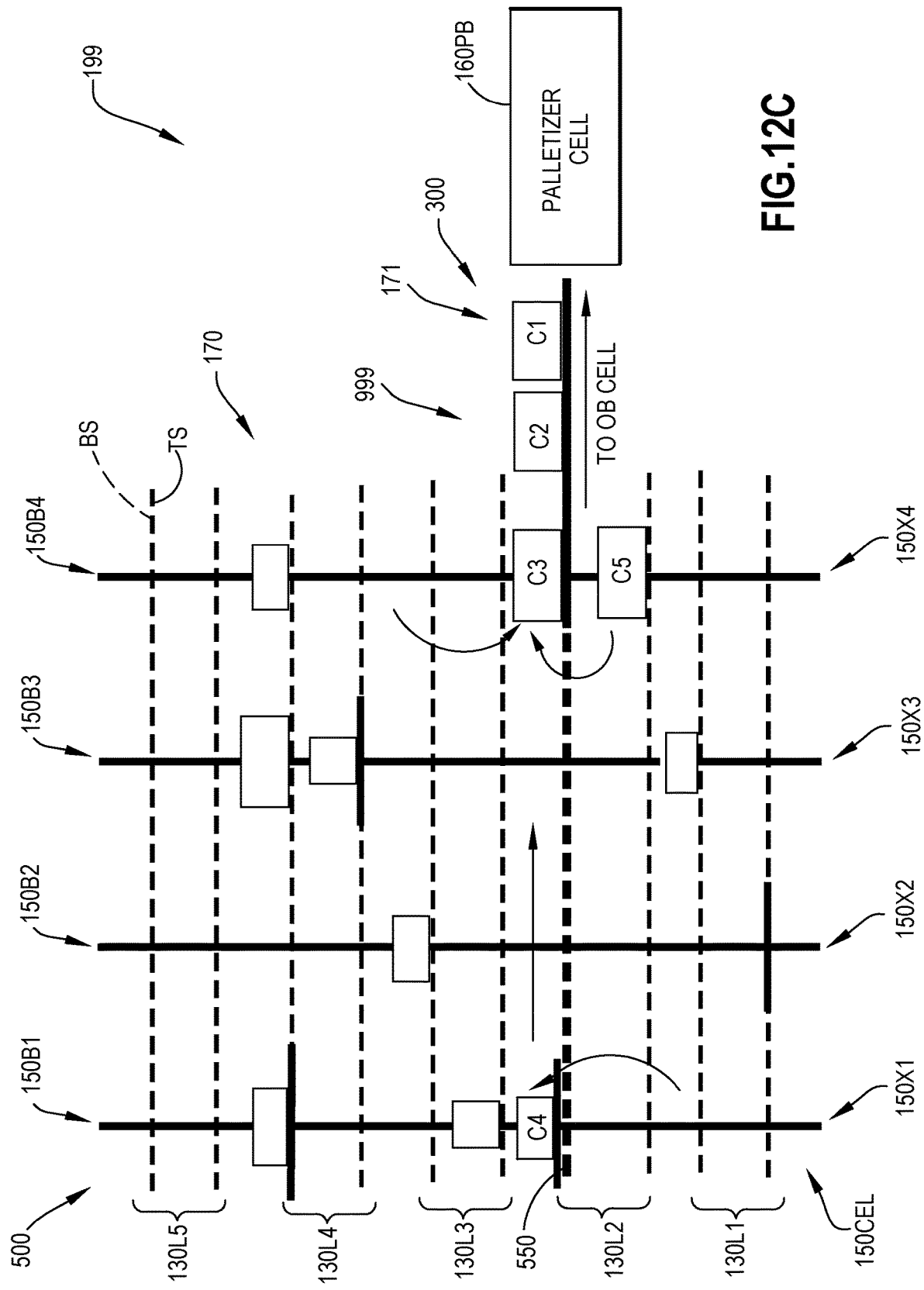

FIGS. 12 and 12A-12C illustrate yet another example of multi-lift case sequencing. FIG. 12 is representative of what is illustrated in FIGS. 12A-12C and illustrates in a two-dimensional plane the transfer of case units from the different levels 130L (level 1 to level n) of the common infeed interface 555 frame 777 formed by lift axes 150X1-150Xn with case buffering, between two or more lift axes 150X1-150Xn, and between storage levels 130L so that the mixed cases output from by the lifting transport system 500 are resequenced and transported to the common output 300. In this example, the traverse 550 provides a lift axis shunt or lift axis bypass, where case(s) are transported along the traverse 550 to open lift axis positions and are staged at any lift level (by a respective lift axis) to improve the output sequence of mixed cases output from the lifting transport system 500. In a manner similar to that described above, at least one lift axis 150X1-150Xn may also define a lift axis shunt or lift axis bypass path that stages case units on different transfer/buffer shelves or suitable conveyors to improve the ordered sequence of cases output from the lifting transport system 500.

In FIG. 12, and for illustrative purposes only, the case units being transferred to the common output 300 are at least case units C1-C4 (which can also be referred to as Ω1-Ω4). Case units labeled FL are not yet being transferred by occupy a lift axis transfer location at a respective level 130L. As can be seen in FIG. 12, case unit C3 and case unit C1 are arriving at the common infeed interface 555 frame 777 on the same level 130L (e.g., level n) and at the same lift axis 150X2. Here case unit C3 arrives before case unit C1; however, case unit C1 comes before case unit C3 in the ordered sequence of cases output from the lifting transport system 500. Lift axis 150X2 is controlled to remove case unit C3 from level n and place case unit C3 on the traverse 550 for transfer to lift axis 150X1 so that case unit C1 is accessible. Lift axis 150X1 is controlled to remove case unit C3 from the traverse 550 and place case units C3 in an empty storage location at level 2 along the lift axis 150X1. The lift axes 150X1-150Xn are controlled, as described above, to transfer the case units C1-C4 to the common output so that the case units are in the superior order sequence of mixed cases 171 at the common output 300. Again, the transfer of the case units from the respective lift axis 150X1-150Xn to the traverse 550 may be along parallel transport paths disposed between the lift axes 150X1 and the traverse 550 and/or the case units may be placed on the traverse 550 by the respective lift axis 150X1-150Xn.

In the example illustrated in FIGS. 12A-12C, the case units are transported and input to the lifting transport system 500 in a manner substantially similar to that described above (FIG. 13, Block 12000). Here, case C4 is placed on level 130L1 at a transfer station TS corresponding to lift axis 150X1; case C5 is placed on level 130L4 at a transfer station TS corresponding to lift axis 150X2; case C2 is placed on level 130L1 at a transfer station TS corresponding to lift axis 150X2; case C1 is placed on level 130L5 at a transfer station TS corresponding to lift axis 150X3; and case C3 is placed on level 130L3 at a transfer station corresponding to lift axis 150X4. In this example, one or more case unit(s) are transferred to the traverse 550 by one or more lift axes 150X1-150Xn for transfer to and staging along another lift axis 150X1-150Xn (FIG. 13, Block 12100). For example, lift axis 150X2 picks case C5 from the transfer station TS on level 130L4 and places case C5 on the traverse 550. The traverse 550 transports case C5 to any other suitable lift axis 150X1-150Xn for staging along the respective lift axis 150X1-150Xn to improve the ordered sequence of cases output from the lifting transport system 500 (FIG. 12A). For purposes of illustration only, traverse 550 transports case C5 to lift axis 150X4, where the lift axis 150X4 picks case C5 from the traverse 550 and stages case C5 at, for example, level 130L2 of lift axis 150X4 (FIG. 12B). In other aspects, case units may be transferred along a common lift axis for staging in the manner described above with respect to FIGS. 10A-10C (FIG. 13, Block 12200).

The case units (pre or post staging) are transferred and resequenced to the common output in the superior ordered sequence (FIG. 13, Block 12300). For example, case C1 is transferred to the traverse 550 from level 130L5 by lift axis 150X3; and case C2 is transferred to the traverse 550 from level 130L1 (FIG. 12B), where case units C1 and C2 are placed on the traverse 550 so as to be in the superior ordered sequence of mixed cases 171S. Case C3 is transferred from level 130L3 along lift axis 150X4 for placement on traverse 550 and case C4 is transferred from level 130L1 along lift axis 150X1 for placement on traverse 550, where, as above, case units C3 and C4 are placed on the traverse 550 so as to be in the superior ordered sequence of mixed cases 171S. Case C5 is transferred from level 130L2 along lift axis 150X4 for placement on traverse 550 following case C4.

Figure 15:
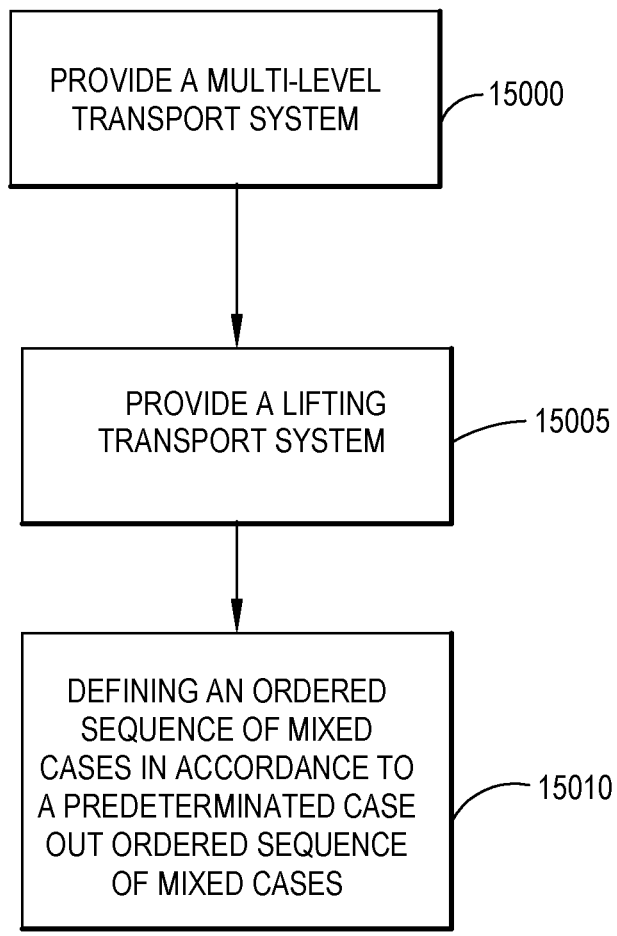
FIG. 15 is a flow diagram of an exemplary product order fulfillment method in accordance with aspects of the disclosed embodiment.

Referring now to FIGS. 1A and 15 an exemplary product order fulfillment method will be described. The multi-level transport system 190 is provided (FIG. 15, Block 15000), where, as described above, each level 130L thereof has a corresponding independent asynchronous level transport system 191, of mixed cases, separate and distinct from the asynchronous level transport system 191 corresponding to each other level 130L of the multi-level transport system 190. The lifting transport system 500 is provided (FIG. 15, Block 15005) and includes, as described above, the more than one independent lift axis 150X1-150Xn. An ordered sequence of mixed cases is created, with the more than one independent lift axes 150X1-150Xn, in accordance to a predetermined case out ordered sequence of mixed cases 172 (FIG. 15, Block 15010), where each independent lift axis 150X1-150Xn is communicably coupled to each other independent lift axis 150X1-150Xn of the more than one lift axis 150X1-150Xn and forms the common output 300 of mixed cases output by each of the more than one independent lift axis 150X1-150Xn. In creating the ordered sequence of mixed cases 171 the mixed cases are resequenced, as described above, effecting a change in the ordered sequence of the mixed cases, with the lifting transport system 500 on the fly or in motus, at infeed of the lifting transport system 500, to the superior ordered sequence of mixed cases 171S at the output of the lifting transport system 500.

Creating the ordered sequence of mixed cases 171 may also include forming a bypass path, as described above, with the traverse 550. In one aspect, forming a bypass path, effects resequencing, at least in part, from an inferior ordered sequence of mixed cases 170, at infeed of the lifting transport system 500, to the superior ordered sequence of mixed cases 171S, at output of the lifting transport system, the inferior ordered sequence of mixed cases 170 and superior ordered sequence of mixed cases 171S respectively being of inferior sequencing in sequence order and superior sequencing in sequence order relative to the predetermined case out ordered sequence of mixed cases 172. In another aspect, forming a bypass path effects resequencing, at least in part, from the inferior ordered sequence of mixed cases 170, at infeed of the lifting transport system, to the superior ordered sequence of mixed cases 171S, at output of the lifting transport system 500, the inferior ordered sequence of mixed cases 170 and superior ordered sequence of mixed cases 171S respectively being of inferior sequencing in sequence order and superior sequencing in sequence order relative to the predetermined case out ordered sequence of mixed cases 172.

Figure 16:
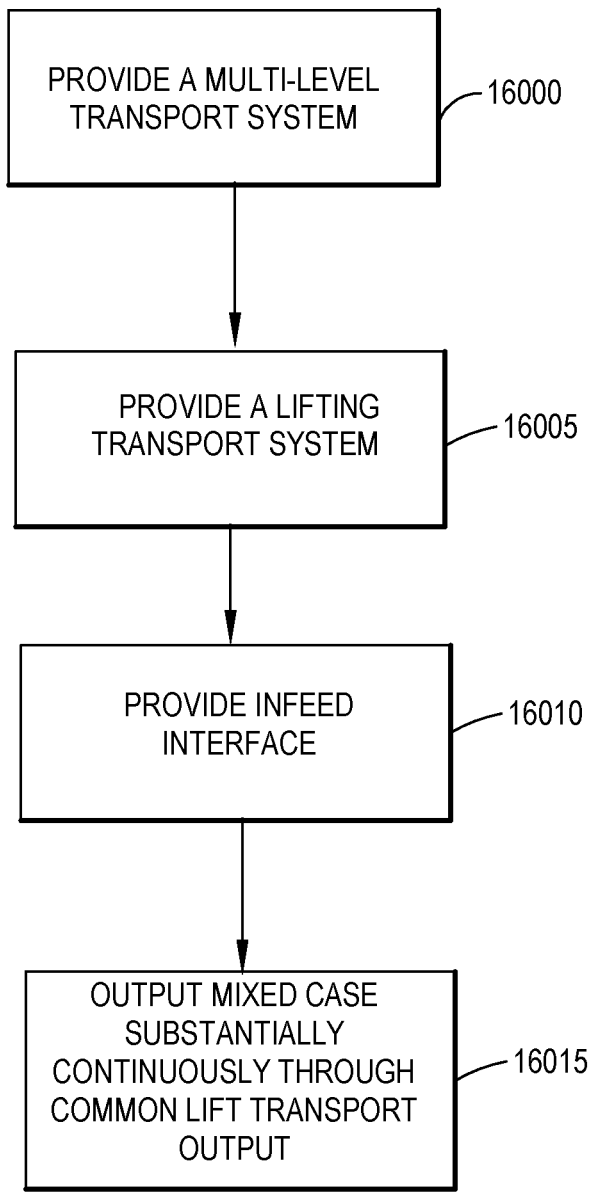
FIG. 16 a flow diagram of an exemplary product order fulfillment method in accordance with aspects of the disclosed embodiment.

Referring now to FIGS. 1A and 16 an exemplary product order fulfillment method will be described. The multi-level transport system 190 is provided (FIG. 16, Block 16000), where, as described above, each level 130L thereof has a corresponding independent asynchronous level transport system 191, of mixed cases, separate and distinct from the asynchronous level transport system 191 corresponding to each other level 130L of the multi-level transport system 190. The lifting transport system 500 is provided (FIG. 16, Block 16005) and includes, as described above, the more than one independent lift axis 150X1-150Xn. An infeed interface 555 is provided (FIG. 16, Block 16010) and communicably couples the multi-level transport system with each of the more than one independent lift axis 150X1-150Xn, where, as described above, the infeed interface 555 includes different infeed stations 556 distributed at each asynchronous level transport system 191 for each of the more than one independent lift axis 150X1-150Xn so that each of the more than one independent lift axis 150X1-150Xn has a different corresponding infeed station 556 at each asynchronous level transport system 191 through which mixed cases feed from the multi-level transport system 190 to each of the more than one independent lift axis 150X1-150Xn.

Mixed cases are output substantially continuously through the common output 300 (FIG. 16, Block 16015), with the more than one independent lift axis 150X1-150Xn, so as to output the mixed cases in a predetermined case out ordered sequence of mixed cases 172 decoupled from an available sequence of mixed cases 170 from and created by the multi-level transport system 190 at the infeed interface 555 and that feed the more than one independent lift axis 150X1-150Xn through the infeed interface 555. In one aspect, outputting the mixed cases includes creating, with the more than one independent lift axis 150X1-150Xn of the lifting transport system 500, a lift transport stream 999 of mixed cases from the infeed interface 555 as described above. In creating the lift transport stream 999 the mixed cases are resequenced, as described above, effecting a change in the ordered sequence of the mixed cases, with the lifting transport system 500 on the fly or in motus, at infeed of the lifting transport system 500, to the superior ordered sequence of mixed cases 171S at the output of the lifting transport system 500.

Creating the lift transport stream 999 may also include forming a bypass path, as described above, with the traverse 550. In one aspect, forming a bypass path, effects resequencing, at least in part, from an inferior ordered sequence of mixed cases 170, at infeed of the lifting transport system 500, to the superior ordered sequence of mixed cases 171S, at output of the lifting transport system, the inferior ordered sequence of mixed cases 170 and superior ordered sequence of mixed cases 171S respectively being of inferior sequencing in sequence order and superior sequencing in sequence order relative to the predetermined case out ordered sequence of mixed cases 172. In another aspect, forming a bypass path effects resequencing, at least in part, from the inferior ordered sequence of mixed cases 170, at infeed of the lifting transport system, to the superior ordered sequence of mixed cases 171S, at output of the lifting transport system 500, the inferior ordered sequence of mixed cases 170 and superior ordered sequence of mixed cases 171S respectively being of inferior sequencing in sequence order and superior sequencing in sequence order relative to the predetermined case out ordered sequence of mixed cases 172.

In accordance with one or more aspects of the disclosed embodiment a product order fulfillment system comprises:

a multi-level transport system, each level thereof having a corresponding independent asynchronous level transport system, of mixed cases, separate and distinct from the asynchronous level transport system corresponding to each other level of the multi-level transport system, the asynchronous level transport system defining an array of asynchronous level transport axes, corresponding to the level, and being configured to hold and asynchronously transport at least one case providing transport of mixed cases along the array of asynchronous level transport axes; and a lifting transport system with more than one independent lift axis, each of the more than one independent lift axis being configured to independently hold the at least one case and reciprocate along a lift travel axis independently raising and lowering the at least one case providing lifting transport of mixed cases between more than one of the levels of the multi-level transport system, each independent lift axis being communicably coupled to each asynchronous level transport system so as to provide for exchange of the at least one case between each asynchronous level transport system and each independent lift axis, and mixed cases transferred from at least one asynchronous level transport system infeed to each of the more than one independent lift axis so that mixed cases are output by the independent lift axis from the multi-level transport system;

wherein each independent lift axis, of the more than one lift axis, is communicably coupled to each other independent lift axis of the more than one lift axis and forms a common output of mixed cases output by each of the more than one independent lift axis, and the more than one independent lift axis are configured so as to create, at and from the common output, an ordered sequence of mixed cases in accordance to a predetermined case out ordered sequence of mixed cases.

In accordance with one or more aspects of the disclosed embodiment, the more than one independent lift axis form an array of lift axes arrayed in at least one direction.

In accordance with one or more aspects of the disclosed embodiment, the more than one independent lift axis form an array of lift axes arrayed in more than one direction.

In accordance with one or more aspects of the disclosed embodiment the more than one independent lift axis are configured so as to resequence the mixed cases and effect a change in the ordered sequence of the mixed cases, with the lifting transport system in motus, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence.

In accordance with one or more aspects of the disclosed embodiment the superior ordered sequence is characterized by its sequence order of mixed cases that converges with the predetermined case out ordered sequence so that there is a strong correlation between respective sequence orders of the superior ordered sequence and the predetermined case out ordered sequence, and wherein the inferior ordered sequence is characterized by its sequence order of mixed cases that diverges from or is substantially neutral to the predetermined case out ordered sequence so that there is a weak correlation between respective sequence orders of the inferior ordered sequence and the predetermined case out ordered sequence.

In accordance with one or more aspects of the disclosed embodiment the strong correlation is such that the sequence order is a near net sequence order to that of the predetermined case out ordered sequence of mixed cases.

In accordance with one or more aspects of the disclosed embodiment each of the more than one independent lift axis is communicably coupled to each asynchronous level transport axis of the array of asynchronous level transport axes corresponding to each asynchronous level transport system.

In accordance with one or more aspects of the disclosed embodiment each of the more than one independent lift axis has a corresponding output section, and a traverse operably connecting the corresponding output section of each of the more than one independent lift axis to the common output so that mixed cases from each independent lift axis reach the common output via the traverse.

In accordance with one or more aspects of the disclosed embodiment the ordered sequence of mixed cases at the common output is created on the traverse, and substantially within bounds defined by outermost independent lift axes of the lifting transport system.

In accordance with one or more aspects of the disclosed embodiment the traverse operably interconnects at least two of the more than one independent lift axis with each other.

In accordance with one or more aspects of the disclosed embodiment the traverse is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment at least one independent lift axis of the more than one independent lift axis is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment, the bypass path formed by the at least one independent lift axis crosses the lift axis from one side to another side on a common level of the multi-level transport system.

In accordance with one or more aspects of the disclosed embodiment, the bypass path swaps cases from one side of the lift axis to another side of the lift axis on the common level.

In accordance with one or more aspects of the disclosed embodiment, the bypass path formed by the at least one independent lift axis crosses the lift axis from one side to another side on different levels of the multi-level transport system.

In accordance with one or more aspects of the disclosed embodiment, the bypass path has a bypass portion extending along the lift axis and bypass portions extending along respective planes of the different levels.

In accordance with one or more aspects of the disclosed embodiment, the bypass path swaps cases from one side of the lift axis to another side of the lift axis on the different levels.

In accordance with one or more aspects of the disclosed embodiment, the bypass path formed by the at least one independent lift axis has at least a bypass portion extending along the lift axis and has bypass portions extending along respective planes of different levels on a same side of the lift axis.

In accordance with one or more aspects of the disclosed embodiment, the bypass path swaps cases between the different levels on the same side of the lift axis.

In accordance with one or more aspects of the disclosed embodiment the ordered sequence of mixed cases created at and from the common output in accordance to a predetermined case out ordered sequence of mixed cases is produced substantially continuously and consistent with a high speed pallet builder building at least one mixed case pallet layer of mixed laterally distributed and stacked mixed cases.

In accordance with one or more aspects of the disclosed embodiment a product order fulfillment system comprises:

a multi-level transport system, each level thereof having a corresponding independent asynchronous level transport system, of mixed cases, separate and distinct from the asynchronous level transport system corresponding to each other level of the multi-level transport system, the asynchronous level transport system defining an array of asynchronous level transport axes, corresponding to the level, and being configured to hold and asynchronously transport at least one case providing transport of mixed cases along the array of asynchronous level transport axes;

a lifting transport system with more than one independent lift axis, each of the more than one independent lift axis being configured to independently hold the at least one case and reciprocate along a lift travel axis independently raising and lowering the at least one case, the more than one independent lift axis each being communicably coupled to a common lift transport output through which each of the more than one independent lift axis commonly output the mixed cases from lifting transport system; and an infeed interface communicably coupling the multi-level transport system with each of the more than one independent lift axis, the infeed interface comprising different infeed stations distributed at each asynchronous level transport system for each of the more than one independent lift axis so that each of the more than one independent lift axis has a different corresponding infeed station at each asynchronous level transport system through which mixed cases feed from the multi-level transport system to each of the more than one independent lift axis;

wherein the more than one independent lift axis are configured so as to output mixed cases substantially continuously through the common lift transport output in a predetermined case out ordered sequence decoupled from an available sequence of mixed cases from and created by the multi-level transport system at the infeed interface and that feed the more than one independent lift axis through the infeed interface.

In accordance with one or more aspects of the disclosed embodiment, the more than one independent lift axis form an array of lift axes arrayed in at least one direction.

In accordance with one or more aspects of the disclosed embodiment, the more than one independent lift axis form an array of lift axes arrayed in more than one direction.

In accordance with one or more aspects of the disclosed embodiment the more than one independent lift axis of the lifting transport system create a lift transport stream of mixed cases from the infeed interface, where the lift transport stream has the available sequence of mixed cases, to the common lift transport output where the lift transport stream has the predetermined case out ordered sequence, and at least one lift axis from the more than one independent lift axis defines a pass through with respect to another of the more than one independent lift axis effecting on the fly resequencing from the available sequence of mixed case in the lift transport stream to the predetermined case out ordered sequence of mixed cases at the common lift transport output.

In accordance with one or more aspects of the disclosed embodiment the more than one independent lift axis are configured so as to resequence the mixed cases and effect a change in the ordered sequence of the mixed cases, with the lifting transport system in motus, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence.

In accordance with one or more aspects of the disclosed embodiment the superior ordered sequence is characterized by its sequence order of mixed cases that converges with the predetermined case out ordered sequence so that there is a strong correlation between respective sequence orders of the superior ordered sequence and the predetermined case out ordered sequence, and wherein the inferior ordered sequence is characterized by its sequence order of mixed cases that diverges from or is substantially neutral to the predetermined case out ordered sequence so that there is a weak correlation between respective sequence orders of the inferior ordered sequence and the predetermined case out ordered sequence.

In accordance with one or more aspects of the disclosed embodiment the strong correlation is such that the sequence order is a near net sequence order to that of the predetermined case out ordered sequence of mixed cases.

In accordance with one or more aspects of the disclosed embodiment each of the more than one independent lift axis is communicably coupled to each asynchronous level transport axis of the array of asynchronous level transport axes corresponding to each asynchronous level transport system.

In accordance with one or more aspects of the disclosed embodiment each of the more than one independent lift axis has a corresponding output section, and a traverse operably connecting the corresponding output section of each of the more than one independent lift axis to the common lift transport output so that mixed cases from each of the more than one independent lift axis reach the common lift transport output via the traverse.

In accordance with one or more aspects of the disclosed embodiment the ordered sequence of mixed cases at the common lift transport output is created on the traverse, and substantially within bounds defined by outermost independent lift axes of the lifting transport system.

In accordance with one or more aspects of the disclosed embodiment the traverse operably interconnects at least two of the more than one independent lift axis with each other.

In accordance with one or more aspects of the disclosed embodiment the traverse is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment at least one independent lift axis of the more than one independent lift axis is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment, the bypass path formed by the at least one independent lift axis crosses the lift axis from one side to another side on a common level of the multi-level transport system.

In accordance with one or more aspects of the disclosed embodiment, the bypass path swaps cases from one side of the lift axis to another side of the lift axis on the common level.

In accordance with one or more aspects of the disclosed embodiment, the bypass path formed by the at least one independent lift axis crosses the lift axis from one side to another side on different levels of the multi-level transport system.

In accordance with one or more aspects of the disclosed embodiment, the bypass path has a bypass portion extending along the lift axis and bypass portions extending along respective planes of the different levels.

In accordance with one or more aspects of the disclosed embodiment, the bypass path swaps cases from one side of the lift axis to another side of the lift axis on the different levels.

In accordance with one or more aspects of the disclosed embodiment, the bypass path formed by the at least one independent lift axis has at least a bypass portion extending along the lift axis and has bypass portions extending along respective planes of different levels on a same side of the lift axis.

In accordance with one or more aspects of the disclosed embodiment, the bypass path swaps case.

In accordance with one or more aspects of the disclosed embodiment the ordered sequence of mixed cases created at and from the common lift transport output in accordance to a predetermined case out ordered sequence of mixed cases is produced substantially continuously and consistent with a high speed pallet builder building at least one mixed case pallet layer of mixed laterally distributed and stacked mixed cases.

In accordance with one or more aspects of the disclosed embodiment a product order fulfillment method comprises:

providing a multi-level transport system, each level thereof having a corresponding independent asynchronous level transport system, of mixed cases, separate and distinct from the asynchronous level transport system corresponding to each other level of the multi-level transport system, the asynchronous level transport system defining an array of asynchronous level transport axes, corresponding to the level, and being configured to hold and asynchronously transport at least one case providing transport of mixed cases along the array of asynchronous level transport axes;

providing a lifting transport system with more than one independent lift axis, each of the more than one independent lift axis being configured to independently hold the at least one case and reciprocate along a lift travel axis independently raising and lowering the at least one case providing lifting transport of mixed cases between more than one of the levels of the multi-level transport system, each independent lift axis being communicably coupled to each asynchronous level transport system so as to provide for exchange of the at least one case between each asynchronous level transport system and each independent lift axis, and mixed cases transferred from at least one asynchronous level transport system infeed to each of the more than one independent lift axis so that mixed cases are output by the independent lift axis from the multi-level transport system; and creating, with the more than one independent lift axis, at and from a common output, an ordered sequence of mixed cases in accordance to a predetermined case out ordered sequence of mixed cases, wherein each independent lift axis, of the more than one lift axis, is communicably coupled to each other independent lift axis of the more than one lift axis and forms the common output of mixed cases output by each of the more than one independent lift axis.

In accordance with one or more aspects of the disclosed embodiment, the more than one independent lift axis form an array of lift axes arrayed in at least one direction.

In accordance with one or more aspects of the disclosed embodiment, the more than one independent lift axis form an array of lift axes arrayed in more than one direction.

In accordance with one or more aspects of the disclosed embodiment the method further comprises resequencing, with the more than one independent lift axis, the mixed cases and effecting a change in the ordered sequence of the mixed cases, with the lifting transport system in motus, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence.

In accordance with one or more aspects of the disclosed embodiment the superior ordered sequence is characterized by its sequence order of mixed cases that converges with the predetermined case out ordered sequence so that there is a strong correlation between respective sequence orders of the superior ordered sequence and the predetermined case out ordered sequence, and wherein the inferior ordered sequence is characterized by its sequence order of mixed cases that diverges from or is substantially neutral to the predetermined case out ordered sequence so that there is a weak correlation between respective sequence orders of the inferior ordered sequence and the predetermined case out ordered sequence.

In accordance with one or more aspects of the disclosed embodiment the strong correlation is such that the sequence order is a near net sequence order to that of the predetermined case out ordered sequence of mixed cases.

In accordance with one or more aspects of the disclosed embodiment the method further comprises communicably coupling each of the more than one independent lift axis to each asynchronous level transport axis of the array of asynchronous level transport axes corresponding to each asynchronous level transport system.

In accordance with one or more aspects of the disclosed embodiment each of the more than one independent lift axis has a corresponding output section, and a traverse operably connecting the corresponding output section of each of the more than one independent lift axis to the common output, the method further comprising transporting the mixed cases with the traverse so that the mixed cases from each independent lift axis reach the common output via the traverse.

In accordance with one or more aspects of the disclosed embodiment the method further comprises creating the ordered sequence of mixed cases at the common output on the traverse, and substantially within bounds defined by outermost independent lift axes of the lifting transport system.

In accordance with one or more aspects of the disclosed embodiment the method further comprises operably interconnecting, with the traverse, at least two of the more than one independent lift axis with each other.

In accordance with one or more aspects of the disclosed embodiment the method further comprises forming a bypass path, with the traverse, for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment the method further comprises forming a bypass path, with at least one independent lift axis of the more than one independent lift axis, for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment, the bypass path formed by the at least one independent lift axis crosses the lift axis from one side to another side on a common level of the multi-level transport system.

In accordance with one or more aspects of the disclosed embodiment, the bypass path swaps cases from one side of the lift axis to another side of the lift axis on the common level.

In accordance with one or more aspects of the disclosed embodiment, the bypass path formed by the at least one independent lift axis crosses the lift axis from one side to another side on different levels of the multi-level transport system.

In accordance with one or more aspects of the disclosed embodiment, the bypass path has a bypass portion extending along the lift axis and bypass portions extending along respective planes of the different levels.

In accordance with one or more aspects of the disclosed embodiment, the bypass path swaps cases from one side of the lift axis to another side of the lift axis on the different levels.

In accordance with one or more aspects of the disclosed embodiment, the bypass path formed by the at least one independent lift axis has at least a bypass portion extending along the lift axis and has bypass portions extending along respective planes of different levels on a same side of the lift axis.

In accordance with one or more aspects of the disclosed embodiment, the bypass path swaps case.

In accordance with one or more aspects of the disclosed embodiment the method further comprises producing the ordered sequence of mixed cases substantially continuously and consistent with a high speed pallet builder building at least one mixed case pallet layer of mixed laterally distributed and stacked mixed cases, wherein the ordered sequence of mixed cases is created at and from the common output in accordance to a predetermined case out ordered sequence of mixed cases.

In accordance with one or more aspects of the disclosed embodiment a product order fulfillment method comprises:

providing a multi-level transport system, each level thereof having a corresponding independent asynchronous level transport system, of mixed cases, separate and distinct from the asynchronous level transport system corresponding to each other level of the multi-level transport system, the asynchronous level transport system defining an array of asynchronous level transport axes, corresponding to the level, and being configured to hold and asynchronously transport at least one case providing transport of mixed cases along the array of asynchronous level transport axes;

providing a lifting transport system with more than one independent lift axis, each of the more than one independent lift axis being configured to independently hold the at least one case and reciprocate along a lift travel axis independently raising and lowering the at least one case, the more than one independent lift axis each being communicably coupled to a common lift transport output through which each of the more than one independent lift axis commonly output the mixed cases from lifting transport system;

providing an infeed interface communicably coupling the multi-level transport system with each of the more than one independent lift axis, the infeed interface comprising different infeed stations distributed at each asynchronous level transport system for each of the more than one independent lift axis so that each of the more than one independent lift axis has a different corresponding infeed station at each asynchronous level transport system through which mixed cases feed from the multi-level transport system to each of the more than one independent lift axis; and outputting mixed cases substantially continuously through the common lift transport output, with the more than one independent lift axis, so as to output the mixed cases in a predetermined case out ordered sequence decoupled from an available sequence of mixed cases from and created by the multi-level transport system at the infeed interface and that feed the more than one independent lift axis through the infeed interface.

In accordance with one or more aspects of the disclosed embodiment, the more than one independent lift axis form an array of lift axes arrayed in at least one direction.

In accordance with one or more aspects of the disclosed embodiment, the more than one independent lift axis form an array of lift axes arrayed in more than one direction.

In accordance with one or more aspects of the disclosed embodiment the method further comprises creating, with the more than one independent lift axis of the lifting transport system, a lift transport stream of mixed cases from the infeed interface, where the lift transport stream has the available sequence of mixed cases, to the common lift transport output where the lift transport stream has the predetermined case out ordered sequence, and at least one lift axis from the more than one independent lift axis defines a pass through with respect to another of the more than one independent lift axis effecting on the fly resequencing from the available sequence of mixed case in the lift transport stream to the predetermined case out ordered sequence of mixed cases at the common lift transport output.

In accordance with one or more aspects of the disclosed embodiment the method further comprises resequencing, with the more than one independent lift axis, the mixed cases and effecting a change in the ordered sequence of the mixed cases, with the lifting transport system in motus, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence.

In accordance with one or more aspects of the disclosed embodiment the superior ordered sequence is characterized by its sequence order of mixed cases that converges with the predetermined case out ordered sequence so that there is a strong correlation between respective sequence orders of the superior ordered sequence and the predetermined case out ordered sequence, and wherein the inferior ordered sequence is characterized by its sequence order of mixed cases that diverges from or is substantially neutral to the predetermined case out ordered sequence so that there is a weak correlation between respective sequence orders of the inferior ordered sequence and the predetermined case out ordered sequence.

In accordance with one or more aspects of the disclosed embodiment the strong correlation is such that the sequence order is a near net sequence order to that of the predetermined case out ordered sequence of mixed cases.

In accordance with one or more aspects of the disclosed embodiment the method further comprises communicably coupling each of the more than one independent lift axis to each asynchronous level transport axis of the array of asynchronous level transport axes corresponding to each asynchronous level transport system.

In accordance with one or more aspects of the disclosed embodiment each of the more than one independent lift axis has a corresponding output section, and a traverse operably connecting the corresponding output section of each of the more than one independent lift axis to the common lift transport output, the method further comprising transporting the mixed cases with the traverse so that the mixed cases from each of the more than one independent lift axis reach the common lift transport output via the traverse.

In accordance with one or more aspects of the disclosed embodiment the method further comprises creating the ordered sequence of mixed cases at the common lift transport output on the traverse, and substantially within bounds defined by outermost independent lift axes of the lifting transport system.

In accordance with one or more aspects of the disclosed embodiment the method further comprises operably interconnecting, with the traverse, at least two of the more than one independent lift axis with each other.

In accordance with one or more aspects of the disclosed embodiment the method further comprises forming a bypass path, with the traverse for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment the method further comprises forming a bypass path, with at least one independent lift axis of the more than one independent lift axis, for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

In accordance with one or more aspects of the disclosed embodiment, the bypass path formed by the at least one independent lift axis crosses the lift axis from one side to another side on a common level of the multi-level transport system.

In accordance with one or more aspects of the disclosed embodiment, the bypass path swaps cases from one side of the lift axis to another side of the lift axis on the common level.

In accordance with one or more aspects of the disclosed embodiment, the bypass path formed by the at least one independent lift axis crosses the lift axis from one side to another side on different levels of the multi-level transport system.

In accordance with one or more aspects of the disclosed embodiment, the bypass path has a bypass portion extending along the lift axis and bypass portions extending along respective planes of the different levels.

In accordance with one or more aspects of the disclosed embodiment, the bypass path swaps cases from one side of the lift axis to another side of the lift axis on the different levels.

In accordance with one or more aspects of the disclosed embodiment, the bypass path formed by the at least one independent lift axis has at least a bypass portion extending along the lift axis and has bypass portions extending along respective planes of different levels on a same side of the lift axis.

In accordance with one or more aspects of the disclosed embodiment, the bypass path swaps case.

In accordance with one or more aspects of the disclosed embodiment the method further comprises producing the ordered sequence of mixed cases substantially continuously and consistent with a high speed pallet builder building at least one mixed case pallet layer of mixed laterally distributed and stacked mixed cases, wherein the ordered sequence of mixed cases created at and from the common lift transport output in accordance to a predetermined case out ordered sequence of mixed cases.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A product order fulfillment system comprising:
   a multi-level transport system, each level thereof having a corresponding independent asynchronous level transport system, of mixed cases, separate and distinct from the asynchronous level transport system corresponding to each other level of the multi-level transport system, the asynchronous level transport system defining an array of asynchronous level transport axes, corresponding to the level, and being configured to hold and asynchronously transport at least one case providing transport of mixed cases along the array of asynchronous level transport axes; and
   a lifting transport system that is separate and distinct from each asynchronous level transport system, the lifting transport system has more than one independent lift axis, each of the more than one independent lift axis being configured to independently hold the at least one case and reciprocate along a lift travel axis independently raising and lowering the at least one case providing lifting transport of mixed cases between more than one of the levels of the multi-level transport system, each independent lift axis being communicably coupled to each asynchronous level transport system so as to provide for exchange of the at least one case between each asynchronous level transport system and each independent lift axis, and mixed cases transferred from at least one asynchronous level transport system infeed to each of the more than one independent lift axis so that mixed cases are output by the independent lift axis from the multi-level transport system;
   wherein each independent lift axis, of the more than one lift axis, is communicably coupled to each other independent lift axis of the more than one lift axis and forms a common output of mixed cases output by each of the more than one independent lift axis, and the more than one independent lift axis are configured so as to create, at and from the common output, an ordered sequence of mixed cases in accordance to a predetermined case out ordered sequence of mixed cases.

2. The product order fulfillment system of claim 1, wherein the more than one independent lift axis are configured so as to resequence the mixed cases and effect a change in the ordered sequence of the mixed cases, with the lifting transport system in motus, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence.

3. The product order fulfillment system of claim 2, wherein the superior ordered sequence is characterized by its sequence order of mixed cases that converges with the predetermined case out ordered sequence so that there is a strong correlation between respective sequence orders of the superior ordered sequence and the predetermined case out ordered sequence, and wherein the inferior ordered sequence is characterized by its sequence order of mixed cases that diverges from or is substantially neutral to the predetermined case out ordered sequence so that there is a weak correlation between respective sequence orders of the inferior ordered sequence and the predetermined case out ordered sequence.

4. The product order fulfillment system of claim 3, wherein the strong correlation is such that the sequence order is a near net sequence order to that of the predetermined case out ordered sequence of mixed cases.

5. The product order fulfillment system of claim 1, wherein each of the more than one independent lift axis is communicably coupled to each asynchronous level transport axis of the array of asynchronous level transport axes corresponding to each asynchronous level transport system.

6. The product order fulfillment system of claim 1, wherein each of the more than one independent lift axis has a corresponding output section, and a traverse operably connecting the corresponding output section of each of the more than one independent lift axis to the common output so that mixed cases from each independent lift axis reach the common output via the traverse.

7. The product order fulfillment system of claim 6, wherein the ordered sequence of mixed cases at the common output is created on the traverse, and substantially within bounds defined by outermost independent lift axes of the lifting transport system.

8. The product order fulfillment system of claim 6, wherein the traverse operably interconnects at least two of the more than one independent lift axis with each other.

9. The product order fulfillment system of claim 6, wherein the traverse is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

10. The product order fulfillment system of claim 1, wherein at least one independent lift axis of the more than one independent lift axis is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

11. The product order fulfillment system of claim 1, wherein the ordered sequence of mixed cases created at and from the common output in accordance to a predetermined case out ordered sequence of mixed cases is produced substantially continuously and consistent with a high speed pallet builder building at least one mixed case pallet layer of mixed laterally distributed and stacked mixed cases.

12. A product order fulfillment system comprising:
   a multi-level transport system, each level thereof having a corresponding independent asynchronous level transport system, of mixed cases, separate and distinct from the asynchronous level transport system corresponding to each other level of the multi-level transport system, the asynchronous level transport system defining an array of asynchronous level transport axes, corresponding to the level, and being configured to hold and asynchronously transport at least one case providing transport of mixed cases along the array of asynchronous level transport axes;
   a lifting transport system with more than one independent lift axis separate and distinct from the multi-level transport system, each of the more than one independent lift axis being configured to independently hold the at least one case and reciprocate along a lift travel axis independently raising and lowering the at least one case, the more than one independent lift axis each being communicably coupled to a common lift transport output through which each of the more than one independent lift axis commonly output the mixed cases from lifting transport system; and
   an infeed interface communicably coupling the multi-level transport system with each of the more than one independent lift axis, the infeed interface comprising different infeed stations distributed at each asynchronous level transport system for each of the more than one independent lift axis so that each of the more than one independent lift axis has a different corresponding infeed station at each asynchronous level transport system through which mixed cases feed from the multi-level transport system to each of the more than one independent lift axis;
   wherein the more than one independent lift axis are configured so as to output mixed cases substantially continuously through the common lift transport output in a predetermined case out ordered sequence decoupled from an available sequence of mixed cases from and created by the multi-level transport system at the infeed interface and that feed the more than one independent lift axis through the infeed interface.

13. The product order fulfillment system of claim 12, wherein the more than one independent lift axis of the lifting transport system create a lift transport stream of mixed cases from the infeed interface, where the lift transport stream has the available sequence of mixed cases, to the common lift transport output where the lift transport stream has the predetermined case out ordered sequence, and at least one lift axis from the more than one independent lift axis defines a pass through with respect to another of the more than one independent lift axis effecting on the fly resequencing from the available sequence of mixed cases in the lift transport stream to the predetermined case out ordered sequence of mixed cases at the common lift transport output.

14. The product order fulfillment system of claim 12, wherein the more than one independent lift axis are configured so as to resequence the mixed cases and effect a change in the ordered sequence of the mixed cases, with the lifting transport system in motus, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence.

15. The product order fulfillment system of claim 14, wherein the superior ordered sequence is characterized by its sequence order of mixed cases that converges with the predetermined case out ordered sequence so that there is a strong correlation between respective sequence orders of the superior ordered sequence and the predetermined case out ordered sequence, and wherein the inferior ordered sequence is characterized by its sequence order of mixed cases that diverges from or is substantially neutral to the predetermined case out ordered sequence so that there is a weak correlation between respective sequence orders of the inferior ordered sequence and the predetermined case out ordered sequence.

16. The product order fulfillment system of claim 15, wherein the strong correlation is such that the sequence order is a near net sequence order to that of the predetermined case out ordered sequence of mixed cases.

17. The product order fulfillment system of claim 12, wherein each of the more than one independent lift axis is communicably coupled to each asynchronous level transport axis of the array of asynchronous level transport axes corresponding to each asynchronous level transport system.

18. The product order fulfillment system of claim 12, wherein each of the more than one independent lift axis has a corresponding output section, and a traverse operably connecting the corresponding output section of each of the more than one independent lift axis to the common lift transport output so that mixed cases from each of the more than one independent lift axis reach the common lift transport output via the traverse.

19. The product order fulfillment system of claim 18, wherein the ordered sequence of mixed cases at the common lift transport output is created on the traverse, and substantially within bounds defined by outermost independent lift axes of the lifting transport system.

20. The product order fulfillment system of claim 18, wherein the traverse operably interconnects at least two of the more than one independent lift axis with each other.

21. The product order fulfillment system of claim 18, wherein the traverse is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

22. The product order fulfillment system of claim 12, wherein at least one independent lift axis of the more than one independent lift axis is configured so as to form an bypass path for mixed cases transported and output by the more than one independent lift axis of the lifting transport system effecting resequencing, at least in part, from an inferior ordered sequence of mixed cases, at infeed of the lifting transport system, to a superior ordered sequence of mixed cases, at output of the lifting transport system, the inferior ordered sequence and superior ordered sequence respectively being of inferior sequencing in sequence order and superior sequencing in sequence order relative to the predetermined case out ordered sequence of mixed cases.

23. The product order fulfillment system of claim 12, wherein the ordered sequence of mixed cases created at and from the common lift transport output in accordance to a predetermined case out ordered sequence of mixed cases is produced substantially continuously and consistent with a high speed pallet builder building at least one mixed case pallet layer of mixed laterally distributed and stacked mixed cases.

* * * * *

UNITED STATES PATENT AND TRADEMARK OFFICE
CERTIFICATE OF CORRECTION

PATENT NO. : 10,947,060 B2
APPLICATION NO. : 16/444592
DATED : March 16, 2021
INVENTOR(S) : Cohen et al.

Page 1 of 1

It is certified that error appears in the above-identified patent and that said Letters Patent is hereby corrected as shown below:

On the Title Page

Item (73) Assignee: delete "Symbolic LLC" and insert --Symbotic LLC-- therefor.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*